United States Patent
Matsuda et al.

(10) Patent No.: US 11,979,922 B2
(45) Date of Patent: May 7, 2024

(54) COMMUNICATION DEVICE, COMMUNICATION METHOD, AND COMMUNICATION PROGRAM

(71) Applicant: Sony Group Corporation, Tokyo (JP)

(72) Inventors: Hiroki Matsuda, Tokyo (JP); Naoki Kusashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 326 days.

(21) Appl. No.: 17/414,324

(22) PCT Filed: Nov. 22, 2019

(86) PCT No.: PCT/JP2019/045759
§ 371 (c)(1),
(2) Date: Jun. 16, 2021

(87) PCT Pub. No.: WO2020/144947
PCT Pub. Date: Jul. 16, 2020

(65) Prior Publication Data
US 2022/0078858 A1 Mar. 10, 2022

(30) Foreign Application Priority Data
Jan. 10, 2019 (JP) .................. 2019-002878

(51) Int. Cl.
*H04W 76/10* (2018.01)
*H04W 72/23* (2023.01)

(52) U.S. Cl.
CPC .......... *H04W 76/10* (2018.02); *H04W 72/23* (2023.01)

(58) Field of Classification Search
None
See application file for complete search history.

(56) References Cited

U.S. PATENT DOCUMENTS

| 10,129,923 B2* | 11/2018 | Fukuta | H04W 76/10 |
| 2015/0319702 A1 | 11/2015 | Patel | |
| 2018/0324869 A1* | 11/2018 | Phuyal | H04W 74/0833 |

(Continued)

FOREIGN PATENT DOCUMENTS

| CN | 104272671 A | 1/2015 |
| WO | 2017/197063 A1 | 11/2017 |

(Continued)

OTHER PUBLICATIONS

International Search Report and Written Opinion dated Feb. 18, 2020, received for PCT Application PCT/JP2019/045759, Filed on Nov. 22, 2019, 9 pages including English Translation.

(Continued)

*Primary Examiner* — Hong S Cho
(74) *Attorney, Agent, or Firm* — XSENSUS LLP

(57) ABSTRACT

A communication device is a device in which a radio connection state with another communication device changes from an unconnected state to a predetermined connected state by performing a predetermined connection procedure. The communication device acquires predetermined information for transmitting data to the another communication device in the unconnected state. The communication device then transmits the data to the another communication device in the unconnected state based on the predetermined information.

17 Claims, 26 Drawing Sheets

(56) References Cited

U.S. PATENT DOCUMENTS

| | | | |
|---|---|---|---|
| 2019/0007574 A1 | 1/2019 | Takarabe | |
| 2020/0045725 A1* | 2/2020 | Mochizuki | H04W 16/28 |
| 2020/0221526 A1* | 7/2020 | Jin | H04W 76/19 |
| 2021/0219343 A1* | 7/2021 | Murayama | H04L 5/0012 |
| 2022/0046721 A1* | 2/2022 | Yan | H04W 72/12 |

FOREIGN PATENT DOCUMENTS

| | | |
|---|---|---|
| WO | WO-2018005288 A1 | 1/2018 |
| WO | 2018/062957 A1 | 4/2018 |
| WO | 2018/128505 A1 | 7/2018 |
| WO | 2018/199673 A1 | 11/2018 |

OTHER PUBLICATIONS

Huawei et al., "Updated Feature Lead Summary of Maintenance for Early Data Transmission in eMTC", 3GPP TSG RAN WG1 #94, R1-1809645, Aug. 20-24, 2018, 13 pages.

NTT DOCOMO, Inc., "Enhanced UL Transmission with Configured Grant for URLLC", 3GPP Tsg Ran WG1 Meeting #95, R1-1813329, Nov. 12-16, 2018, pp. 1-16.

* cited by examiner

FIG.9

| | SUBCARRIER SPACING | MAXIMUM BANDWIDTH | CP LENGTH TYPE | NUMBER OF SYMBOLS | SUBFRAME LENGTH | RADIO FRAME LENGTH | NUMBER OF SUB-CARRIERS |
|---|---|---|---|---|---|---|---|
| PARAMETER SET 0 | 15kHz | 20MHz | TYPE 1 | 14 | 1ms | 10ms | 12 |
| PARAMETER SET 1 | 7.5kHz | 1.4MHz | TYPE 1 | 70 | 10ms | 10ms | 24 |
| PARAMETER SET 2 | 30kHz | 80MHz | TYPE 1 | 7 | 0.25ms | 10ms | 6 |
| PARAMETER SET 3 | 15kHz | 20MHz | TYPE 2 | 12 | 1ms | 10ms | 12 |
| ... | ... | ... | ... | ... | ... | ... | ... |

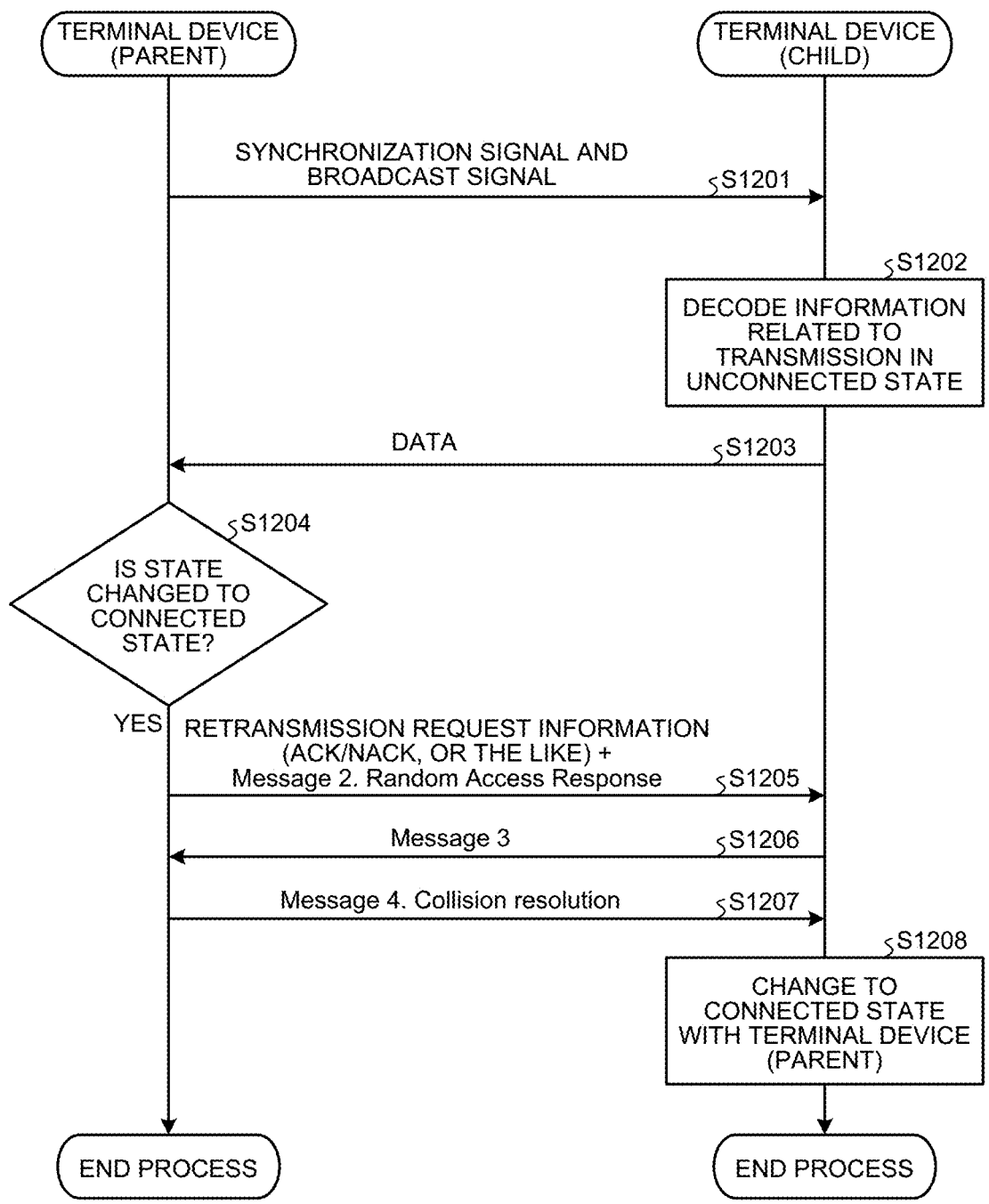

COMMUNICATION DEVICE, COMMUNICATION METHOD, AND COMMUNICATION PROGRAM

CROSS-REFERENCE TO RELATED APPLICATIONS

The present application is based on PCT filing PCT/JP2019/045759, filed Nov. 22, 2019, which claims priority to JP 2019-002878, filed Jan. 10, 2019, the entire contents of each are incorporated herein by reference.

FIELD

The present disclosure relates to a communication device, a communication method, and a communication program.

BACKGROUND

Mobile communication with radio access technologies such as cellular communication technologies has been known. Such radio access technologies are required to have high transmission efficiency in order to support various use cases. Configured Grant transmission technology has attracted attention as one of the technologies for improving transmission efficiency.

CITATION LIST

Non Patent Literature

Non Patent Literature 1: "Enhanced UL transmission with configured grant for URLLC", 3GPP RAN1 R1-1813329, NTT DOCOMO Inc., November 2018

SUMMARY

Technical Problem

However, in the conventional radio access technology, it is not always possible to achieve high transmission efficiency simply by applying Configured Grant transmission technology in which transmission resources are assigned to a terminal device in advance and data is transmitted to the terminal device without a grant. For example, in order to achieve high transmission efficiency, it is necessary to enable a user to transmit data in various states. However, it is not easy to reduce signaling that is performed until a user who is not in a connected state transmits data.

Consequently, the present disclosure proposes a communication device, a communication method, and a communication program that can achieve high transmission efficiency.

Solution to Problem

To solve the above problem, a communication device in which a radio connection state with another communication device changes from an unconnected state to a predetermined connected state by performing a predetermined connection procedure, the communication device includes: an acquisition unit that acquires predetermined information for transmitting data to the another communication device in the unconnected state; and a transmission unit that transmits the data to the another communication device in the unconnected state based on the predetermined information.

BRIEF DESCRIPTION OF DRAWINGS

FIG. 9 is a diagram illustrating an example of a parameter set related to a transmission signal in an NR cell.

FIG. 27 is a diagram illustrating specific sequence example (6) of the transmission process (the transmission in an unconnected state).

DESCRIPTION OF EMBODIMENTS

Figure 1:
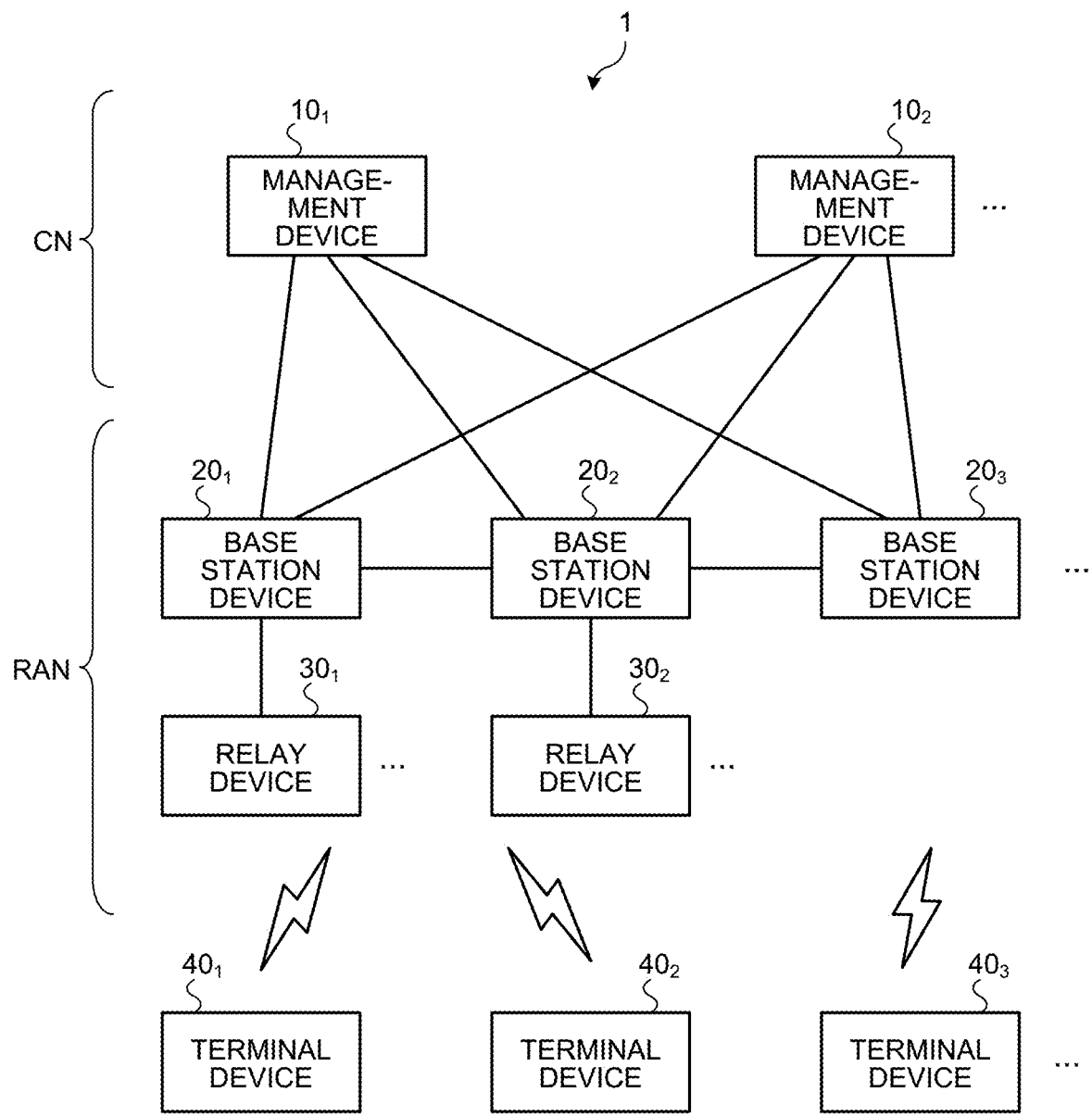
FIG. 1 is a diagram illustrating a configuration example of a communication system according to an embodiment of the present disclosure.

Hereinafter, embodiments of the present disclosure will be described in detail with reference to the drawings. Note that in each of the following embodiments, the same reference numerals are given to the same components, and duplicate description will be omitted.

Further, in the present specification and the drawings, a plurality of components having substantially the same functional configuration are sometimes distinguished by adding different numbers after the same reference numerals. For example, a plurality of configurations having substantially the same functional configuration are distinguished as necessary, such as terminal devices $40_1$, $40_2$, and $40_3$. However, if it is not necessary to particularly distinguish the respective components having substantially the same functional configuration, only the same reference numerals are given. For example, when it is not necessary to distinguish the terminal devices $40_1$, $40_2$, and $40_3$, it is simply referred to as the terminal device 40.

Furthermore, the present disclosure will be described according to the order of items shown below.

1. Introduction
2. Configuration of Communication System
2-1. Overall Configuration of Communication System
2-2. Configuration of Management Device
2-3. Configuration of Base Station Device
2-4. Configuration of Relay Device
2-5. Configuration of Terminal Device
2-6. Radio Frame Configuration
3. About NOMA
3-1. Data Transmission and Reception with NOMA
4. Basic Operation of Communication System
4-1. Initial Connection Process
4-2. Random Access Procedure
4-3. Transmission and Reception Process (Grant Based)
4-4. Transmission and Reception Process (Configured Grant)
4-5. Transmission and Reception Process (Downlink)
5. Transmission of User Data in Unconnected State
5-1. Resource Assignment
5-2. Signaling
5-3. Transmission Process (Transmission in Unconnected State)
5-4. Sequence Example (1)
5-5. Sequence Example (2)
5-6. Sequence Example (3)
5-7. Sequence Example (4)
5-8. Sequence Example (5)
5-9. Sequence Example (6)
5-10. Repetition
5-11. Process Related to Retransmission Request
5-12. Power Ramping
5-13. Uplink Synchronization Compensation
6. Modification
6-1. Modification Related to Transmission and Reception Process and Transmission Process 6-2. Other Modifications
7. Conclusion

1. INTRODUCTION

Radio access technologies (RATs) such as Long Term Evolution (LTE) and New Radio (NR) have been studied in 3rd Generation Partnership Project (3GPP). LTE and NR are a type of cellular communication technology, and enable mobile communication of terminal devices by arranging a plurality of areas covered by base stations in a cellular manner. It is assumed in the following description that "LTE" includes LTE-Advanced (LTE-A), LTE-Advanced Pro (LTE-A Pro), and Evolved Universal Terrestrial Radio Access (EUTRA). In addition, it is assumed that NR includes New Radio Access Technology (NRAT) and Further EUTRA (FEUTRA). Note that a single base station may manage a plurality of cells. In the following description, a cell supporting LTE is referred to as "LTE cell", and a cell supporting NR is referred to as "NR cell".

NR is the radio access technology (RAT) in the next generation of LTE (in the fifth generation). NR is the radio access technology that can support various use cases including enhanced Mobile Broadband (eMBB), massive Machine Type Communications (mMTC), and Ultra-Reliable and Low Latency Communications (URLLC). NR is being studied aiming at a technical framework that supports usage scenarios, requirements, and deployment scenarios in these use cases.

In order to support various use cases, NR is required to perform communication with higher frequency utilization efficiency than LTE. In order to achieve high transmission efficiency, it is effective to reduce signaling. In NR, one of the technologies to reduce signaling is Configured-Grant (Grant-free) transmission. This is a technology that enables a terminal device to transmit data without a grant by assigning transmission resources from a base station device to the terminal device in advance. Details of the Configured-Grant (Grant-free) transmission are disclosed in Non Patent Literature 1.

However, it is not always possible to achieve high transmission efficiency simply by applying the Configured-Grant transmission technology. In the present embodiment, as the communication system in which a base station device and a terminal device communicate with each other is flexibly designed according to various use cases, the transmission efficiency of the entire system can be improved.

For example, the communication device (for example, the terminal device) of the present embodiment is a communication device in which a predetermined connection procedure (for example, an initial connection procedure such as a random access procedure) is performed to change a radio connection state with a base station device from an unconnected state (for example, RRC_IDLE, RRC_INACTIVE, or Lightning mode) to a connected state (for example, RRC_CONNECTED). The communication device acquires predetermined information for transmitting user data to the base station device in an unconnected state. The communication device then transmits the user data to the base station device in an unconnected state on the basis of the predetermined information.

In a conventional case, even when it is desired to transmit small user data only once (or intermittently), it is necessary to take the trouble of performing a predetermined connection procedure (for example, an initial connection procedure such as a random access procedure). This is a large waste in the whole system. However, since the communication device of the present embodiment can transmit user data without performing a predetermined connection procedure, signaling is significantly reduced. As a result, high transmission efficiency is achieved.

2. CONFIGURATION OF COMMUNICATION SYSTEM

Hereinafter, a communication system 1 according to an embodiment of the present disclosure will be described. The communication system 1 includes a base station, and can perform radio-connection to a terminal device. A terminal device of the present embodiment can transmit user data to the base station device without performing a random access procedure. Note that the communication system 1 may be capable of performing radio communication with the terminal device using Non-orthogonal Multiple Access (NOMA). NOMA will be described later. The non-terrestrial network included in the communication system 1 is, for example, a radio network with a radio access scheme defined in NR. It is needless to mention that the communication system 1 may include a radio network with a radio access scheme other than NR.

Note that in the following description, the concept of a base station (hereinafter, also referred to as "base station device") includes a relay station (hereinafter, also referred to as "relay device"). In addition, the concept of the base station includes not only a structure that has the function of the base station but also a device installed in the structure. The structure includes, for example, buildings such as high-rise buildings, houses, steel towers, station facilities, airport facilities, port facilities, and stadiums. Note that the concept of the structure includes not only buildings but also non-building structures such as tunnels, bridges, dams, walls, and iron pillars, and equipment such as cranes, gates, and windmills. Further, the concept of the structure includes not only structures on the ground (the land) or underground, but also structures on the water such as piers and megafloats, and underwater structures such as marine observation facilities.

Further, the base station device may be a base station device configured to be movable. For example, the base station device may be a device installed in a mobile body, or may be the mobile body itself. The mobile body may be a mobile terminal such as a smartphone. Furthermore, the mobile body may be a mobile body that moves on the ground (the land) (for example, a vehicle such as a car, a bus, a truck, a train, or a linear motor car), or may be a mobile body that moves underground (for example, in a tunnel) (for example, a subway). Moreover, the mobile body may be a mobile body that moves on water (for example, a ship such as a passenger ship, a cargo ship, or a hovercraft), or may be a mobile body that moves underwater (for example, a submersible ship such as a submersible vessel, a submarine, or an unmanned submarine). Further, the mobile body may be a mobile body that moves in the atmosphere (for example, an aircraft such as an airplane, an airship, or a drone), or may be a mobile body that moves in outer space (for example, an artificial celestial body such as an artificial satellite, a spaceship, a space station, or a probe).

Note that in some cases, the LTE base station is referred to as "evolved Node B (eNodeB)" or "eNB". In addition, in some cases, the NR base station is referred to as "gNodeB" or "gNB". Further, in some cases, the terminal device (also referred to as "mobile station", "mobile station device", or "terminal") is referred to as "user equipment (UE)" in LTE and NR. Note that the terminal device is a type of the communication device, and is also referred to as "mobile station", "mobile station device", or "terminal". In the embodiment of the present disclosure, the concept of the communication device includes not only a portable terminal device such as a mobile terminal, but also a device installed in a structure or a mobile body, for example. Furthermore, the concept of the communication device includes not only a terminal device but also a base station device and a relay device.

2-1. Overall Configuration of Communication System

FIG. 1 is a diagram illustrating a configuration example of the communication system 1 according to the embodiment of the present disclosure. The communication system 1 includes a management device 10, a base station device 20, a relay device 30, and a terminal device 40. The communication system 1 provides a user with a radio network capable of mobile communication by operating radio communication devices that constitute the communication system 1 in cooperation with each other. The radio communication device is a device that has a radio communication function, and in the example of FIG. 1, includes the base station device 20, the relay device 30, and the terminal device 40.

The communication system 1 may include the management device 10, the base station device 20, the relay device 30, and the terminal device 40 in plural. In the example of FIG. 1, the communication system 1 includes management devices $10_1$, $10_2$, and the like as the management device 10. In addition, the communication system 1 includes base station devices $20_1$, $20_2$, $20_3$, and the like as the base station device 20, and relay devices $30_1$, $30_2$, and the like as the relay device 30. Further, the communication system 1 includes terminal devices $40_1$, $40_2$, $40_3$, and the like as the terminal device 40.

The management device 10 is a device that manages a radio network. For example, the management device 10 is a device that functions as Mobility Management Entity (MME) or Access and Mobility Management Function (AMF). The management device 10 constitutes a core network CN. The core network CN is, for example, Evolved Packet Core (EPC) or 5G Core network (5GC). The management device 10 is connected to each of a plurality of the base station devices 20. The management device 10 manages the communication of the base station device 20.

The base station device 20 is a base station device that radio-communicates with the terminal device 40. The base station device 20 can perform NOMA communication with the terminal device 40. Here, the NOMA communication means communication (transmission, reception, or both) using non-orthogonal resources. The non-orthogonal resources will be described later. Note that the base station device 20 may be configured to be capable of performing NOMA communication with another base station device 20 and the relay device 30.

The base station device 20 may be a ground base station device (a ground station device) installed on the ground. For example, the base station device 20 may be a base station device disposed in a structure on the ground, or may be a base station device installed in a mobile body moving on the ground. More specifically, the base station device 20 may be an antenna installed on a structure such as a building and a signal processing device connected to the antenna. It is needless to mention that the base station device 20 may be a structure or a mobile body itself. "Ground" is not only the ground (the land) but also the ground in a broad sense including underground, on the water, and underwater. Note that the base station device 20 is not limited to the ground base station device. The base station device 20 may be a non-ground base station device (a non-ground station device) capable of floating in the air or space. For example, the base station device 20 may be an aircraft station device or a satellite station device.

The aircraft station device is a radio communication device that can float in the atmosphere such as an aircraft. The aircraft station device may be a device mounted on an aircraft or the like, or may be an aircraft itself. Note that the concept of the aircraft includes not only a heavy aircraft such as an airplane or a glider, but also a light aircraft such as a balloon or an airship. In addition, the concept of the aircraft includes not only a heavy aircraft and a light aircraft, but also a rotary-wing aircraft such as a helicopter or an autogyro. Note that the aircraft station device (or the aircraft on which the aircraft station device is mounted) may be an unmanned aerial vehicle such as a drone. Note that the concept of the unmanned aerial vehicle also includes unmanned aircraft systems (UAS) and tethered UAS. Furthermore, the concept of the unmanned aerial vehicle includes lighter than air (LTA) UAS and heavier than air (HTA) UAS. In addition, the concept of the unmanned aerial vehicle also includes high altitude UAS platforms (HAPs).

The satellite station device is a radio communication device capable of floating in outer space. The satellite station device may be a device mounted on a space mobile body such as an artificial satellite, or may be a space mobile body itself. The satellite that functions as the satellite station device may be any one of a low earth orbiting (LEO) satellite, a medium earth orbiting (MEO) satellite, a geostationary earth orbiting (GEO) satellite, and a highly elliptical orbiting (HEO) satellite. It is needless to mention that the satellite station device may be a device mounted on a low earth orbiting satellite, a medium earth orbiting satellite, a geostationary earth orbiting satellite, or a highly elliptical orbiting satellite.

Note that in the example of FIG. 1, the base station device 20₁ is connected to the relay device 30₁, and the base station device 20₂ is connected to the relay device 30₂. The base station device 20₁ can indirectly radio-communicate with the terminal device 40 via the relay device 30₁. Similarly, the base station device 20₂ can indirectly radio-communicate with the terminal device 40 via the relay device 30₂.

The relay device 30 is a device that functions as a relay station in a base station. The relay device 30 is a type of the base station device. The relay device 30 can perform NOMA communication with the terminal device 40. The relay device 30 relays the communication between the base station device 20 and the terminal device 40. Note that the relay device 30 may be configured to be capable of performing NOMA communication with another relay device 30 and the base station device 20. The relay device 30 may be a ground station device or a non-ground station device. The relay device 30 and the base station device 20 constitute a radio access network RAN.

The terminal device 40 is, for example, a mobile phone, a smart device (a smartphone or a tablet), a personal digital assistant (PDA), or a personal computer. Alternatively, the terminal device 40 may be a Machine to Machine (M2M) device or an Internet of Things (IoT) device. Furthermore, the terminal device 40 may be a radio communication device installed in a mobile body, or may be the mobile body itself.

The terminal device 40 can perform NOMA communication with the base station device 20 and the relay device 30. Note that the terminal device 40 can perform NOMA communication in communication (sidelink) with another terminal device 40.

Hereinafter, the configuration of each device constituting the communication system 1 according to the embodiment will be specifically described.

2-2. Configuration of Management Device

The management device 10 is a device that manages a radio network. For example, the management device 10 is a device that manages the communication of the base station device 20. If the core network is EPC, the management device 10 is, for example, a device that has a function as Mobility Management Entity (MME). Alternatively, if the core network is 5GC, the management device 10 is, for example, a device that has a function as Access and Mobility Management Function (AMF).

Note that the management device 10 may have a gateway function. For example, if the core network is EPC, the management device 10 may have a function as Serving Gateway (S-GW) or Packet Data Network Gateway (P-GW). Alternatively, if the core network is 5GC, the management device 10 may have a function as User Plane Function (UPF). Note that the management device 10 does not necessarily have to be a device that constitutes the core network. For example, it is assumed that the core network is a core network for Wideband Code Division Multiple Access (W-CDMA) or Code Division Multiple Access 2000 (cdma2000). In this case, the management device 10 may be a device that functions as Radio Network Controller (RNC).

Figure 2:
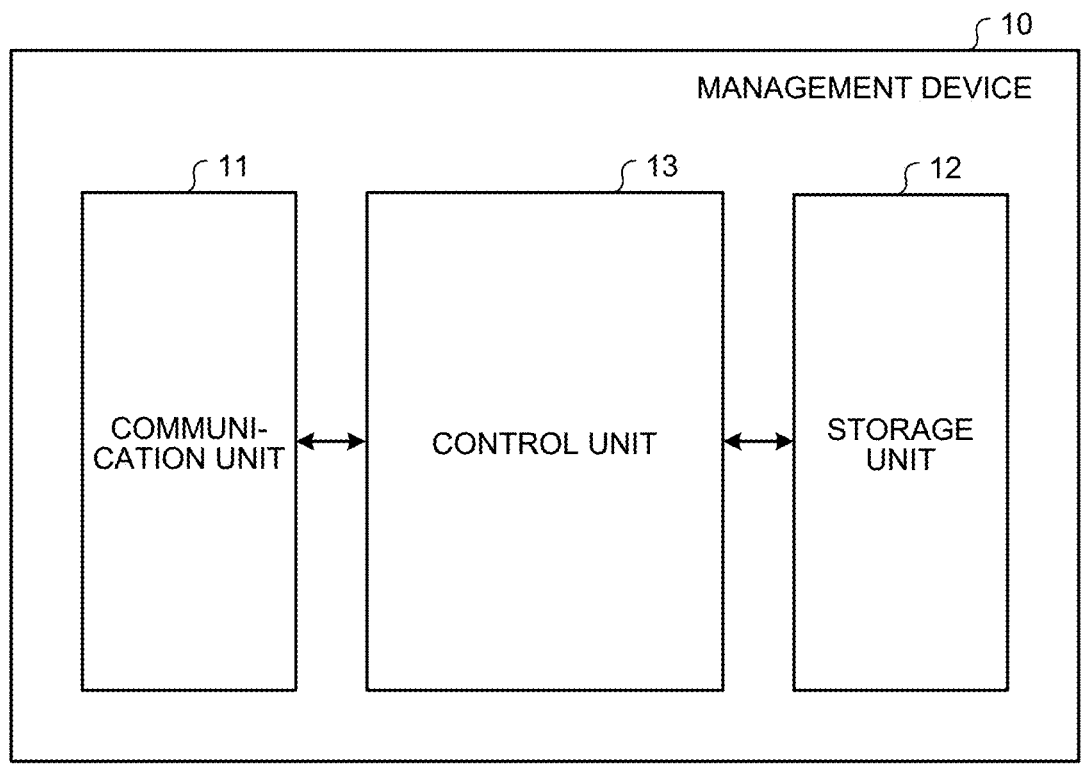
FIG. 2 is a diagram illustrating a configuration example of a management device according to the embodiment of the present disclosure.

FIG. 2 is a diagram illustrating a configuration example of the management device 10 according to the embodiment of the present disclosure. The management device 10 includes a communication unit 11, a storage unit 12, and a control unit 13. Note that the configuration illustrated in FIG. 2 is a functional configuration, and the hardware configuration may be different from the configuration illustrated in FIG. 2. Further, the function of the management device 10 may be distributed and implemented in a plurality of physically separated configurations. For example, the management device 10 may be composed of a plurality of server devices.

The communication unit 11 is a communication interface for communicating with another device. The communication unit 11 may be a network interface or a device connection interface. For example, the communication unit 11 may be a local area network (LAN) interface such as a network interface card (NIC), or may be a universal serial bus (USB) interface composed of a USB host controller, a USB port, and the like. Further, the communication unit 11 may be a wired interface or a radio interface. The communication unit 11 functions as a communication unit of the management device 10. The communication unit 11 communicates with the base station device 20 under the control of the control unit 13.

The storage unit 12 is a data readable and writable storage device such as a dynamic random access memory (DRAM), a static random access memory (SRAM), a flash memory, or a hard disk. The storage unit 12 functions as a storage unit of the management device 10. The storage unit 12 stores, for example, the connection state of the terminal device 40. For example, the storage unit 12 stores the radio resource control (RRC) state and EPS Connection Management (ECM) state of the terminal device 40. The storage unit 12 may function as a home memory that stores the position information of the terminal device 40.

The control unit 13 is a controller that controls each unit of the management device 10. The control unit 13 is implemented by, for example, a processor such as a central processing unit (CPU) or a micro processing unit (MPU). For example, the control unit 13 is implemented by the processor executing various programs stored in the storage device inside the management device 10 using a random access memory (RAM) or the like as a work area. Note that the control unit 13 may be implemented by an integrated circuit such as an application specific integrated circuit (ASIC) or a field programmable gate array (FPGA). The CPU, MPU, ASIC, and FPGA can all be regarded as controllers.

2-3. Configuration of Base Station Device

Figure 3:
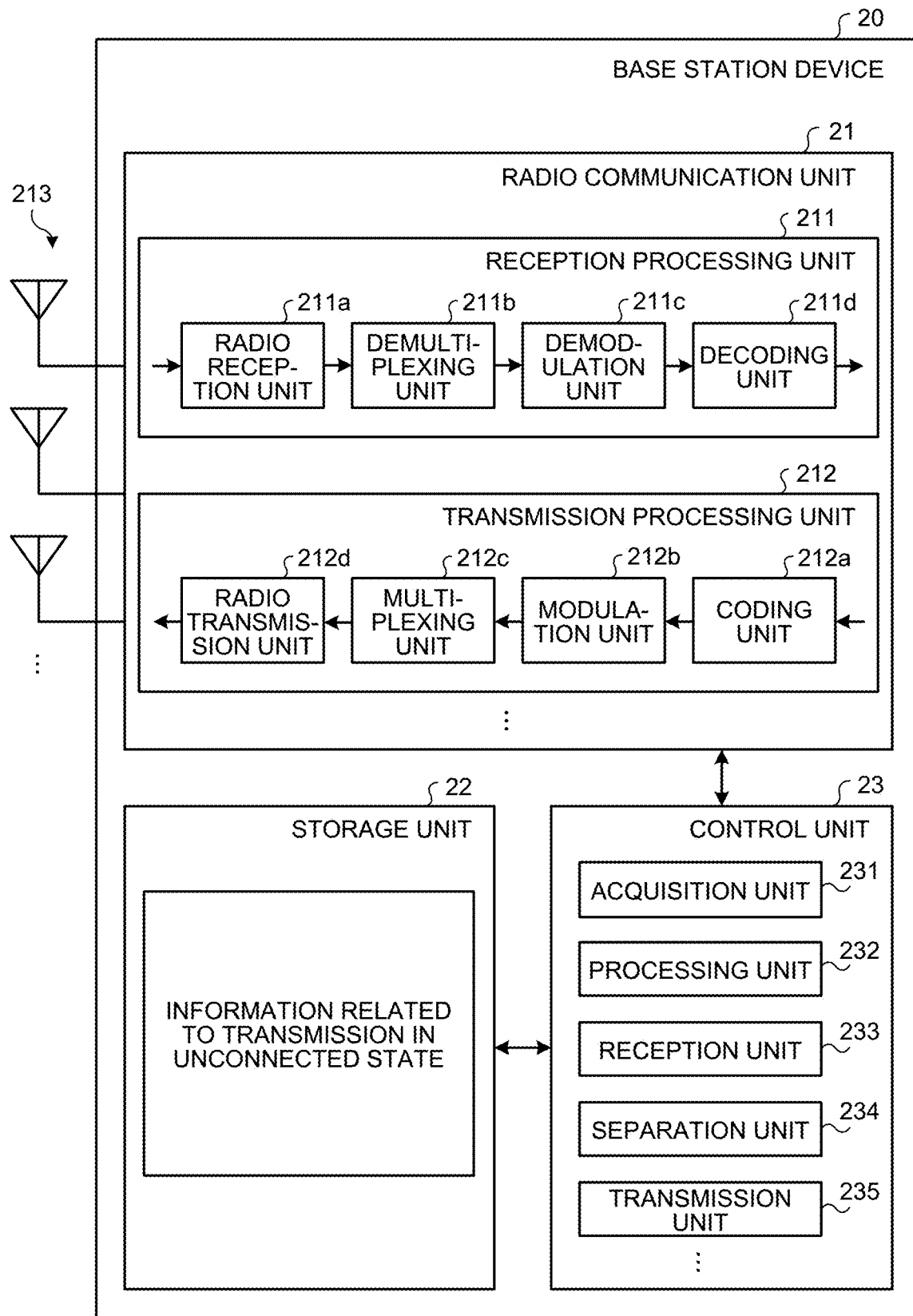
FIG. 3 is a diagram illustrating a configuration example of a base station device according to the embodiment of the present disclosure.

Next, the configuration of the base station device will be described. FIG. 3 is a diagram illustrating a configuration example of the base station device 20 according to the embodiment of the present disclosure. The base station device 20 can perform NOMA communication with the terminal device 40. The base station device 20 includes a radio communication unit 21, a storage unit 22, and a control unit 23. Note that the configuration illustrated in FIG. 3 is a functional configuration, and the hardware configuration may be different from the configuration illustrated in FIG. 3. Further, the function of the base station device 20 may be distributed and implemented in a plurality of physically separated configurations.

The radio communication unit 21 is a radio communication interface that radio-communicates with another radio communication device (for example, the terminal device 40 or the relay device 30). The radio communication unit 21 operates under the control of the control unit 23. The radio communication unit 21 supports one or a plurality of radio access schemes. For example, the radio communication unit 21 supports both NR and LTE. The radio communication unit 21 may support W-CDMA and cdma2000 in addition to NR and LTE. In addition, the radio communication unit 21 supports communication with NOMA. NOMA will be described in detail later.

The radio communication unit 21 includes a reception processing unit 211, a transmission processing unit 212, and an antenna 213. The radio communication unit 21 may include the reception processing unit 211, the transmission processing unit 212, and the antenna 213 in plural. Note that when the radio communication unit 21 supports a plurality of radio access schemes, the respective units of the radio communication unit 21 may be individually configured for each radio access scheme. For example, the reception processing unit 211 and the transmission processing unit 212 may be individually configured for LTE and NR, respectively.

The reception processing unit 211 processes an uplink signal received via the antenna 213. The reception processing unit 211 includes a radio reception unit 211a, a demultiplexing unit 211b, a demodulation unit 211c, and a decoding unit 211d.

The radio reception unit 211a performs down-conversion, removal of unnecessary frequency components, control of an amplification level, quadrature demodulation, conversion to a digital signal, removal of a guard interval, extraction of frequency domain signals using fast Fourier transform, and the like on an uplink signal. The demultiplexing unit 211b demultiplexes uplink channels such as Physical Uplink Shared Channel (PUSCH) and Physical Uplink Control Channel (PUCCH) and uplink reference signals from the signal output from the radio reception unit 211a. The demodulation unit 211c demodulates a received signal by applying a modulation scheme such as Binary Phase Shift Keying (BPSK) or Quadrature Phase shift Keying (QPSK) to the modulation symbol of the uplink channel. The modulation scheme used by the demodulation unit 211c may be 16 Quadrature Amplitude Modulation (QAM), 64QAM, or 256QAM. The decoding unit 211d performs a decoding process on the coded bits of the demodulated uplink channel. The decoded uplink data and uplink control information is output to the control unit 23.

The transmission processing unit 212 performs a transmission process on downlink control information and downlink data. The transmission processing unit 212 includes a coding unit 212a, a modulation unit 212b, a multiplexing unit 212c, and a radio transmission unit 212d.

The coding unit 212a codes the downlink control information and the downlink data input from the control unit 23 by using a coding scheme such as block coding, convolutional coding, or turbo coding. The modulation unit 212b modulates the coded bits output from the coding unit 212a by a predetermined modulation scheme such as BPSK, QPSK, 16QAM, 64QAM, or 256QAM. The multiplexing unit 212c multiplexes the modulation symbol and downlink reference signal of each channel and arranges these symbol and signal in a predetermined resource element. The radio transmission unit 212d performs various signal processing on the signal from the multiplexing unit 212c. For example, the radio transmission unit 212d performs processes such as conversion to the time domain by fast Fourier transform, addition of a guard interval, generation of a baseband digital signal, conversion to an analog signal, quadrature modulation, upconversion, removal of excessive frequency components, and power amplification. The signal generated by the transmission processing unit 212 is transmitted from the antenna 213.

The storage unit 22 is a storage device that can read and write data such as a DRAM, an SRAM, a flash memory, or a hard disk. The storage unit 22 functions as a storage unit of the base station device 20. The storage unit 22 stores "information related to transmission in unconnected state (information for unconnected transmission)" to be notified to the terminal device. "Information related to transmission in unconnected state (information for unconnected transmission)" will be described in detail later.

The control unit 23 is a controller that controls each unit of the base station device 20. The control unit 23 is implemented by, for example, a processor such as a central processing unit (CPU) or a micro processing unit (MPU). For example, the control unit 23 is implemented by the processor executing various programs stored in the storage device inside the base station device 20 using a random access memory (RAM) or the like as a work area. Note that the control unit 23 may be implemented by an integrated circuit such as an application specific integrated circuit (ASIC) or a field programmable gate array (FPGA). The CPU, MPU, ASIC, and FPGA can all be regarded as controllers.

As illustrated in FIG. 3, the control unit 23 includes an acquisition unit 231, a processing unit 232, a reception unit 233, a separation unit 234, and a transmission unit 235. Each of the blocks (the acquisition unit 231 to the transmission unit 235) constituting the control unit 23 is a functional block indicating the function of the control unit 23. These functional blocks may be software blocks or hardware blocks. For example, each of the functional blocks described above may be one software module implemented by software (including a microprogram), or may be one circuit block on a semiconductor chip (a die). It is needless to mention that each functional block may be one processor or one integrated circuit. Any method of configuring the functional block is used. Note that the control unit 23 may be configured with a functional unit different from the functional block described above. The operations of the respective blocks (the acquisition unit 231 to the transmission unit 235) constituting the control unit 23 are described later in the description of a transmission and reception process (Grant Based, Configured Grant, downlink), a transmission process (transmission in an unconnected state), and the like.

2-4. Configuration of Relay Device

Figure 4:
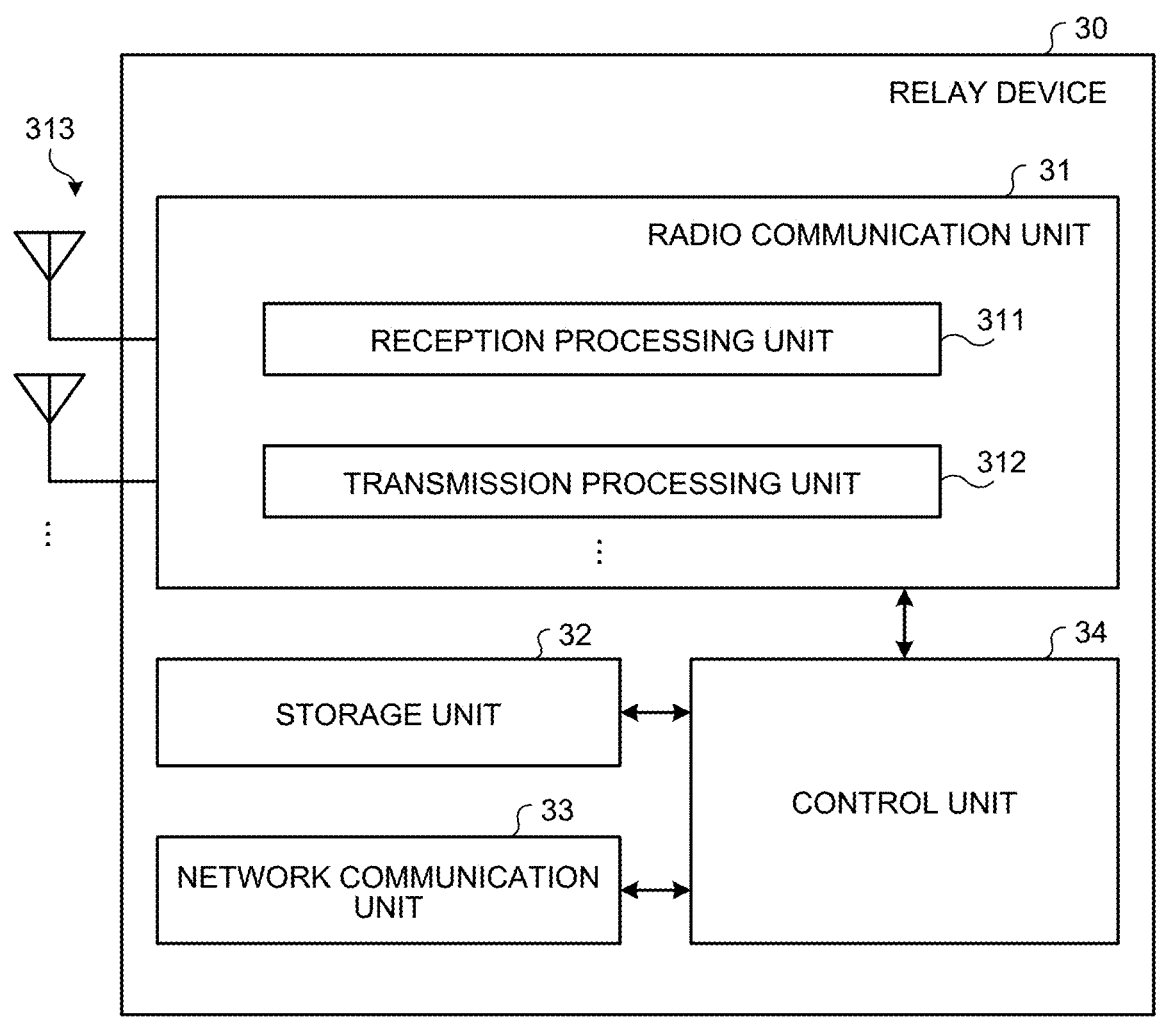
FIG. 4 is a diagram illustrating a configuration example of a relay device according to the embodiment of the present disclosure.

Next, the configuration of the relay device 30 will be described. FIG. 4 is a diagram illustrating a configuration example of the relay device 30 according to the embodiment of the present disclosure. The relay device 30 can perform NOMA communication with the terminal device 40. The relay device 30 includes a radio communication unit 31, a storage unit 32, a network communication unit 33, and a control unit 34. Note that the configuration illustrated in FIG. 4 is a functional configuration, and the hardware configuration may be different from the configuration illustrated in FIG. 4. Further, the function of the relay device 30 may be distributed and implemented in a plurality of physically separated configurations.

The radio communication unit 31 is a radio communication interface that radio-communicates with another radio communication device (for example, the base station device 20 or the terminal device 40). The radio communication unit 31 operates under the control of the control unit 34. The radio communication unit 31 includes a reception processing unit 311, a transmission processing unit 312, and an antenna 313. The configurations of the radio communication unit 31, the reception processing unit 311, the transmission processing unit 312, and the antenna 313 are similar to those of the radio communication unit 21, the reception processing unit 211, the transmission processing unit 212, and the antenna 213 in the base station device 20.

The storage unit 32 is a storage device that can read and write data such as a DRAM, an SRAM, a flash memory, or a hard disk. The storage unit 32 functions as a storage unit of the relay device 30. The configuration of the storage unit 32 is similar to that of the storage unit 22 in the base station device 20.

The network communication unit 33 is a communication interface for communicating with another device. For example, the network communication unit 33 is a LAN interface such as NIC. The network communication unit 33 may be a wired interface or a radio interface. The network communication unit 33 functions as a network communication unit of the relay device 30. The network communication unit 33 communicates with the base station device 20 under the control of the control unit 34.

The control unit 34 is a controller that controls each unit of the relay device 30. The configuration of the control unit 34 is similar to that of the control unit 23 in the base station device 20.

2-5. Configuration of Terminal Device

Figure 5:
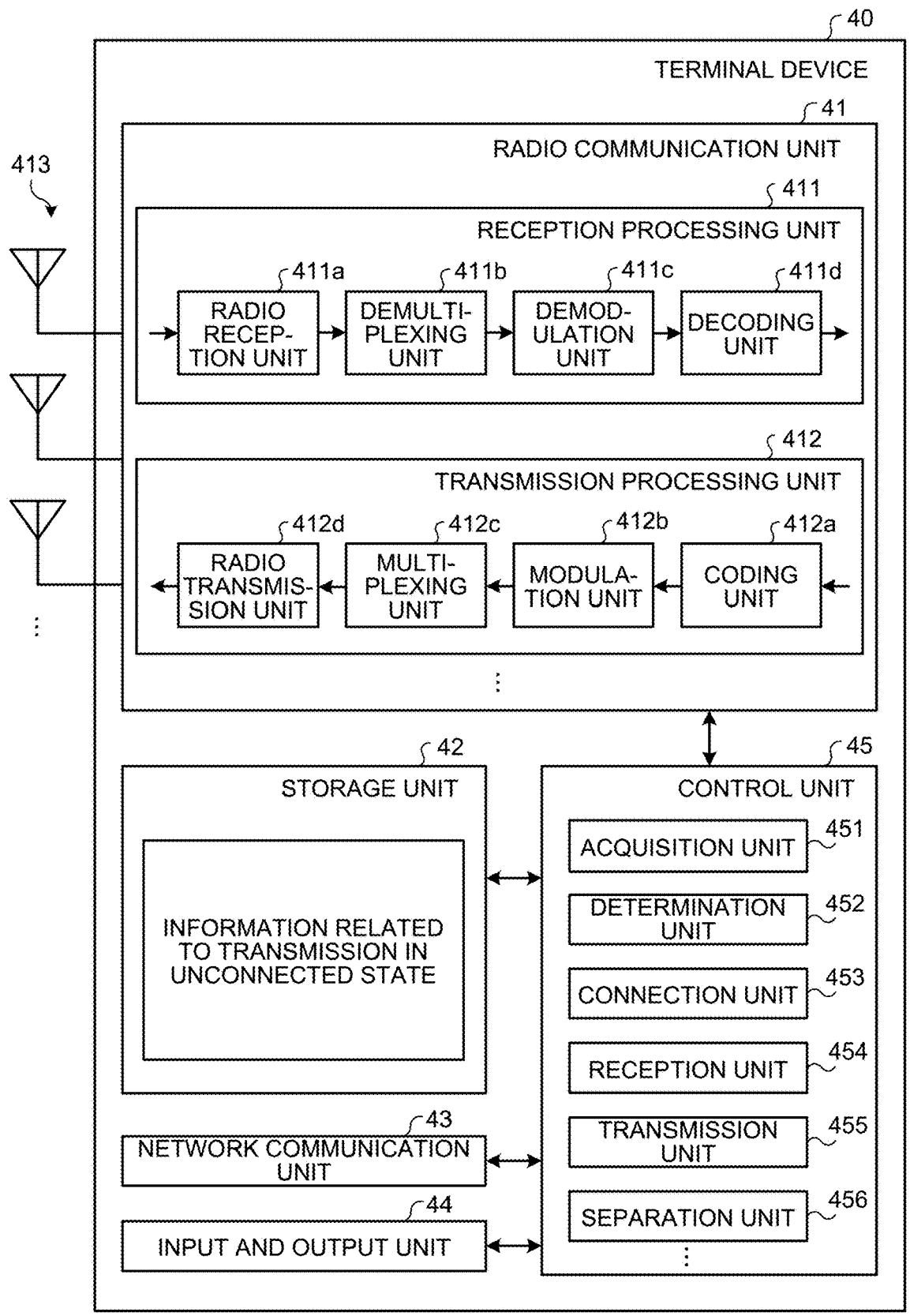
FIG. 5 is a diagram illustrating a configuration example of a terminal device according to the embodiment of the present disclosure.

Next, the configuration of the terminal device 40 will be described. FIG. 5 is a diagram illustrating a configuration example of the terminal device 40 according to the embodiment of the present disclosure. The terminal device 40 can perform NOMA communication with the base station device 20 and the relay device 30. The terminal device 40 includes a radio communication unit 41, a storage unit 42, a network communication unit 43, an input and output unit 44, and a control unit 45. Note that the configuration illustrated in FIG. 5 is a functional configuration, and the hardware configuration may be different from the configuration illustrated in FIG. 5. Further, the function of the terminal device 40 may be distributed and implemented in a plurality of physically separated configurations.

The radio communication unit 41 is a radio communication interface that radio-communicates with another radio communication device (for example, the base station device 20 or the relay device 30). The radio communication unit 41 operates under the control of the control unit 45. The radio communication unit 41 supports one or a plurality of radio access schemes. For example, the radio communication unit 41 supports both NR and LTE. The radio communication unit 41 may support W-CDMA and cdma2000 in addition to NR and LTE. In addition, the radio communication unit 21 supports communication with NOMA. NOMA will be described in detail later.

The radio communication unit 41 includes a reception processing unit 411, a transmission processing unit 412, and an antenna 413. The radio communication unit 41 may include the reception processing unit 411, the transmission processing unit 412, and the antenna 413 in plural. Note that when the radio communication unit 41 supports a plurality of radio access schemes, the respective units of the radio communication unit 41 may be individually configured for each radio access scheme. For example, the reception processing unit 411 and the transmission processing unit 412 may be individually configured for LTE and NR, respectively.

The reception processing unit 411 processes a downlink signal received via the antenna 413. The reception processing unit 411 includes a radio reception unit 411a, a demultiplexing unit 411b, a demodulation unit 411c, and a decoding unit 411d.

The radio reception unit 411a performs down-conversion, removal of unnecessary frequency components, control of an amplification level, quadrature demodulation, conversion to a digital signal, removal of a guard interval, extraction of frequency domain signals using fast Fourier transform, and the like on a downlink signal. The demultiplexing unit 411b demultiplexes a downlink channel, a downlink synchronization signal, and a downlink reference signal from the signal output from the radio reception unit 411a. The downlink channel is, for example, a channel such as Physical Broadcast Channel (PBCH), Physical Downlink Shared Channel (PDSCH), or Physical Downlink Control Channel (PDCCH). The demodulation unit 211c demodulates a received signal by applying a modulation scheme such as BPSK, QPSK, 16QAM, 64QAM, or 256QAM to the modulation symbol of downlink channel. The decoding unit 411d performs a decoding process on the coded bits of the demodulated downlink channel. The decoded downlink data and downlink control information is output to the control unit 45.

The transmission processing unit 412 performs a transmission process on uplink control information and uplink data. The transmission processing unit 412 includes a coding unit 412a, a modulation unit 412b, a multiplexing unit 412c, and a radio transmission unit 412d.

The coding unit 412a codes the uplink control information and the uplink data input from the control unit 45 by using a coding scheme such as block coding, convolutional coding, or turbo coding. The modulation unit 412b modulates the coded bits output from the coding unit 412a by a predetermined modulation scheme such as BPSK, QPSK, 16QAM, 64QAM, or 256QAM. The multiplexing unit 412c multiplexes the modulation symbol and uplink reference signal of each channel and arranges these symbol and signal in a predetermined resource element. The radio transmission unit 412d performs various signal processing on the signal from the multiplexing unit 412c. For example, the radio transmission unit 412d performs processes such as conversion to the time domain by inverse fast Fourier transform, addition of a guard interval, generation of a baseband digital signal, conversion to an analog signal, quadrature modulation, upconversion, removal of excessive frequency components, and power amplification. The signal generated by the transmission processing unit 412 is transmitted from the antenna 413.

The storage unit 42 is a storage device that can read and write data such as a DRAM, an SRAM, a flash memory, or a hard disk. The storage unit 42 functions as a storage unit of the terminal device 40. The storage unit 42 stores "information related to transmission in unconnected state (information for unconnected transmission)" acquired from the base station device 20. "Information related to transmission in unconnected state (information for unconnected transmission)" will be described in detail later.

The network communication unit 43 is a communication interface for communicating with another device. For example, the network communication unit 43 is a LAN interface such as NIC. The network communication unit 43 may be a wired interface or a radio interface. The network communication unit 43 functions as a network communication unit of the terminal device 40. The network communication unit 43 communicates with the other device under the control of the control unit 45.

The input and output unit 44 is a user interface for exchanging information with a user. For example, the input and output unit 44 is an operation device for the user to perform various operations such as a keyboard, a mouse, operation keys, or a touch panel. Alternatively, the input and output unit 44 is a display device such as a liquid crystal display or an organic electroluminescence display (organic EL display). The input and output unit 44 may be an audio device such as a speaker or a buzzer. Alternatively, the input and output unit 44 may be a lighting device such as a light emitting diode (LED) lamp. The input and output unit 44 functions as an input and output unit (an input unit, an output unit, an operation unit, or a notification unit) of the terminal device 40.

The control unit 45 is a controller that controls each unit of the terminal device 40. The control unit 45 is implemented by, for example, a processor such as a CPU or an MPU. For example, the control unit 45 is implemented by the processor executing various programs stored in the storage device inside the terminal device 40 using a RAM or the like as a work area. Note that the control unit 45 may be implemented by an integrated circuit such as an ASIC or an FPGA. The CPU, MPU, ASIC, and FPGA can all be regarded as controllers.

As illustrated in FIG. 5, the control unit 45 includes an acquisition unit 451, a determination unit 452, a connection unit 453, a reception unit 454, a transmission unit 455, and a separation unit 456. Each of the blocks (the acquisition unit 451 to the separation unit 456) constituting the control unit 45 is a functional block indicating the function of the control unit 45. These functional blocks may be software blocks or hardware blocks. For example, each of the functional blocks described above may be one software module implemented by software (including a microprogram), or may be one circuit block on a semiconductor chip (a die). It is needless to mention that each functional block may be one processor or one integrated circuit. Any method of configuring the functional block is used. Note that the control unit 45 may be configured with a functional unit different from the functional block described above. The operations of the respective blocks (the acquisition unit 451 to the separation unit 456) constituting the control unit 45 are described later in the description of the transmission and reception process (Grant Based, Configured Grant, downlink), the transmission process (the transmission in an unconnected state), and the like.

2-6. Radio Frame Configuration

Next, the radio frame configuration in the radio access network RAN will be described.

Figure 6:
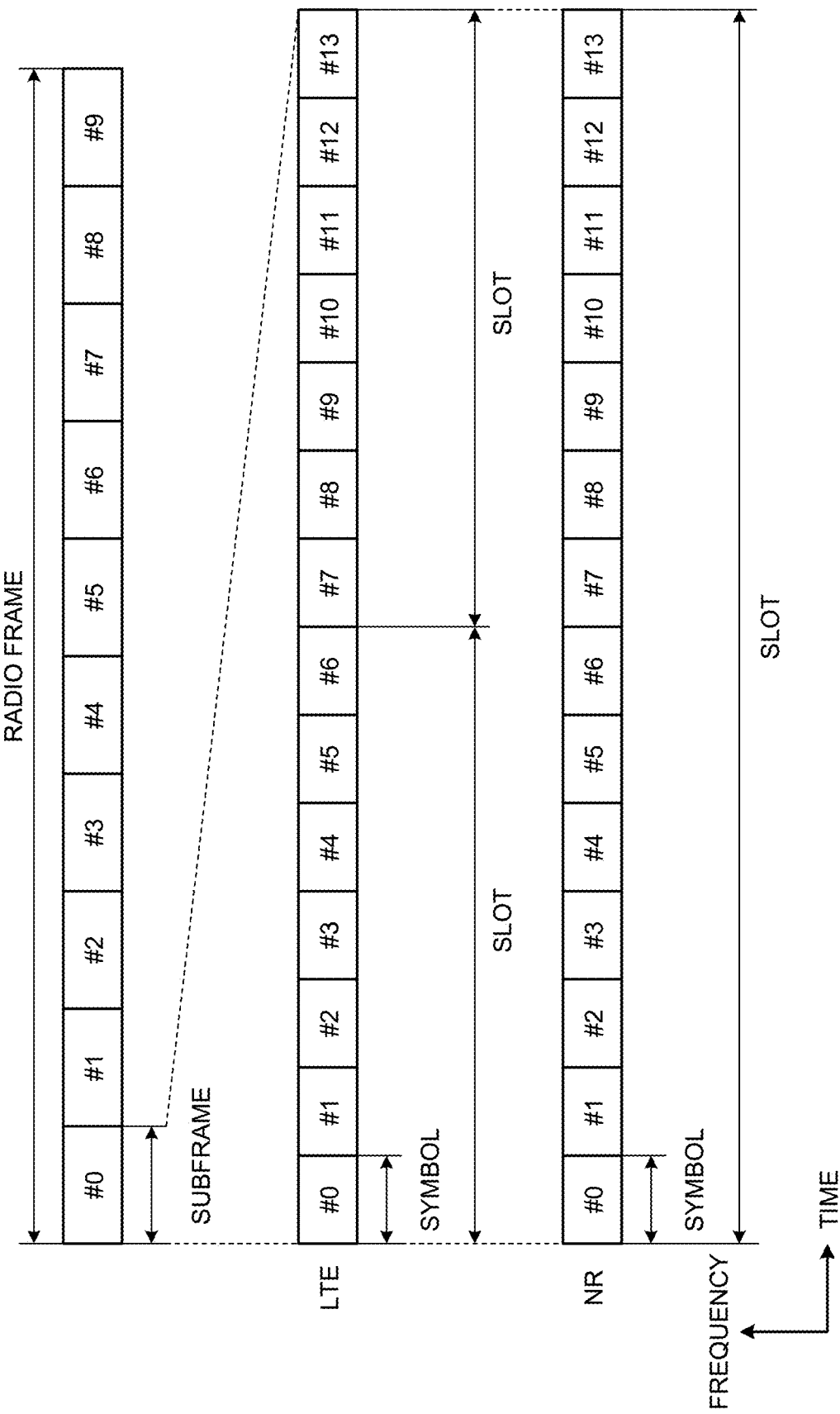
FIG. 6 is a diagram illustrating a radio frame configuration used in a radio access network according to the embodiment of the present disclosure.

FIG. 6 is a diagram illustrating a radio frame configuration used in the radio access network RAN according to the embodiment of the present disclosure. The radio access network RAN defines a radio frame of 10 ms. One radio frame is composed of ten subframes. The time interval of the subframe is 1 ms. The subframe is composed of, for example, 14 symbols. Here, the symbol is, for example, an OFDM symbol or an SC-FDMA symbol. In LTE, for example, one slot is composed of seven symbols. In NR, for example, one slot is composed of 14 symbols. The LTE and NR subframe configurations will be described below.

[LTE Subframe Configuration]

Figure 7:
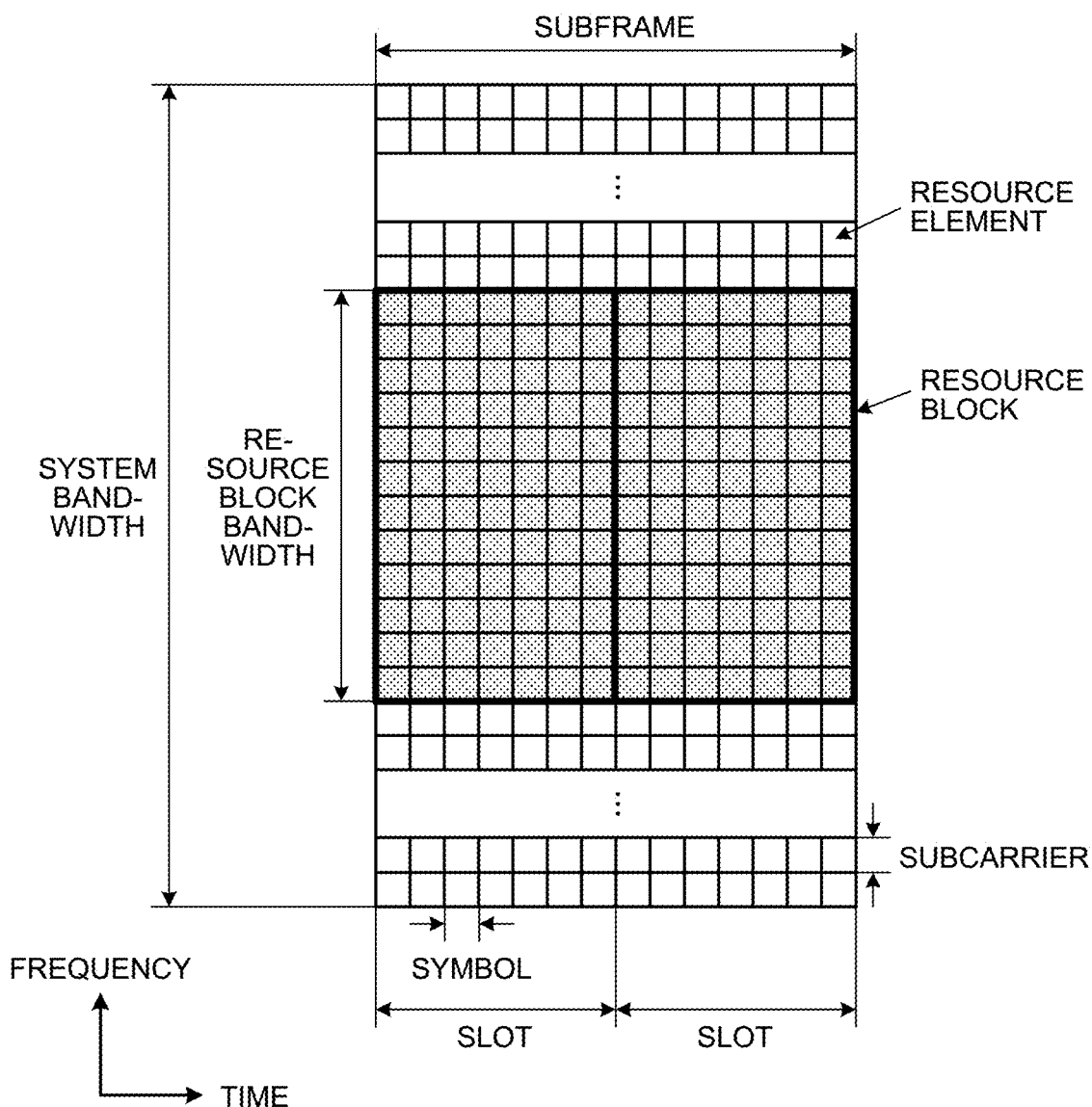
FIG. 7 is a diagram illustrating an example of an LTE subframe configuration.

FIG. 7 is a diagram illustrating an example of an LTE subframe configuration. In the example of FIG. 7, a resource grid with frequency on the vertical axis and time on the horizontal axis is illustrated. In the example illustrated in FIG. 7, the system bandwidth means the bandwidth of an LTE cell. Each of a plurality of grids in the resource grid represents a resource element. The size of one resource element is one subcarrier in a frequency direction and one symbol in a time direction. In the case of LTE, one slot is defined by a plurality of symbols. The number of symbols in one slot is determined by the type of Cyclic Prefix (CP). The type of CP is a normal CP or an extended CP. In the normal CP, the number of symbols constituting one slot is seven. In the extended CP, the number of symbols constituting one slot is six.

The resource block is used to map a physical channel (PDSCH, PUSCH, or the like) to a resource element. One resource block is defined by a predetermined number of subcarriers continuous in the frequency domain and a predetermined number of symbols continuous in the time domain. The number of symbols and the number of subcarriers (the bandwidth of a resource block) in one resource block are determined on the basis of the CP type, a subcarrier spacing and/or parameters set by an upper layer in the cell. For example, if the CP type is a normal CP and the subcarrier spacing is 15 kHz, the number of symbols is seven and the number of subcarriers is 12 in one resource block. In this case, one resource block is composed of (7×12) resource elements.

In each of LTE cells, one predetermined parameter is used in a certain subframe. The predetermined parameter is, for example, a parameter (a physical parameter) related to a transmission signal. The parameters related to a transmission signal include a CP length, a subcarrier spacing, the number of symbols in one subframe (a predetermined time length), the number of subcarriers in one resource block (a predetermined frequency band), a multiple access scheme, a signal waveform, and the like. In the LTE cell, link signals (downlink and uplink signals) are generated over a predetermined time length (for example, a subframe) with one predetermined parameter.

[NR Frame Configuration]

Figure 8:
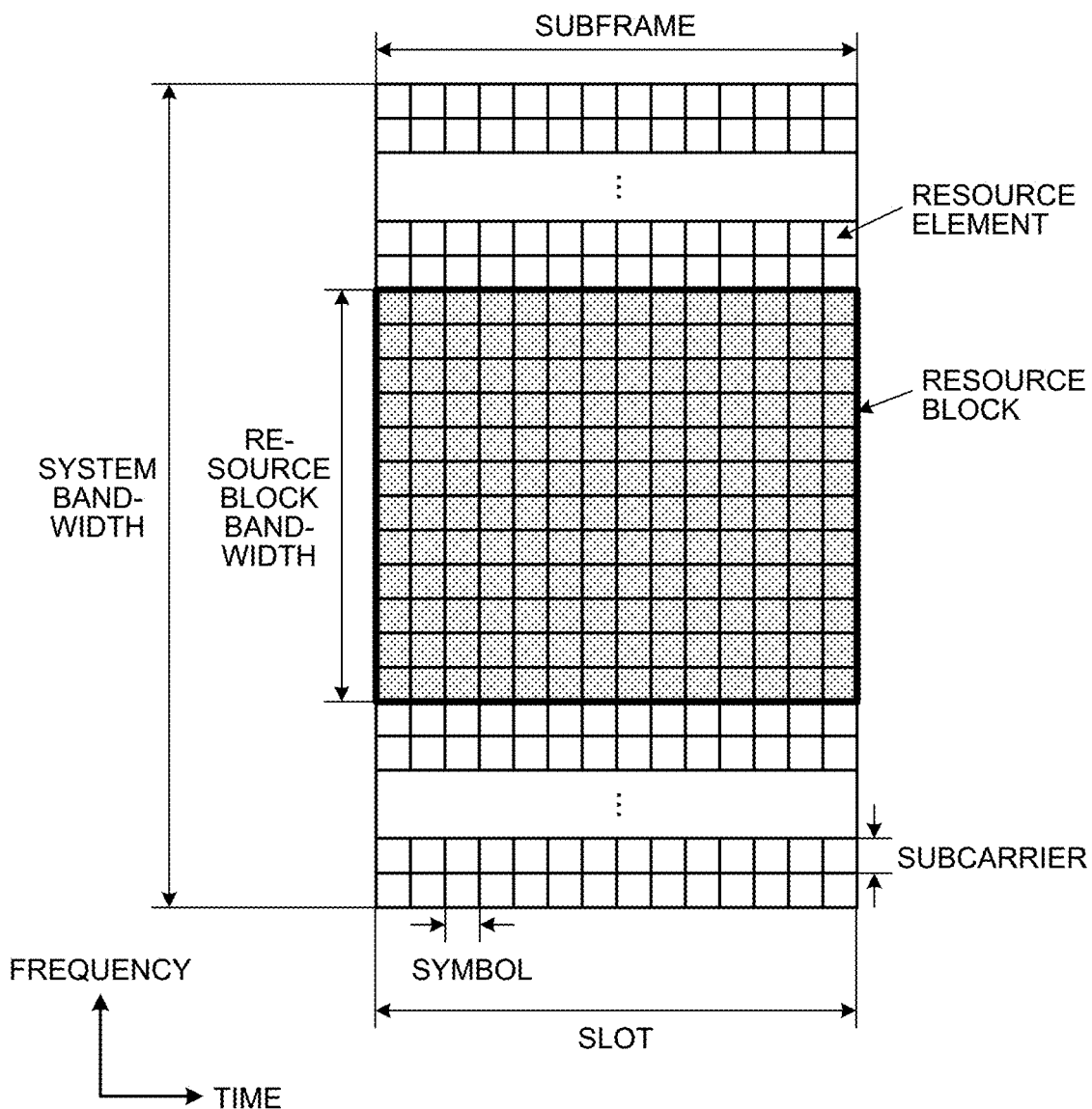
FIG. 8 is a diagram illustrating an example of an NR subframe configuration.

FIG. 8 is a diagram illustrating an example of an NR subframe configuration. In the example illustrated in FIG. 8, the system bandwidth means the bandwidth of an NR cell. In the case of the NR cell, one or more predetermined parameters are used in a predetermined time length (for example, a subframe). That is, in the NR cell, the link signal is generated over a predetermined time length using one or more predetermined parameters. When a plurality of predetermined parameters are used, the signals generated by using the predetermined parameters are multiplexed by a predetermined method. The predetermined method includes, for example, Frequency Division Multiplexing (FDM), Time Division Multiplexing (TDM), Code Division Multiplexing (CDM) and/or Spatial Division Multiplexing (SDM).

A plurality of types of combinations of predetermined parameters set in the NR cell can be specified in advance as a parameter set. FIG. 9 is a diagram illustrating an example of a parameter set related to a transmission signal in an NR cell. In the example of FIG. 9, the parameters are "subcarrier spacing", "maximum bandwidth" of a component carrier, "CP length type", "number of symbols" per subframe, and "number of subcarriers" per resource block in an NR cell. One of the parameters may be "radio frame length". Note that "CP length type" is a CP length type used in the NR cell. For example, CP length type 1 corresponds to a normal CP in LTE, and CP length type 2 corresponds to an extended CP in LTE. The parameter set related to a transmission signal in the NR cell can be specified individually for a downlink and an uplink. Alternatively, the parameter set related to a transmission signal in the NR cell can be set independently for the downlink and the uplink.

In the example of FIG. 9, as parameter set 0, 15 kHz (the subcarrier spacing), 20 MHz (the maximum bandwidth), type 1 (the CP length type), 14 (the number of symbols), 1 ms (the subframe length), 10 ms (the radio frame length), and 12 (the number of subcarriers) are specified. In addition, as parameter set 1, 7.5 kHz (the subcarrier spacing), 1.4 MHz (the maximum bandwidth), type 1 (the CP length type), 70 (the number of symbols), 10 ms (the subframe length), 10 ms (the radio frame length), and 24 (the number of subcarriers) are specified. Further, as parameter set 2, 30 kHz (the subcarrier spacing), 80 MHz (the maximum bandwidth), type 1 (the CP length type), 7 (the number of symbols), 0.25 ms (the subframe length), 10 ms (the radio frame length), and 6 (the number of subcarriers) are specified. Furthermore, as parameter set 3, 15 kHz (the subcarrier spacing), 20 MHz (the maximum bandwidth), type 2 (the CP length type), 12 (the number of symbols), 1 ms (the subframe length), 10 ms (the radio frame length), and 12 (the number of subcarriers) are specified.

Figure 10:
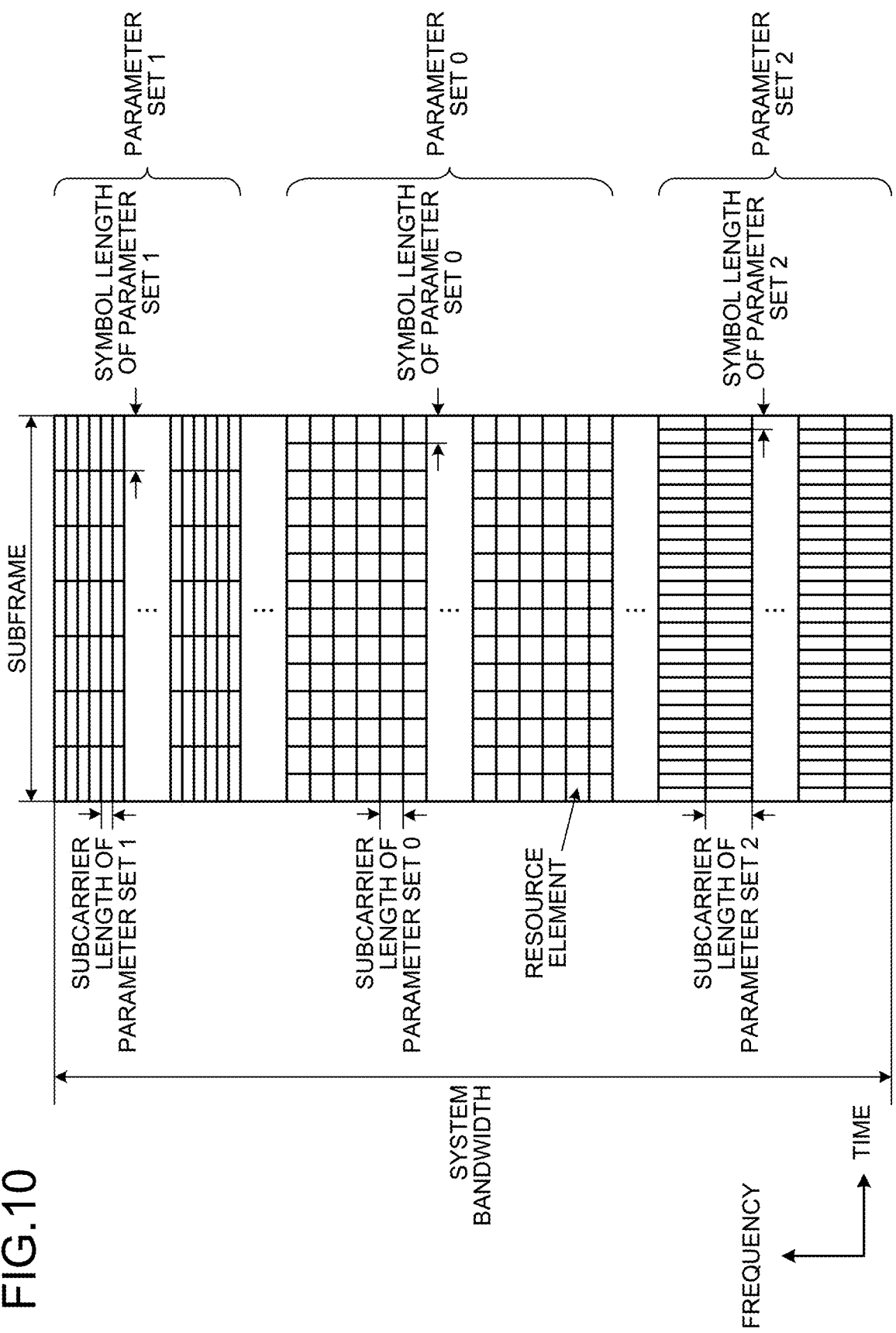
FIG. 10 is a diagram illustrating an example of an NR downlink subframe.

FIG. 10 is a diagram illustrating an example of an NR downlink subframe. In the example of FIG. 10, the signals generated using parameter set 1, parameter set 0, and parameter set 2 are subjected to frequency division multiplexing (FDM) in a cell bandwidth (a system bandwidth).

3. ABOUT NOMA

One of the technologies studied in NR is non-orthogonal multiple access (NOMA). This is a technology to improve frequency utilization efficiency by using non-orthogonal resources in addition to orthogonal resources.

Orthogonal resources include, for example, a time (for example, a subframe, a slot, or a radio frame), a frequency (for example, a component carrier, a subcarrier, a subchannel, or a resource block), a quadrature code, and the like. In addition, non-orthogonal resources include, for example, space, power, interleaving (for example, bit interleaving or symbol interleaving), a data rate, a code (for example, a sparse code or a spreading codebook), and the like. Here, the space includes, for example, a spatial stream, a spatial layer, a spatial codebook, an antenna, an antenna port, and the like. The orthogonal and non-orthogonal resources are not limited to the examples described above. In the following description, communication (transmission, reception, or both) using non-orthogonal resources is referred to as NOMA communication in some cases.

As described above, the communication device of the present embodiment can transmit user data in an unconnected state. By using NOMA communication in order to transmit the user data in an unconnected state, the frequency utilization efficiency is further improved.

Note that in orthogonal multiple access (OMA), for example, data is transmitted and received using a frequency axis and a time axis orthogonal to each other. In this case, the frame configuration of the frequency and time resources is determined by the subcarrier spacing, and resources more than the number of resource elements cannot be used. On the other hand, in non-orthogonal multiple access (NOMA), the frame configuration is determined by adding a non-orthogonal axis (for example, an Interleave pattern axis, a Spreading Pattern axis, a Scrambling Pattern axis, a Codebook axis, a Power axis, or the like) to the frequency axis and the time axis orthogonal to each other.

3-1. Data Transmission and Reception with NOMA

Figure 11:
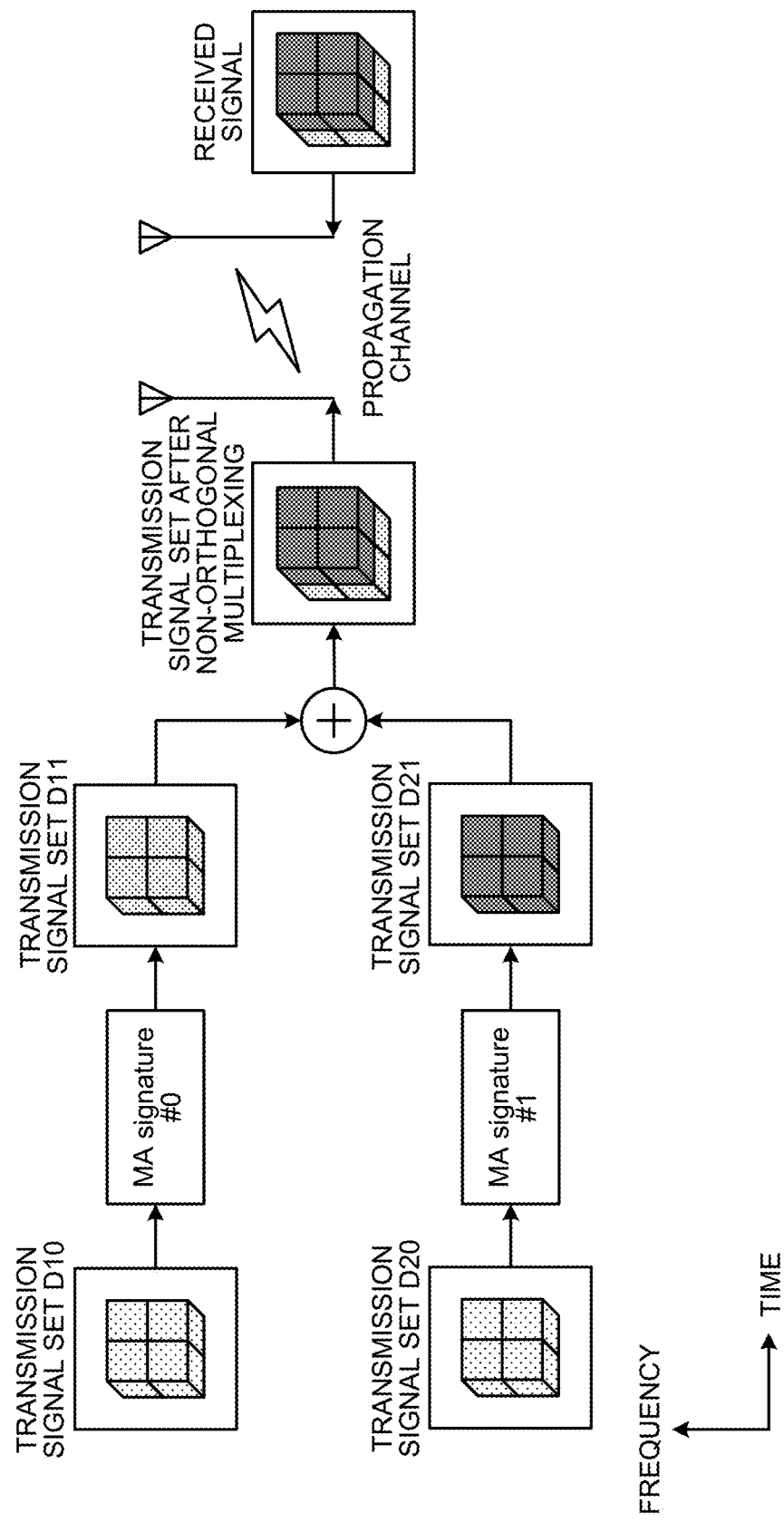
FIG. 11 is an explanatory diagram illustrating an example of a NOMA transmission process according to the embodiment of the present disclosure.

FIG. 11 is an explanatory diagram illustrating an example of a NOMA transmission process according to the embodiment of the present disclosure. The example of FIG. 11 illustrates a state where a transmission device multiplexes and transmits transmission signals on non-orthogonal axes. In the example of FIG. 11, all the resources multiplexed on non-orthogonal axes have the same parameter set. Here, the transmission device is a communication device such as the base station device 20, the relay device 30, or the terminal device 40. In the example of FIG. 11, one transmission device (for example, the terminal device $40_1$) multiplexes two sets of transmission signals.

Note that the NOMA transmission process to be described below is achieved by, for example, the control unit 45 (for example, the connection unit 453 and the transmission unit 455) of the terminal device 40 controlling the transmission processing unit 412. Alternatively, the transmission process to be described below is achieved by, for example, the control unit 23 (for example, the processing unit 232 and the transmission unit 235) of the base station device 20 controlling the transmission processing unit 212.

The transmission signal set includes, for example, signals generated by performing signal processing for radio communication on all or part of transmission data generated in a communication device. That is, the transmission signal set is transmission data (all or part of the transmission data) that have undergone the signal processing for radio communication. Here, the transmission data is data related to one process, the data being generated in the communication device. For example, transmission data is data related to one transmission job generated in various programs (for example, an application program and an operating system) executed by the communication device.

Note that in the present embodiment, the transmission data is divided into a plurality of pieces of data. In the following description, the data that functions as the transmission unit (the division unit) of the transmission data is referred to as "transmission unit data". Here, the transmission unit data may be one IP packet or one transport block. It is needless to mention that the transmission unit data may be another transmission unit. The transport block is a unit of error correction such as Hybrid Automatic Repeat reQuest (ARQ) (HARQ). For example, the transport block is a block of data in a transport channel (a transport layer). Note that the transmission signal set may be a signal (transmission unit data) generated by performing signal processing on transmission unit data such as a transport block. In the following description, it is assumed that the transmission signal set is data in which transmission unit data such as a transport block has undergone signal processing for radio communication with OFDM.

The transmission signal set (the transmission unit data) may be composed of a plurality of blocks or a plurality of elements. For example, assuming that the transmission signal set is a transport block. In this case, the transmission signal set (the transmission unit data) may be composed of a plurality of resource blocks or a plurality of resource elements. In the following example, it is assumed that the transmission signal set is composed of a plurality of blocks. In the example of FIG. 11, transmission signal sets D10 and D20 are each composed of four blocks (for example, resource blocks).

In the example of FIG. 11, the transmission device applies the corresponding Multiple Access signature (MA signature) to each of the transmission signal sets D10 and D20. The MA signature is one of the information related to non-orthogonal multiplexing. The MA signature includes, for example, Interleave Pattern, Spreading Pattern, Scrambling Pattern, Codebook, Power Allocation, and the like. Note that the MA signature may be simply called Pattern or Index. For example, the MA signature may be an identifier indicating Pattern or Index used in the NOMA transmission as described above, or may represent Pattern itself. In the following description, applying the MA signature to a predetermined transmission signal set may be referred to as "NOMA transmission process using MA signature". An example of the NOMA transmission process using a MA signature is a process of converting a predetermined transmission signal set mapped on a predetermined orthogonal resource into a transmission signal set that can be transmitted using the non-orthogonal resource indicated by the MA signature.

In the example of FIG. 11, the transmission device (for example, the control unit 45 of the terminal device $40_1$) performs the NOMA transmission process that applies MA signature #0 to the transmission signal set D10, and performs the NOMA transmission process that applies MA signature #1 to the transmission signal set D20. The MA signature #0 and the MA signature #1 are non-orthogonal resources corresponding to each other. For example, assuming that the MA signature is Power Allocation (that is, the non-orthogonal axis is a Power axis). In this case, the MA signature #0 may be information to convert a predetermined transmission signal set into a transmission signal set with small power (for example, power equal to or less than a first threshold value). Further, the MA signature #1 may be information to convert a predetermined transmission signal set into a transmission signal set with large power (for example, power equal to or more than a second threshold value, which is greater than the first threshold value). The transmission device multiplexes signals having the MA signature applied thereto on the same frequency and time resource. For example, the transmission device non-orthogonally multiplexes transmission signal sets D11 and D21 generated as a result of the NOMA transmission process on the same orthogonal resource. The transmission device (for example, the transmission unit 455 of the terminal device $40_1$) then transmits a non-orthogonal multiplexed transmission signal to an antenna port.

Note that in the example of FIG. 11, the transmission device multiplexes two transmission signal sets. However, the transmission device may multiplex three or more transmission signal sets. Further, each transmission signal set may be a transmission signal to a separate reception device or a transmission signal to the same reception device. Here, the reception device is a communication device such as the base station device 20, the relay device 30, or the terminal device 40.

Figure 12:
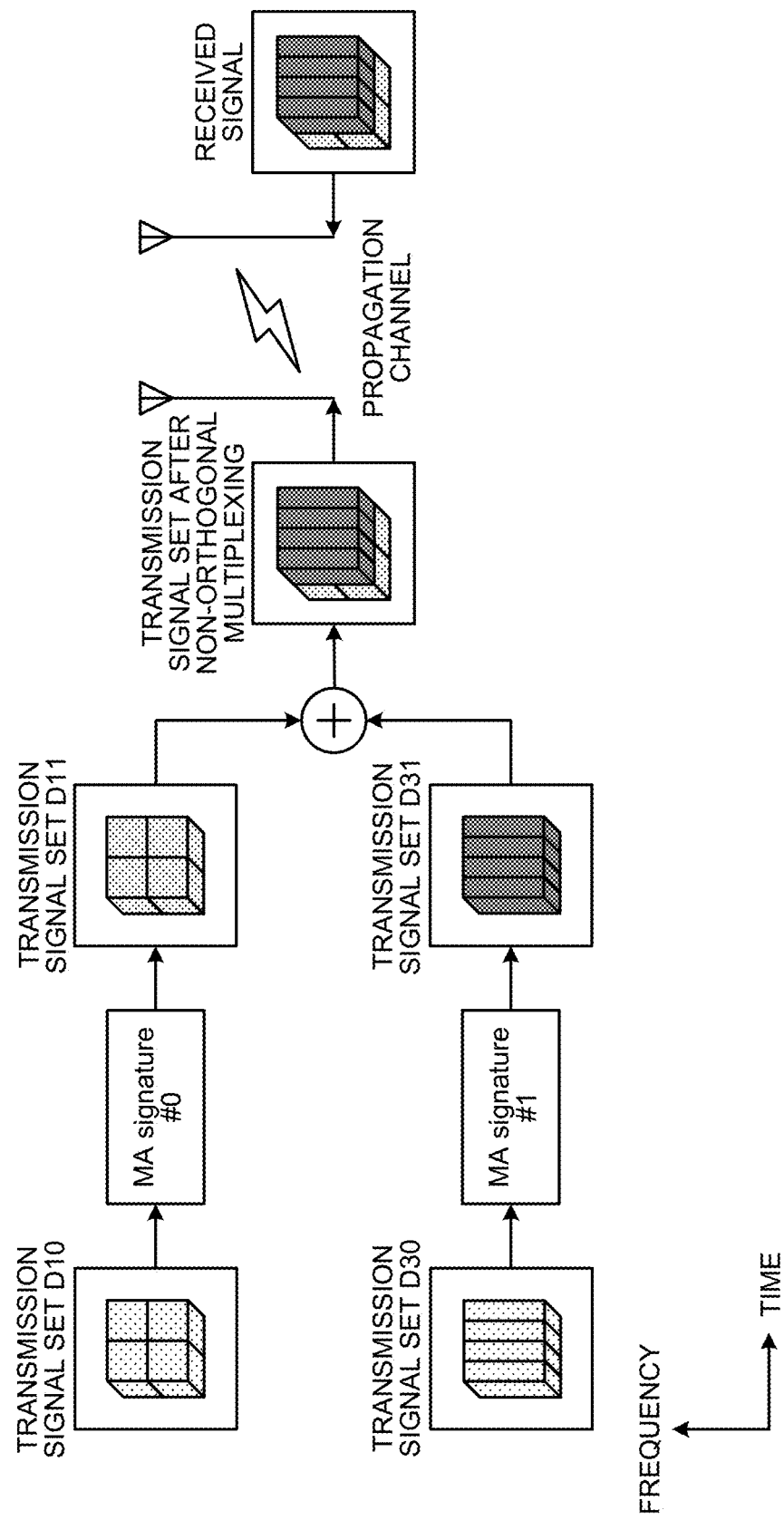
FIG. 12 is an explanatory diagram illustrating an example of the NOMA transmission process according to the embodiment of the present disclosure.

Furthermore, in the example of FIG. 11, the transmission device multiplexes transmission signal sets with the same parameter set. However, the transmission device may multiplex transmission signal sets with different parameter sets. FIG. 12 is an explanatory diagram illustrating an example of the NOMA transmission process according to the embodiment of the present disclosure. In the example of FIG. 12, two transmission signal sets with different parameter sets are multiplexed. Specifically, in the example of FIG. 12, the transmission device (for example, the control unit 45 of the terminal device $40_1$) performs the NOMA transmission process using MA signatures (the MA signatures #0 and #1) corresponding to transmission signal sets D10 and D30, respectively. Transmission signal sets D30 and D40 are transmission signal sets with different parameter sets. The transmission device then non-orthogonally multiplexes transmission signal sets D11 and D31 generated as a result of the NOMA transmission process on the same orthogonal resource. After that, the transmission device (for example, the transmission unit 455 of the terminal device $40_1$) transmits a non-orthogonal multiplexed transmission signal to an antenna port.

Figure 13:
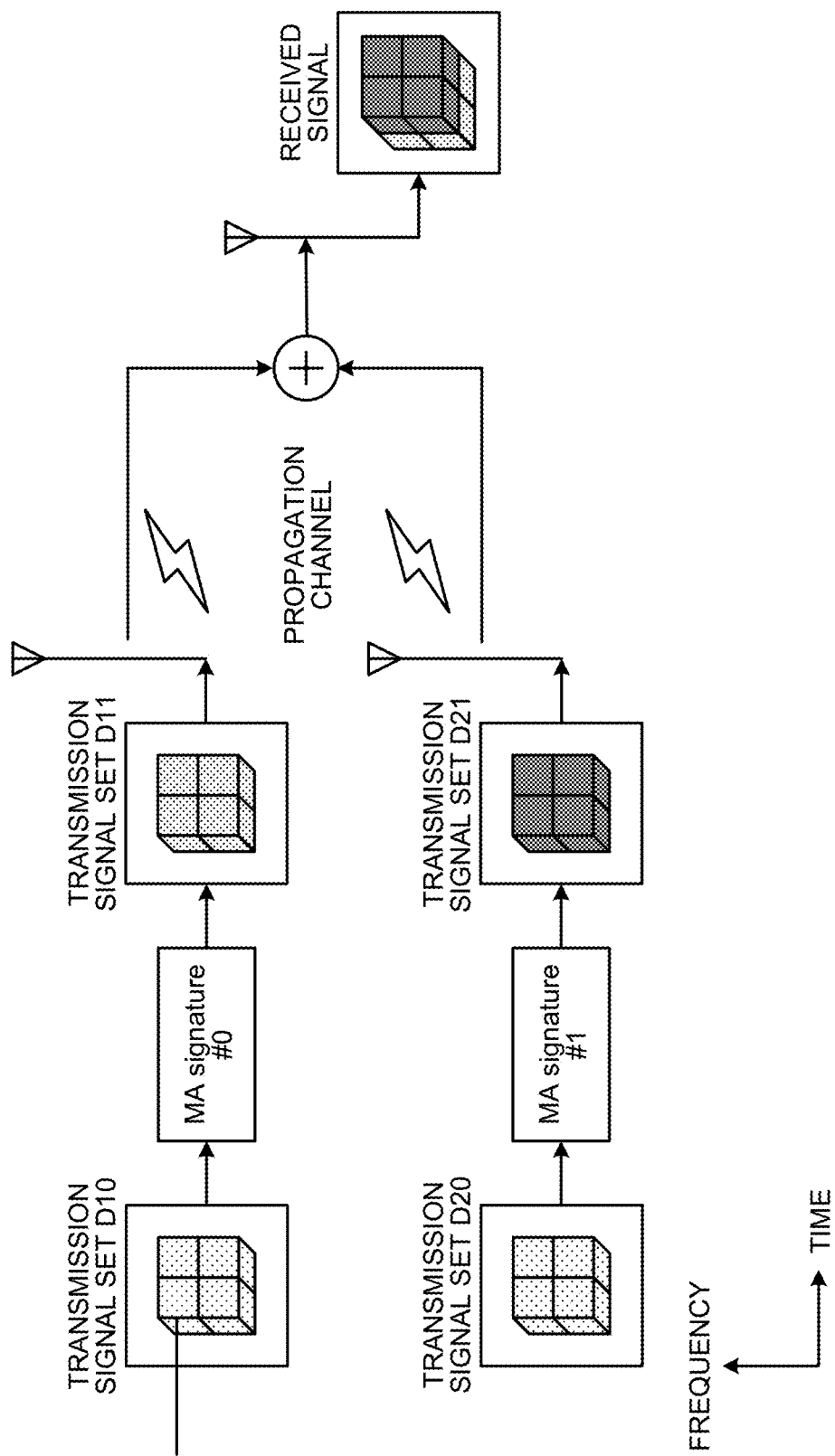
FIG. 13 is an explanatory diagram illustrating an example of the NOMA transmission process according to the embodiment of the present disclosure.

Note that in the examples of FIGS. 11 and 12, a plurality of transmission signal sets are non-orthogonal multiplexed in the transmission device. However, the transmission signal sets may be non-orthogonal multiplexed in a propagation channel. FIG. 13 is an explanatory diagram illustrating an example of the NOMA transmission process according to the embodiment of the present disclosure. In the example of FIG. 13, two transmission signal sets are transmitted from different antennas. The transmission signal sets may be transmitted from separate transmission devices (for example, the terminal devices $40_1$ and $40_2$) or may be transmitted from different antennas of one transmission device (for example, the terminal device $40_1$). It is assumed in the following description that two transmission signal sets are transmitted from different transmission devices, but it is needless to mention that the two transmission signal sets may be transmitted from one transmission device.

In the example of FIG. 13, one transmission device (for example, the terminal device $40_1$) performs the NOMA transmission process that applies the MA signature #0 to the transmission signal set D10. Further, the other transmission device (for example, the terminal device $40_2$) performs the NOMA transmission process that applies the MA signature #1 to the transmission signal set D20. The MA signature #0 and the MA signature #1 are non-orthogonal resources corresponding to each other. The MA signature includes, for example, Interleave Pattern, Spreading Pattern, Scrambling Pattern, Codebook, Power Allocation, Repetition, and the like. The transmission signal sets D11 and D21 having the MA signature applied thereto are transmitted on the same frequency and time resource, and are multiplexed through the propagation channel.

Figure 14:
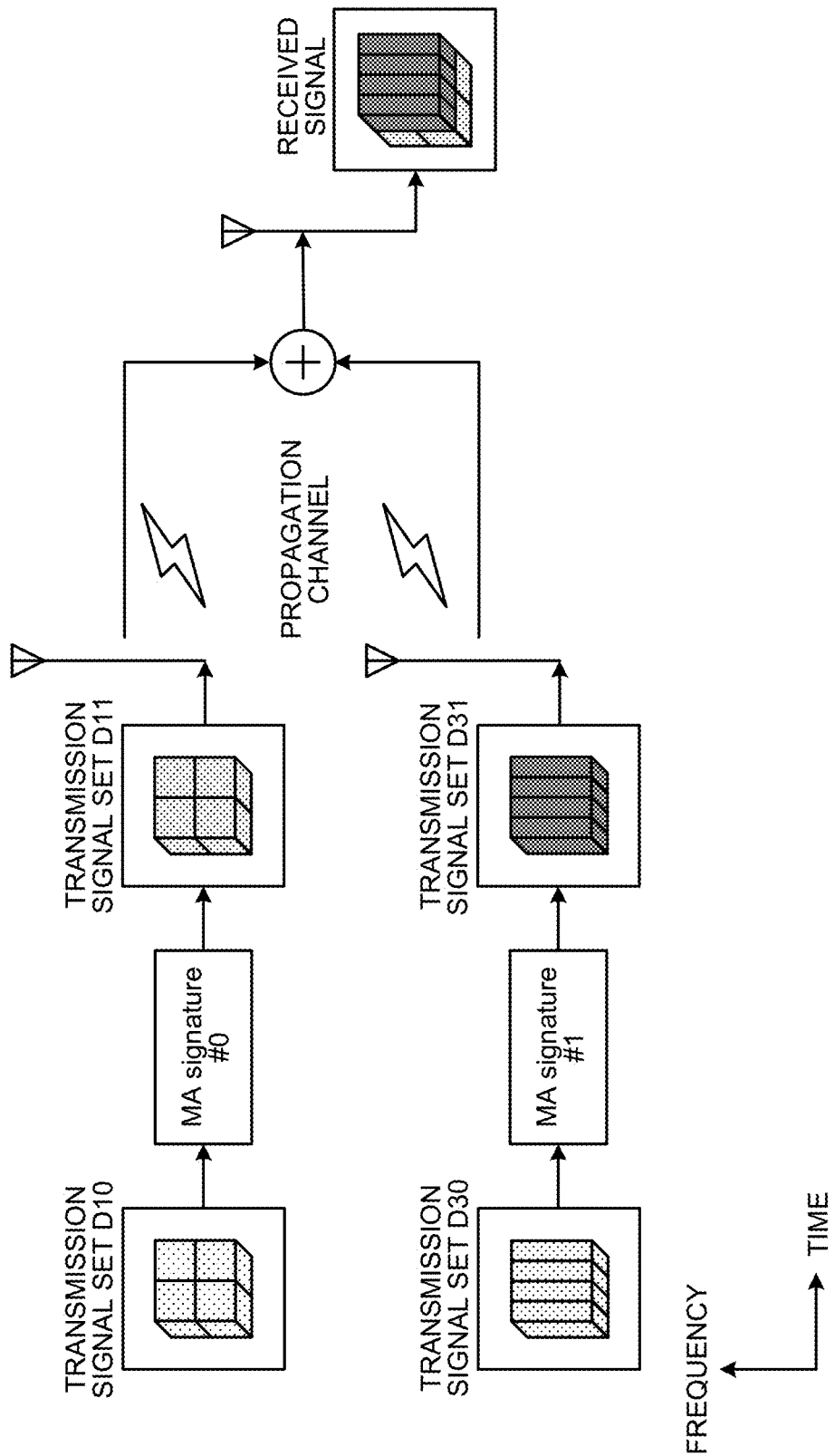
FIG. 14 is an explanatory diagram illustrating an example of the NOMA transmission process according to the embodiment of the present disclosure.

Further, in the example of FIG. 13, transmission signal sets with the same parameter set are multiplexed. However, the transmission signal sets to be multiplexed may be transmission signal sets with different parameter sets. FIG. 14 is an explanatory diagram illustrating an example of the NOMA transmission process according to the embodiment of the present disclosure. In the example of FIG. 14, two transmission signal sets with different parameter sets are multiplexed. Specifically, in the example of FIG. 14, one transmission device (for example, the terminal device $40_1$) performs the NOMA transmission process that applies the MA signature #0 to the transmission signal set D10. The other transmission device (for example, the terminal device $40_2$) performs the NOMA transmission process that applies the MA signature #1 to the transmission signal set D30. The transmission signal sets D10 and D30 are transmission signal sets with different parameter sets. Further, the MA signature #0 and the MA signature #1 are non-orthogonal resources corresponding to each other. The transmission signal sets D11 and D31 having the MA signature applied thereto are transmitted on the same frequency and time resource, and are multiplexed through the propagation channel.

Figure 15:
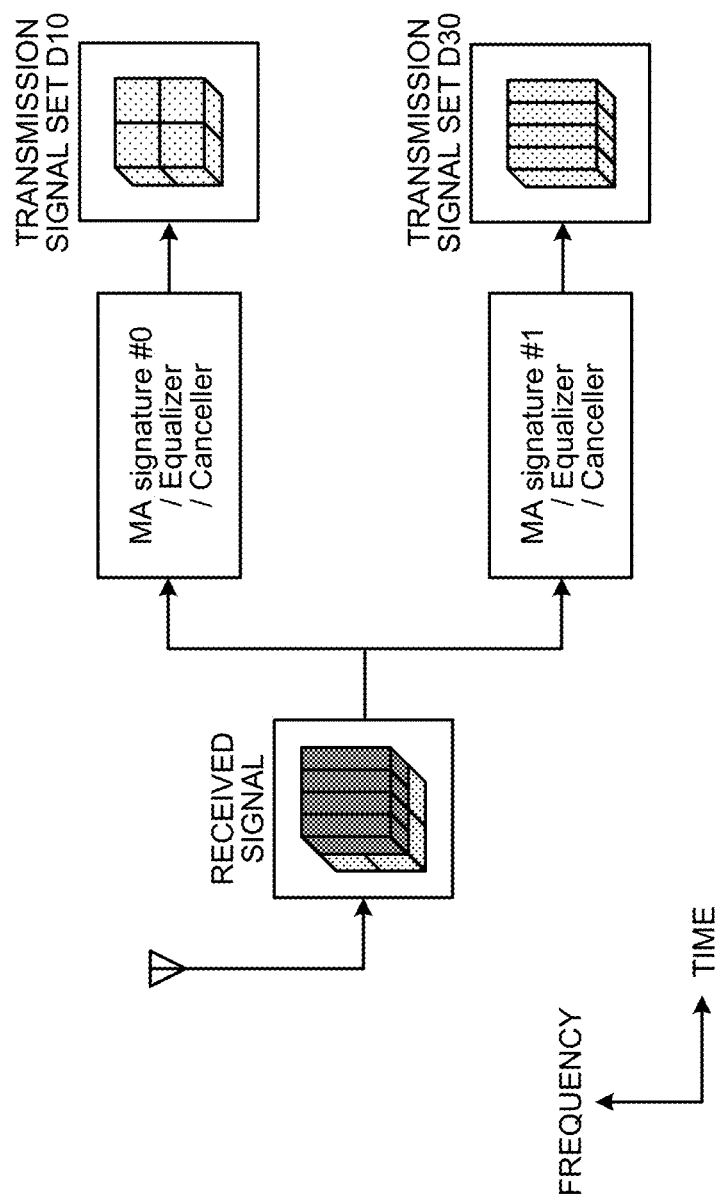
FIG. 15 is an explanatory diagram illustrating an example of a NOMA reception process according to the embodiment of the present disclosure.

FIG. 15 is an explanatory diagram illustrating an example of a NOMA reception process according to the embodiment of the present disclosure. Note that the NOMA reception process to be described below is achieved by the control unit 23 (for example, the reception unit 233 and the separation unit 234) of the base station device 20 controlling the reception processing unit 211. Alternatively, the NOMA reception process to be described below is achieved by, for example, the control unit 45 (for example, the reception unit 454) of the terminal device 40 controlling the reception processing unit 411.

As illustrated in FIG. 15, the received signal is received in a state where a plurality of transmission signals are multiplexed on the same frequency and time resource. The reception device (for example, the separation unit 234 of the base station device $20_1$) performs the NOMA reception process (for example, a process such as channel equalization or interference signal canceller) on the basis of the MA signature used by the transmission device to decode the multiplexed transmission signal set. As a result, the reception device extracts a desired signal from the received signal. In the example of FIG. 15, the reception device performs the NOMA reception process that applies the MA signature #0 and the MA signature #1 to the received signal to extract the transmission signal sets D10 and D30. Note that if multiplexing is performed using the same MA signature, the influence of interference between the multiplexed signals is significant, and thus decoding becomes difficult. Consequently, the base station device 20 schedules MA signatures used by the terminal device 40 and the like so that the MA signatures do not overlap.

As described above, in the NOMA transmission, it is necessary to share the MA signature applied by the transmission device and the reception device between the transmission device and the reception device, and to apply the MA signature without any overlap. In the following description, it is assumed that the concept of a resource (a radio resource) also includes the MA signature. Here, a resource including all of the frequency, time, and MA signature is referred to as "Multiple Access Resource (MA resource)" in some cases. In addition, a resource including only the frequency and time is referred to as "Multiple Access Physical Resource (MA physical resource)" in some cases.

4. BASIC OPERATION OF COMMUNICATION SYSTEM

4-1. Initial Connection Process

Next, the basic operation of the communication system 1 will be described. First, the initial connection process will be described. The initial connection process is a process to change the radio connection state of the terminal device 40 from an unconnected state (an Unconnected state) to a connected state (a Connected state). The unconnected state includes, for example, RRC_IDLE and RRC_INACTIVE. RRC_IDLE is an idle state where the terminal device is not connected to any cell (or any base station device), and is also referred to as "Idle mode". In addition, RRC_INACTIVE is a radio connection state that indicates an inactive state newly defined in NR, and is also referred to as "Inactive mode". Note that the non-connected state may include Lightning mode. The connected state is, for example, RRC_CONNECTED. RRC_CONNECTED is a connected state where the terminal device is connected to any cell (or any base station device), and is also referred to as "CONNECTED mode".

Figure 16:
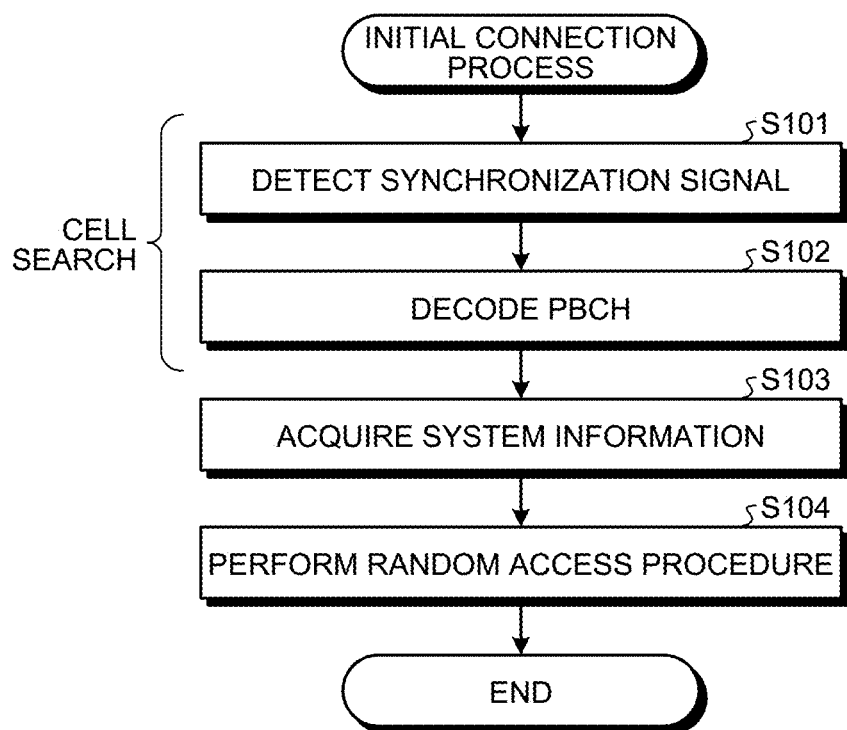
FIG. 16 is a flowchart illustrating an example of an initial connection process.

FIG. 16 is a flowchart illustrating an example of the initial connection process. The initial connection process will be described below with reference to FIG. 16. The initial connection process to be described below is performed, for example, when the terminal device 40 is turned on.

First, the terminal device 40 in an unconnected state performs a cell search. The cell search of the present embodiment includes a step of detecting a synchronization signal and a step of decoding PBCH. The reception unit 454 of the terminal device 40 detects a cell synchronization signal (step S101). The reception unit 454 synchronizes the cell with a downlink on the basis of the synchronization signal detected. After the downlink synchronization is established, the reception unit 454 attempts to decode the PBCH and acquires Master Information Block (MIB) that is part of system information (step S102).

The system information is information that notifies a setting in a cell to which the system information is transmitted. The system information includes, for example, information related to access to cells, information related to cell selection, information related to other RATs and other systems, and the like. The system information includes MIB and System Information Block (SIB). The MIB is the information of a physical layer required to receive SIB and the like, and is information with a fixed payload size notified by PBCH. The MIB includes a downlink system bandwidth, part of system frame numbers, SIB scheduling information, and the like. The SIB is system information other than the MIB and is notified by the PDSCH.

Note that the system information can be classified into first system information, second system information, and third system information. The first system information and the second system information includes, for example, information related to access to cells, information related to acquisition of other system information, and information related to cell selection. In LTE, the information included in the MIB is the first system information. The information included in SIB1 and SIB2 among SIBs is the second system information. The remaining system information is the third system information.

Also in NR, the system information is notified from an NR cell. The physical channel carrying the system information may be transmitted in slots or minislots. The minislot is defined by the number of symbols less than the number of symbols in the slot. By transmitting the physical channel that carries the system information in minislots, the time required for beam sweeping can be reduced and the overhead can be reduced. In the case of the NR, the first system information is transmitted in NR-PBCH, and the second system information is transmitted in a physical channel different from the NR-PBCH.

The acquisition unit 451 of the terminal device 40 acquires the second system information on the basis of the MIB (that is, the first system information) (step S103). As described above, the second system information is composed of the SIB1 and the SIB2. The SIB1 is cell access regulation information and scheduling information of system information other than the SIB1. The SIB1 includes cell access information, cell selection information, maximum uplink transmission power information, TDD setting information, a system information cycle, system information mapping information, a system information (SI) window length, and the like. In addition, the SIB2 includes connection prohibition information, radio resource setting information common to cells (radioResourceConfigCommon), uplink carrier information, and the like. The radio resource setting information common to cells includes Physical Random Access Channel (PRACH) and Random Access Channel (RACH) setting information common to cells.

Note that if the acquisition unit 451 cannot acquire the system information necessary for establishing a link, the control unit 45 of the terminal device 40 determines that access to the cell is prohibited. For example, if all of the first system information and the second system information cannot be acquired, the control unit 45 determines that access to the cell is prohibited. In this case, the control unit 45 ends the initial connection process.

If the system information can be acquired, the control unit 45 performs a random access procedure on the basis of the first system information and/or the second system information (step S104). In some cases, the random access procedure is referred to as a "Random Access Channel (RACH) procedure" or "RA procedure". Upon completion of the random access procedure, the terminal device 40 is changed from an unconnected state to a connected state.

4-2. Random Access Procedure

Next, the random access procedure will be described. The random access procedure is performed for the purpose of "RRC connection setup" from an idle state to a connected state (or an inactive state), "state change request" from an inactive state to a connected state, or the like. The random access procedure is also used for the purpose of "scheduling request" to request resources for uplink data transmission and "timing advance adjustment" for adjusting uplink synchronization. In addition, the random access procedure is performed in the case of "on-demand SI request" to request system information that has not been transmitted, "beam recovery" for restoring a broken beam connection, "handover" for switching connection cells, and the like.

"RRC connection setup" is an operation performed when the terminal device 40 is connected to the base station device in response to the generation of traffic or the like. Specifically, "RRC connection setup" is an operation of passing information related to a connection (for example, a UE context) from the base station device to the terminal device 40. The UE context is managed by predetermined communication device identification information (for example, C-RNTI) designated by the base station device. When the terminal device 40 completes this operation, the state of the terminal device 40 is changed from an idle state to an inactive state or from an idle state to a connected state.

"State change request" is an operation in which the terminal device 40 requests a state change from an inactive state to a connected state in response to the generation of traffic or the like. By changing to a connected state, the terminal device 40 can transmit and receive unicast data to and from the base station device.

"Scheduling request" is an operation in which the terminal device 40 makes a resource request for uplink data transmission in response to the generation of traffic or the like. After successfully receiving this scheduling request, the base station device assigns PUSCH resources to the communication device. Note that the scheduling request is also made by PUCCH.

"Timing advance adjustment" is an operation of adjusting frame errors between a downlink and an uplink caused by a propagation delay. The terminal device 40 transmits the PRACH at the timing when the downlink frame is adjusted. As a result, the base station device can recognize the propagation delay with the terminal device 40, and can designate a timing advance value to the terminal device 40 by a message 2 or the like.

"On-demand SI request" is an operation of requesting the base station device to transmit the system information when the terminal device 40 needs the system information that has not been transmitted because of the overhead of the system information or the like.

"Beam recovery" is an operation of requesting a recovery when the communication quality is degraded due to the movement of the terminal device 40 or the blocking of a communication path by another object after the beam is established. Upon receiving this request, the base station device attempts to connect to the terminal device 40 using a different beam.

"Handover" is an operation of switching a connection from a connected cell (a serving cell) to a cell adjacent to the connected cell (a neighbor cell) due to a change in the radio wave environment such as the movement of the terminal device 40. When receiving a handover command from the base station device 20, the terminal device 40 makes a connection request to the neighbor cell specified by the handover command.

The random access procedure includes a contention based random access procedure and a non-contention based random access procedure. The contention based random access procedure will be described first.

Note that the random access procedure to be described below is a random access procedure assuming that the RAT supported by the communication system 1 is LTE. However, the random access procedure to be described below is also applicable to the case where the RAT supported by communication system 1 is RAT other than LTE.

[Contention Based Random Access Procedure]

Figure 17:
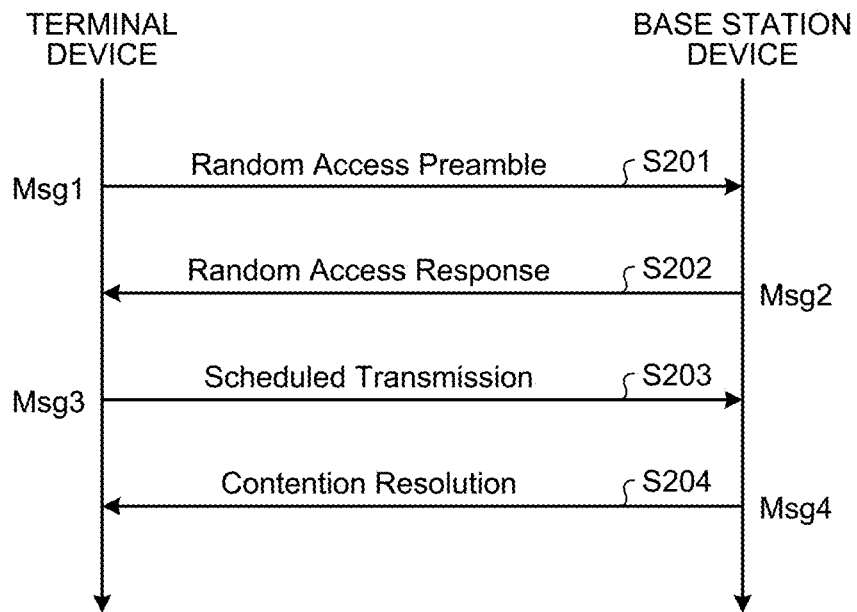
FIG. 17 is a diagram illustrating a contention based random access procedure.

The contention based random access procedure is a random access procedure led by the terminal device 40. FIG. 17 is a diagram illustrating the contention based random access procedure. As illustrated in FIG. 17, the contention based random access procedure is a four-step procedure that starts with the transmission of a random access preamble from the terminal device 40. The contention based random access procedure includes the steps of transmitting a random access preamble (Msg1), receiving a random access response (Msg2), transmitting a message (Msg3), and receiving a contention resolution message (Msg4).

First, the connection unit 453 of the terminal device 40 randomly selects a preamble sequence to be used from a plurality of predetermined preamble sequences. The connection unit 453 then transmits a message (Msg1: Random Access Preamble) including the selected preamble sequence to the base station device as a connection destination (step S201). In this case, the base station device 20 may be a non-ground base station device or a ground base station device. It is assumed in the following description that the base station device 20 to which the connection unit 453 transmits a random access preamble is a non-ground base station device. The random access preamble is transmitted on PRACH.

When receiving the random access preamble, the control unit 23 of the base station device 20 transmits a random access response (Msg2: Random Access Response) to the random access preamble to the terminal device 40. This random access response is transmitted on, for example, PDSCH. The connection unit 453 receives the random access response (Msg2) transmitted from the base station device 20 (step S202). The random access response includes one or a plurality of random access preambles that can be received by the base station device 20, and Up Link (UL) resources (hereinafter, referred to as "uplink grants") corresponding to the random access preambles. Further, the random access response also includes Temporary Cell Radio Network Temporary Identifier (TC-RNTI), which is an identifier that is unique to the terminal device 40 and is temporarily assigned to the terminal device 40 by the base station device 20.

When receiving the random access response from the base station device 20, the connection unit 453 of the terminal device 40 determines whether or not the received information includes the random access preamble transmitted in step S201. When the random access preamble is included, the connection unit 453 extracts the uplink grant corresponding to the random access preamble transmitted in step S201 from the uplink grants included in the random access response. The connection unit 453 then transmits a UL message (Msg3: Scheduled Transmission) using the resource scheduled by the extracted uplink grant (step S203). The message (Msg3) is transmitted on PUSCH. The message (Msg3) includes an RRC message for a radio resource control (RRC) connection request. In addition, the message (Msg3) also includes the identifier of the terminal device 40.

In the contention based random access procedure, the random access preamble randomly selected by the terminal device 40 is used for the procedure. For this reason, at the same time when the terminal device 40 transmits the random access preamble, another terminal device 40 may transmit the same random access preamble to the base station device 20. Consequently, the control unit 23 of the base station device 20 receives the identifier transmitted by the terminal device 40 in step S203, and thus recognizes where a preamble contention between terminal devices occurs, and resolves the contention. The control unit 23 transmits a contention resolution (Msg4: Contention Resolution) to the terminal device 40 selected by the contention resolution. The contention resolution (Msg4) includes the identifier transmitted by the connection unit 453 in step S203. In addition, the contention resolution (Msg4) also includes an RRC message for RRC connection setup. The connection unit 453 receives the contention resolution message (Msg4) transmitted from the base station device 20 (step S204).

The connection unit 453 of the terminal device 40 compares the identifier transmitted in step S203 with the identifier received in step S204. If the identifiers do not match, the connection unit 453 performs the random access procedure again from step S201. If the identifiers match, the connection unit 453 performs an RRC connection operation to be changed from an idle state (RRC_IDLE) to a connected state (RRC_CONNECTED). The connection unit 453 uses the TC-RNTI acquired in step S202 as Cell Radio Network Temporary Identifier (C-RNTI) in subsequent communications. After being changed to a connected state, the connection unit 453 transmits an RRC message indicating that the RRC connection setup is completed to the base station device. The message indicating that the RRC connection setup is completed is also referred to as "message 5". This series of operations enables the terminal device 40 to be connected to the base station device 20.

Note that the contention based random access procedure illustrated in FIG. 17 is a four-step random access procedure. However, the communication system 1 can also support a two-step random access procedure as the contention based random access procedure. For example, the connection unit 453 of the terminal device 40 transmits a random access preamble and the message (Msg3) indicated in step S203. The control unit 23 of the base station device 20 then transmits a random access response (Msg2) and a contention resolution (Msg4) as a response. Since the random access procedure is completed in two steps, the terminal device 40 can quickly connect to the base station device 20.

[Non-Contention Based Random Access Procedure]

Figure 18:
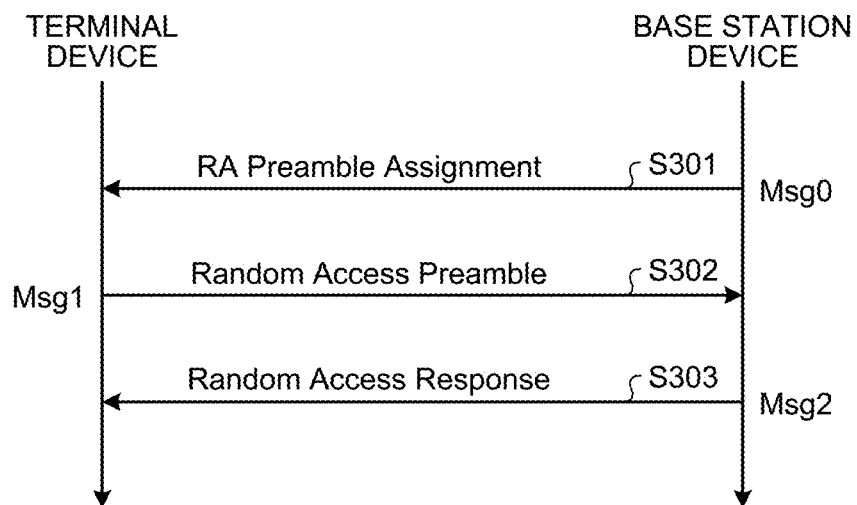
FIG. 18 is a diagram illustrating a non-contention based random access procedure.

Next, the non-contention based random access procedure will be described. The non-contention based random access procedure is a random access procedure led by the base station device. FIG. 18 is a diagram illustrating the non-contention based random access procedure. The non-contention based random access procedure is a three-step procedure that starts with the transmission of a random access preamble assignment from the base station device. The non-contention based random access procedure includes the steps of receiving a random access preamble assignment (Msg0), transmitting a random access preamble (Msg1), and receiving a random access response (Msg2). It is assumed in the following description of the random access procedure that the base station device 20 is a non-ground base station device, but the base station device may be a ground base station device.

In the contention based random access procedure, the connection unit 453 of the terminal device 40 randomly selects a preamble sequence. However, in the non-contention based random access procedure, the base station device 20 assigns a separate random access preamble to the terminal device 40. The connection unit 453 of the terminal device 40 receives the random access preamble assignment (Msg0: RA Preamble Assignment) from the base station device 20 (step S301).

The connection unit 453 of the terminal device 40 performs random access to the base station device 20 by using the random access preamble assigned in step S301. That is, the connection unit 453 of the terminal device 40 transmits the assigned random access preamble (Msg1: Random Access Preamble) to the base station device 20 on the PRACH (step S302).

The control unit 23 of the base station device 20 receives the random access preamble (Msg1) from the terminal device 40. The control unit 23 then transmits a random access response (Msg2) to the random access preamble to the terminal device 40 (step S303). The random access response includes, for example, the information of an uplink grant corresponding to the random access preamble received. When receiving the random access response (Msg2), the connection unit 453 of the terminal device 40 performs the RRC connection operation to be changed from an idle state (RRC_IDLE) to a connected state (RRC_CONNECTED).

As described above, since the base station device schedules the random access preamble in the non-contention based random access procedure, the preamble collision is unlikely to occur.

[Details of NR Random Access Procedure]

The random access procedure assuming that the RAT supported by the communication system 1 is LTE has been described above. Note that the above random access procedure can also be applied to RATs other than LTE. The random access procedure assuming that the RAT supported by the communication system 1 is NR will be described in detail below. Note that in the following description, each of the four steps related to Msg1 to Msg4 illustrated in FIG. 17 or FIG. 18 will be described in detail. The step for Msg1 corresponds to step S201 illustrated in FIG. 17 and step S302 illustrated in FIG. 18. The step for Msg2 corresponds to step S202 illustrated in FIG. 17 and step S303 illustrated in FIG. 18. The step for Msg3 corresponds to step S203 illustrated in FIG. 17. The step for Msg4 corresponds to step S204 illustrated in FIG. 17.

[NR Random Access Preamble (Msg1)]

In NR, PRACH is referred to as "NR Physical Random Access Channel (NR-PRACH)". The NR-PRACH is configured with a Zadoff-Chu sequence or an M sequence. In NR, a plurality of preamble formats are defined as an NR-PRACH format. The preamble format is defined by a combination of parameters such as a PRACH subcarrier spacing, a transmission bandwidth, a sequence length, the number of symbols used for transmission, the number of transmission repetitions, a Cyclic Prefix (CP) length, and a guard period length. Note that in some cases, the type of a sequence used for transmitting the NR-PRACH (the Zadoff-Chu sequence or the M sequence) is designated depending on the preamble format. The types of NR-PRACH preamble sequences are numbered. The number of the type of the preamble sequence is referred to as "preamble index".

In NR, the setting related to the NR-PRACH is performed on the terminal device 40 in an idle state using the system information. Further, the setting related to the NR-PRACH is performed on the terminal device 40 in a connected state by dedicated RRC signaling.

The connection unit 453 of the terminal device 40 transmits the NR-PRACH using a physical resource (NR-PRACH Occasion) that can be transmitted by the NR-PRACH. The physical resource is designated by the setting of the NR-PRACH. The connection unit 453 of the terminal device 40 selects one of the physical resources and transmits the NR-PRACH. Further, when the terminal device 40 is in a connected state, the connection unit 453 transmits the NR-PRACH using the NR-PRACH resource. The NR-PRACH resource is a combination of the NR-PRACH preamble and its physical resource. The base station device 20 can designate the NR-PRACH resource to the terminal device 40. In this case, the base station device 20 may be a non-ground base station device or a ground base station device. It is assumed in the following description of the NR random access procedure that the base station device 20 is a non-ground base station device.

Note that the NR-PRACH is also transmitted when the random access procedure fails. When retransmitting the NR-PRACH, the connection unit 453 of the terminal device 40 waits to transmit the NR-PRACH for a waiting period calculated from a backoff value (a backoff indicator, BI). Note that the backoff value may differ depending on the terminal category of the terminal device 40 and the priority of a traffic generated. In this case, a plurality of backoff values are notified, and the terminal device 40 selects the backoff value to be used according to the priority. Further, when retransmitting the NR-PRACH, the connection unit 453 increases the transmission power of the NR-PRACH as compared with an initial transmission. This procedure is referred to as "power ramping".

[NR Random Access Response (Msg2)]

The NR random access response is transmitted on NR Physical Downlink Shared Channel (NR-PDSCH). The NR-PDSCH including the random access response is scheduled by NR Physical Downlink Control Channel (NR-PDCCH) in which Cyclic Redundancy Check (CRC) is scrambled by RA-RNTI. The NR-PDCCH is transmitted in a common control subband. The NR-PDCCH is located in Common Search Space (CSS). Note that the value of Random Access Radio Network Temporary Identifier (RA-RNTI) is determined on the basis of the transmission resource of the NR-PRACH corresponding to the random access response. The transmission resource of the NR-PRACH includes, for example, a time resource (a slot or a subframe) and a frequency resource (a resource block). Note that the NR-PDCCH may be located in the search space corresponding to the NR-PRACH linked with the random access response. Specifically, the search space in which the NR-PDCCH is located is set in association with the NR-PRACH preamble and/or the physical resource to which the NR-PRACH is transmitted. The search space in which the NR-PDCCH is located is set in association with the preamble index and/or the index of the physical resource. The NR-PDCCH includes NR Synchronization signal (NR-SS) and Quasi co-location (QCL).

The NR random access response is Medium Access Control (MAC) information. The NR random access response includes at least an uplink grant for transmitting the NR message 3, a timing advance value used to adjust uplink frame synchronization, and a TC-RNTI value. In addition, the NR random access response also includes a PRACH index used for transmitting the NR-PRACH corresponding to the random access response. The NR random access response also includes backoff information used to wait to transmit the PRACH.

The control unit 23 of the base station device 20 transmits a random access response on NR-PDSCH. The connection unit 453 of the terminal device 40 determines whether or not the random access preamble has been successfully transmitted on the basis of the information included in the random access response. When it is determined that the transmission of the random access preamble fails, the connection unit 453 performs a process of transmitting the NR message 3 (Msg3) according to the information included in the random access response. On the other hand, when the transmission of the random access preamble fails, the connection unit 453 determines that the random access procedure fails, and retransmits the NR-PRACH.

Note that the NR random access response may include a plurality of uplink grants for transmitting the NR message 3

(Msg3). The connection unit 453 of the terminal device 40 can select one resource for transmitting the message 3 (Msg3) from a plurality of uplink grants. Consequently, it is possible to reduce the collision of NR message 3 (Msg3) transmissions in a case where the same NR random access response is received by different terminal devices 40. As a result, the communication system 1 can provide a more stable random access procedure.

[NR Message 3 (Msg3)]

The NR message 3 (Msg3) is transmitted on NR Physical Uplink Shared Channel (NR-PUSCH). The NR-PUSCH is transmitted using the resource designated by the random access response. The NR message 3 includes an RRC connection request message. The format of the NR-PUSCH is designated by the parameters included in the system information. For example, the parameters determine which of Orthogonal Frequency Division Multiplexing (OFDM) and Discrete Fourier Transform Spread OFDM (DFT-s-OFDM) is used as the NR-PUSCH format.

When the NR message 3 is normally received, the control unit 23 of the base station device 20 shifts to the process of transmitting a contention resolution (Msg4). On the other hand, if the NR message 3 cannot be received normally, the control unit 23 attempts to receive the NR message 3 again for at least a predetermined period of time. As an example, the control unit 23 instructs the terminal device 40 to retransmit the message 3. In this case, the control unit 23 transmits an instruction to retransmit the message 3 by using a downlink resource after a predetermined number of slots (or subframes or radio frames) from the resource in which the transmission of the message 3 is instructed.

An example of the retransmission of the message 3 and the designation of the transmission resource includes an instruction by retransmitting the random access response. The NR-PDSCH including the random access response to be retransmitted is scheduled by the NR-PDCCH in which CRC is scrambled by RA-RNTI. The same value as the RA-RNTI value used in an initial transmission is used as the RA-RNTI value. That is, the RA-RNTI value is determined on the basis of the NR-PRACH transmission resource corresponding to the random access response. Alternatively, the RA-RNTI value is determined on the basis of the information that identifies the initial transmission and the retransmission in addition to the NR-PRACH transmission resource. The NR-PDCCH is located in Common Search Space (CSS).

Alternatively, the NR-PDSCH including the random access response to be retransmitted is scheduled by the NR-PDCCH in which the CRC is scrambled by TC-RNTI or C-RNTI included in the random access response transmitted in the initial transmission.

Another example of the instruction of the retransmission of the message 3 and the transmission resource includes an instruction by the NR-PDCCH used for instructing the retransmission of the message 3. The NR-PDCCH is an uplink grant. The Downlink Control Information (DCI) of the NR-PDCCH designates the resource for retransmitting the message 3. The connection unit 453 of the terminal device 40 retransmits the message 3 on the basis of the instruction of the uplink grant.

A specific example of a process after the NR message 3 cannot be normally received includes a case where the control unit 23 of the base station device 20 attempts to receive the message 3 with the retransmission resource designated in advance. If the contention resolution is not transmitted from the base station device 20 after the message 3 is transmitted within a predetermined period of time, the connection unit 453 of the terminal device 40 transmits the NR-PUSCH that includes the message 3 by using the retransmission resource designated in advance.

Alternatively, when receiving the negative-acknowledgement (NACK) to the message 3, the connection unit 453 of the terminal device 40 transmits the NR-PUSCH including the message 3 by using the retransmission resource corresponding to the negative-acknowledgement, which is designated in advance. The information of "retransmission resource designated in advance" is included in, for example, the system information or the random access response.

Note that if the number of times of retransmission of the NR message 3 exceeds a predetermined number, or if the NR contention resolution is not successfully received within a predetermined period of time, the connection unit 453 of the terminal device 40 determines that the random access procedure fails and performs the process of retransmitting the NR-PRACH. Note that the transmission beam of the terminal device 40 used for retransmitting the NR message 3 may be different from the transmission beam of the terminal device 40 used for initially transmitting the message 3. Note that if neither the NR contention resolution nor the instruction of retransmission of the message 3 can be received within the predetermined period of time, the connection unit 453 of the terminal device 40 determines that the random access procedure fails, and performs the process of retransmitting the NR-PRACH. The predetermined period of time is set by, for example, the system information.

[NR Contention Resolution (Msg4)]

The NR contention resolution is transmitted on NR-PDSCH. The NR-PDSCH including the contention resolution is scheduled by the NR-PDCCH in which CRC is scrambled by TC-RNTI or C-RNTI. The NR-PDCCH is transmitted in a common control subband. The NR-PDCCH is located in User equipment specific Search Space (USS). Note that the NR-PDCCH may be located in CSS.

When normally receiving the NR-PDSCH including the contention resolution, the connection unit 453 of the terminal device 40 transmits an acknowledgement (ACK) to the base station device 20. After that, the terminal device 40 determines that the random access procedure has succeeded, and shifts to a connected state (RRC_CONNECTED). On the other hand, when receiving a negative-acknowledgement (NACK) to the NR-PDSCH from the terminal device 40 or when there is no response from the terminal device 40, the control unit 23 of the base station device 20 retransmits the NR-PDSCH including the contention resolution. If the NR contention resolution (Msg4) cannot be received within a predetermined period of time, the connection unit 453 of the terminal device 40 determines that the random access procedure fails, and retransmits the random access preamble (Msg1).

4-3. Transmission and Reception Process (Grant Based)

Next, data transmission (uplink) from the terminal device 40 to the base station device 20 will be described. Uplink data transmission is classified into "transmission and reception process (Grant Based)" and "transmission and reception process (Configured Grant)". The data transmission (uplink) from the terminal device 40 to the base station device 20 will be described first. The uplink data transmission is classified into "transmission and reception process (Grant Based)" and "transmission and reception process (Configured Grant)". "Transmission and reception process (Grant Based)" will be described first.

Figure 19:
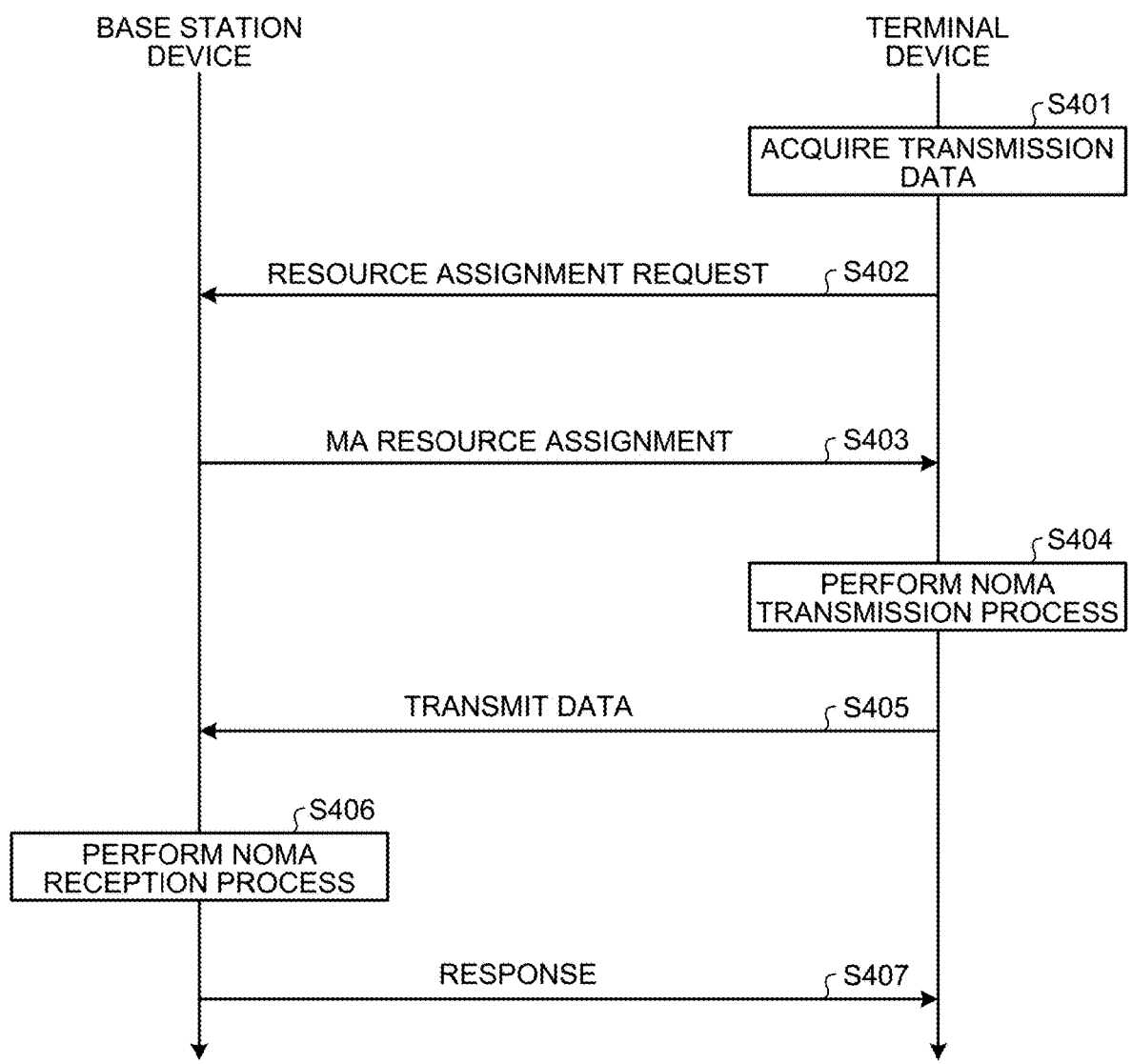
FIG. 19 is a sequence diagram illustrating an example of a transmission and reception process (Grant Based) according to the embodiment of the present disclosure.

The transmission and reception process (Grant Based) is a process in which the terminal device 40 receives a dynamic resource allocation (Grant) from the base station device 20 and transmits data. FIG. 19 is a sequence diagram illustrating an example of the transmission and reception process (Grant Based) according to the embodiment of the present disclosure. Hereinafter, the transmission and reception process (Grant Based) will be described with reference to FIG. 19. The transmission and reception process (Grant Based) to be described below is performed, for example, when the terminal device 40 is in a connected state (RRC_CONNECTED) with the base station device 20.

First, the transmission unit 455 of the terminal device 40 transmits NOMA support information to the base station device 20 in a connected state. The NOMA support information is information indicating whether or not the terminal device 40 supports NOMA (for example, whether or not the terminal device 40 can perform the NOMA transmission process). The NOMA support information may include information of non-orthogonal resources available to the terminal device 40.

The acquisition unit 451 of the terminal device 40 acquires transmission data (step S401). For example, the acquisition unit 451 acquires, as the transmission data, data that is generated as data transmitted by various programs in the terminal device 40 to another terminal device. The transmission unit 455 then transmits a resource assignment request to the base station device 20 (step S402).

The reception unit 233 of the base station device 20 receives the resource assign request from the terminal device 40. The processing unit 232 of the base station device 20 then determines a MA resource to be assigned to the terminal device 40. Next, the transmission unit 235 of the base station device 20 transmits the information of the MA resource (MA resource information) assigned to the terminal device 40 to the terminal device 40 (step S403).

The reception unit 454 of the terminal device 40 receives the MA resource information from the base station device 20 and stores the MA resource information in the storage unit 42. The terminal device 40 performs the NOMA transmission process on transmission unit data on the basis of the MA resource information (step S404).

When the NOMA transmission process is completed, the transmission unit 455 of the terminal device 40 transmits the data subjected to the NOMA transmission process to the base station device 20 (step S405).

The reception unit 233 of the base station device 20 receives the data subjected to the NOMA transmission process from the terminal device 40. The data received from the terminal device 40 is multiplexed data with which the data transmitted by another terminal device 40 is non-orthogonal multiplexed. In order to extract the data transmitted by the terminal device 40 from the multiplexed data, the base station device 20 then performs a NOMA reception process on the multiplexed data (step S406).

For example, the acquisition unit 231 of the base station device 20 acquires the information of the NOMA transmission process used by the terminal device 40 from the storage unit 22. The separation unit 234 of the base station device 20 then separates the data transmitted by the terminal device 40 from the multiplexed data on the basis of the information of the NOMA transmission process acquired by the acquisition unit 231.

When the separation is completed, the transmission unit 235 of the base station device 20 transmits response data (for example, an acknowledgement) to the terminal device 40 (step S407). When the transmission of the response data is completed, the communication system 1 ends the transmission and reception process (Grant Based).

4-4. Transmission and Reception Process (Configured Grant)

Next, "transmission and reception process (Configured Grant)" will be described. The transmission and reception process (Configured Grant) is a process of transmitting data from the terminal device 40 to the base station device 20 using Configured Grant transmission. Here, the Configured Grant transmission means that the communication device performs transmission using an appropriate resource among available frequency and time resources designated in advance by another communication device, without receiving a dynamic resource allocation (Grant) from the other communication device. That is, the Configured Grant transmission means that data is transmitted without including Grant in DCI. The Configured Grant transmission is also referred to as "Data transmission without grant", "Grant-free", "Semi persistent Scheduling", or the like.

In the case of the Configured Grant transmission, the base station device 20 may specify in advance candidates for frequency and time resources that can be selected by the terminal device 40. The main purpose of this operation is to reduce signaling overhead for the purpose of power saving of the terminal device 40 and low-delay communication. In the Grant Based transmission and reception process, the base station device 20 notifies the terminal device 40 of the resources used in an uplink or a sidelink. As a result, the terminal device 40 can perform communication without any resource contention with another terminal device 40. However, this method causes signaling overhead due to the notification.

A specific description will be given using the sequence of FIG. 19. In the example of FIG. 19, when data is generated (step S401), the terminal device 40 issues a resource assignment request to the base station device 20 (step S402). The base station device 20 assigns resources to the terminal device 40 in response to the resource assignment request (step S403). The terminal device 40 transmits data using the resources assigned by the base station device 20 (step S405). In the example of FIG. 19, the signaling overhead is generated in step S402 and step S403.

The Configured Grant transmission can eliminate the processes of steps S402 and S403 in the example of FIG. 19. Consequently, in view of the power saving and low-delay communication required for next-generation communications, the Configured Grant transmission without any resource assignment notification is considered to be a promising technical candidate. The transmission resource for the Configured Grant transmission may be selected from all available bands, or may be selected from the resources specified in advance by the base station device 20.

Figure 20:
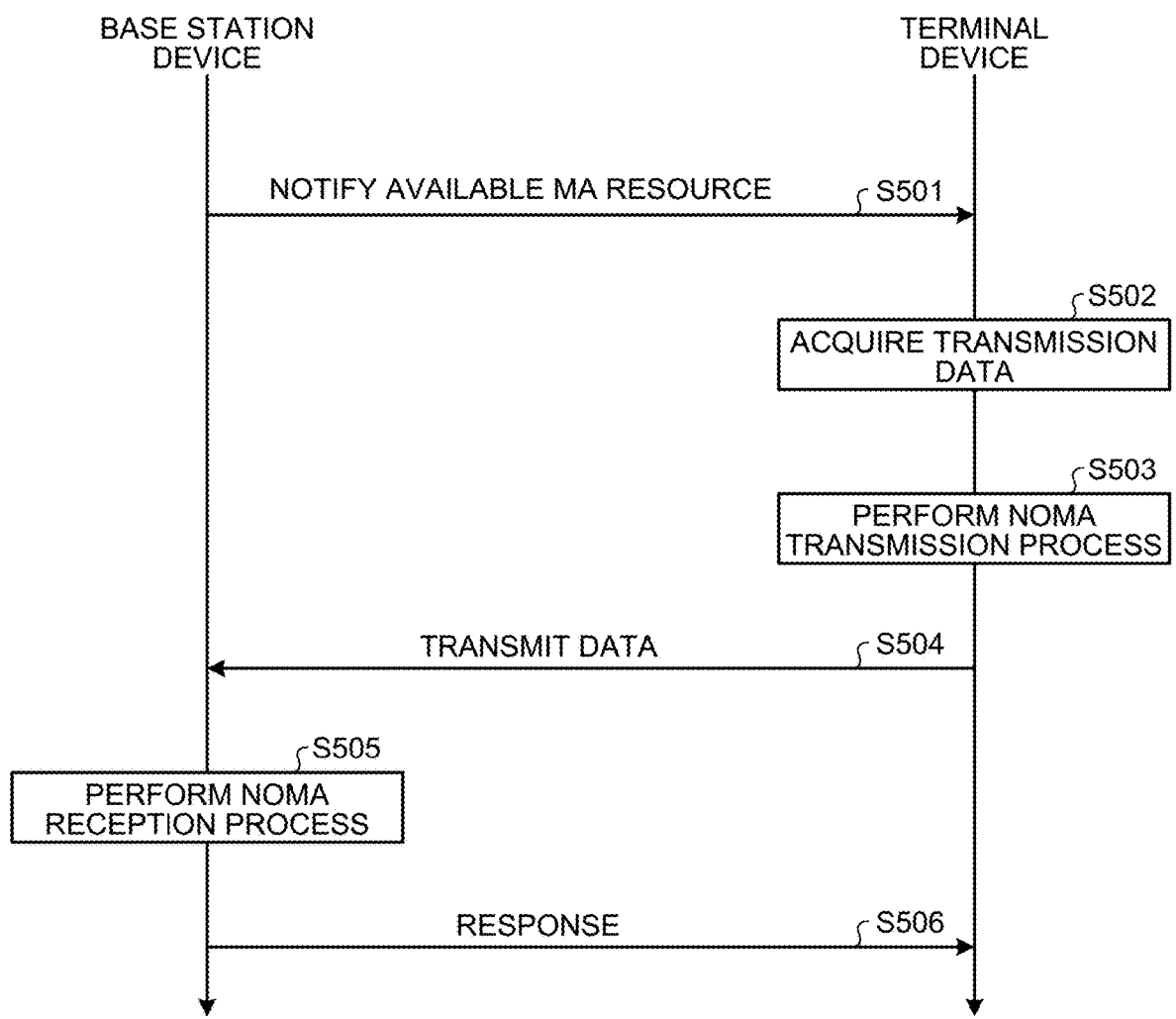
FIG. 20 is a sequence diagram illustrating an example of a transmission and reception process (Configured Grant) according to the embodiment of the present disclosure.

FIG. 20 is a sequence diagram illustrating an example of the transmission and reception process (Configured Grant) according to the embodiment of the present disclosure. Hereinafter, the transmission and reception process (Configured Grant) will be described with reference to FIG. 20. The transmission and reception process (Configured Grant) to be described below is performed, for example, when the terminal device 40 is in a connected state (RRC_CONNECTED) with the base station device 20.

When the terminal device 40 becomes a connected state, the processing unit 232 of the base station device 20 determines a MA resource to be assigned to the terminal device 40. The transmission unit 235 of the base station device 20 then transmits the information of the MA resource (MA resource information) assigned to the terminal device 40 to the terminal device 40 (step S501).

The reception unit 454 of the terminal device 40 receives the MA resource information from the base station device 20 and stores the MA resource information in the storage unit 22. The acquisition unit 451 of the terminal device 40 acquires transmission data generated (step S502). For example, the acquisition unit 451 acquires, as the transmission data, data that is generated as data transmitted by various programs in the terminal device 40 to another communication device.

The control unit 45 of the terminal device 40 then performs a NOMA transmission process on transmission unit data on the basis of the MA resource information stored in the storage unit 22 (step S503). When the NOMA transmission process is completed, the transmission unit 455 of the terminal device 40 transmits the data subjected to the NOMA transmission process to the base station device 20 (step S504).

The reception unit 233 of the base station device 20 receives the data subjected to the NOMA transmission process from the terminal device 40. The data received from the terminal device 40 is multiplexed data with which the data transmitted by another terminal device 40 is non-orthogonal multiplexed. In order to extract the data transmitted by the terminal device 40 from the multiplexed data, the base station device 20 then performs a NOMA reception process on the multiplexed data (step S505). For example, the acquisition unit 231 of the base station device 20 acquires the information of the NOMA transmission process used by the terminal device 40. The separation unit 234 of the base station device 20 then separates the data transmitted by the terminal device 40 from the multiplexed data on the basis of the information of the NOMA transmission process acquired by the acquisition unit 231.

When the separation is completed, the transmission unit 235 of the base station device 20 transmits response data (for example, an acknowledgement) to the terminal device 40 (step S506). When the transmission of the response data is completed, the communication system 1 ends the transmission and reception process (Configured Grant).

4-5. Transmission and Reception Process (Downlink)

Figure 21:
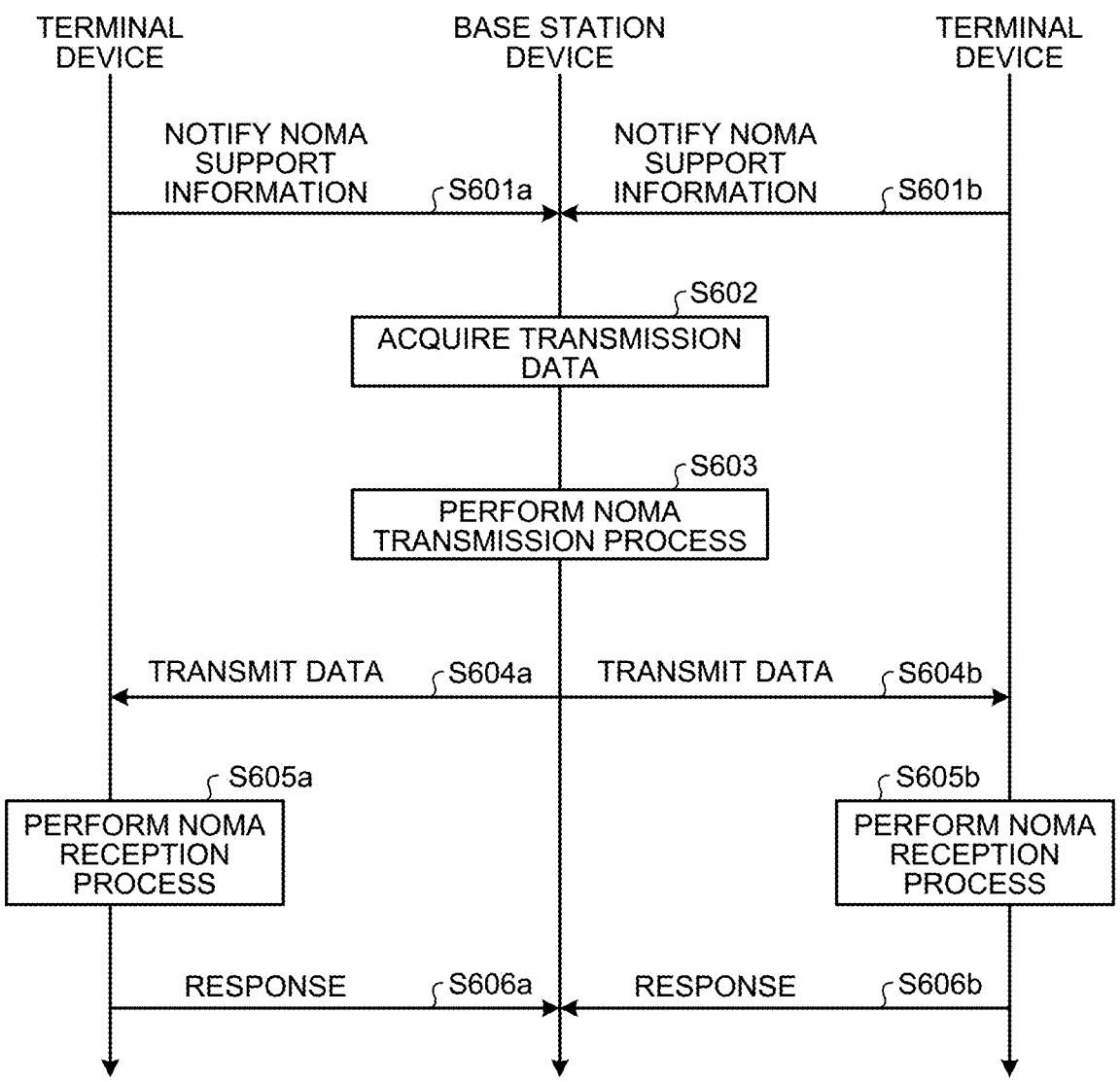
FIG. 21 is a sequence diagram illustrating an example of a transmission and reception process (downlink) according to the embodiment of the present disclosure.

Next, data transmission (downlink) from the base station device 20 to the terminal device 40 will be described. FIG. 21 is a sequence diagram illustrating an example of the transmission and reception process (downlink) according to the embodiment of the present disclosure. FIG. 21 illustrates an example in which the base station device 20 transmits data to two terminal devices 40 in a non-orthogonal multiplexing manner. Hereinafter, the transmission and reception process (Grant Based) will be described with reference to FIG. 21. The transmission and reception process (Grant Based) to be described below is performed, for example, when two terminal devices 40 are in a connected state (RRC_CONNECTED) with the base station device 20. In the following description, the two terminal devices 40 are simply referred to as "terminal devices 40".

First, the transmission unit 455 of the terminal device 40 transmits NOMA support information to the base station device 20 in a connected state (step S601a and step S601b).

The reception unit 233 of the base station device 20 receives the support information from the terminal device 40. The acquisition unit 231 of the base station device 20 acquires transmission data to be transmitted to each of the two terminal devices 40 (step S602). For example, the acquisition unit 231 acquires, as the transmission data, data that is generated as data transmitted by various programs in the base station device 20 to another communication device.

The processing unit 232 of the base station device 20 then performs a NOMA transmission process on the transmission unit data (step S603). When the NOMA transmission process is completed, the transmission unit 235 of the base station device 20 transmits a plurality of pieces of data subjected to the NOMA transmission process to the terminal devices 40 (step S604a and step S604b). In this case, the transmission unit 235 may non-orthogonal multiplex the plurality of pieces of data subjected to the NOMA transmission process and transmit the resultant data, or transmit the plurality of pieces of data subjected to the NOMA transmission process from different antennas and multiplex the data in a transmission channel.

The reception unit 454 of the terminal device 40 receives the data subjected to the NOMA transmission process from the base station device 20. The data received from the base station device 20 is multiplexed data in which the plurality of pieces of data subjected to the NOMA transmission process are non-orthogonal multiplexed. In order to extract the data transmitted to the terminal device 40 from the multiplexed data, the terminal device 40 then performs a NOMA reception process on the multiplexed data (step S605a and step S605b). For example, the acquisition unit 451 of the terminal device 40 acquires the information of the NOMA transmission process (for example, MA signature information) used by the base station device 20. The separation unit 456 of the terminal device 40 then separates the data transmitted to the terminal device 40 from the multiplexed data on the basis of the information of the NOMA transmission process acquired by the acquisition unit 451.

When the separation is completed, the transmission unit 455 of the terminal device 40 transmits response data (for example, an acknowledgement) to the base station device 20 (step S606a and step S606b). When the transmission of the response data is completed, the communication system 1 ends the transmission and reception process (Configured Grant).

5. Transmission of User Data in Unconnected State

Normally, the terminal device 40 performs a predetermined connection procedure (for example, an initial connection procedure such as a random access procedure), so that the radio connection state with the base station device 20 changes from an unconnected state to a predetermined connected state. The unconnected state includes, for example, an idle state, an inactive state, a Lightening mode, or the like. The predetermined connected state is not limited to RRC_CONNECTED, and may be another connected state. Hereinafter, the predetermined connected state is simply referred to as "connected state". Here, the initial connection procedure (the predetermined connection procedure) may be a contention based random access procedure or a non-contention based random access procedure.

However, the terminal device 40 (communication device) of the present embodiment can transmit user data to the base station device 20 (another communication device) in an unconnected state. Note that the transmission and reception process (Configured Grant) described above is a process of transmitting user data in a connected state, and is different from the transmission of user data in an unconnected state.

As the user data is allowed to be transmitted in an unconnected state, the signaling related to the initial connection procedure (the predetermined connection procedure) is significantly reduced. As a result, high transmission efficiency is achieved in the entire system. Furthermore, low delay and low power consumption are also achieved.

Note that as the use case of the present embodiment, for example, a MTC use case or a low-delay use case in which data is transmitted without changing to a Connected mode can be assumed.

Hereinafter, the transmission of user data in an unconnected state will be described in detail.

5-1. Resource Assignment

Before the terminal device 40 transmits user data in an unconnected state, the base station device 20 may assign a radio resource for transmitting user data in an unconnected state to the terminal device 40.

In the following description, the radio resource for transmitting user data in an unconnected state is referred to as "resource for unconnected transmission". The assignment of the resource for unconnected transmission may be notified from the base station device 20 to the terminal device 40.

In the following description, information notified from one communication device (for example, the base station device 20) to another communication device (the terminal device 40) for transmitting user data in an unconnected state is referred to as "information for unconnected transmission". Here, the information for unconnected transmission is information related to transmission in an unconnected state. More specifically, the information for unconnected transmission is information for the terminal device 40 to transmit user data to the base station device 20 in an unconnected state. The method of notifying the information for unconnected transmission will be described in detail later in <5-2. Signaling>.

The following (A1) to (A4) can be assumed as resources for unconnected transmission, for example.

(A1) Radio resource dedicated to terminal device 40
(A2) All or part of radio resources for random access
(A3) All or part of broadcast radio resources
(A4) All or part of radio resources for Supplementary Uplink (SUL)

Hereinafter, each of (A1) to (A4) will be described.

(A1) Radio Resource Dedicated to Terminal Device 40

First, the radio resource dedicated to the terminal device 40 is assumed as the resource for unconnected transmission. In this case, the base station device 20 may assign dedicated Bandwidth Part (BWP) to the terminal device 40 in an unconnected state. Alternatively, the base station device 20 may assign a dedicated resource pool to the terminal device 40 in an unconnected state. Alternatively, the base station device 20 may assign a dedicated resource to the terminal device 40 in an unconnected state by using a Configured Grant (Type 1). In addition, the base station device 20 may arbitrarily assign a dedicated radio resource to the terminal device 40. It is needless to mention that the terminal device 40 may use a radio resource selected from available frequency and time resources designated in advance by another communication device as the resource for unconnected transmission, regardless of information for unconnected transmission.

(A2) all or Part of Radio Resources for Random Access

Further, all or part of the radio resources for random access are assumed as the resources for unconnected transmission. The radio resource for random access is, for example, a Random Access Channel (RACH) resource. In this case, the base station device 20 may assign all or part of time-frequency resources used for transmitting a random access preamble to the terminal device 40 as the resources for unconnected transmission. In this case, the base station device 20 may reuse a specific time (a frame, a subframe, a slot, or a symbol) of the RACH resource. Alternatively, the base station device 20 may reuse a specific frequency resource (RB). It is needless to mention that the terminal device 40 itself may select all or part of the RACH resources as the resources for unconnected transmission regardless of information for unconnected transmission.

(A3) all or Part of Broadcast Radio Resources

Further, all or part of the broadcast radio resources are assumed as the resources for unconnected transmission. The broadcast radio resources may be, for example, a sidelink broadcast channel or a downlink broadcast channel. It is needless to mention that the terminal device 40 may select all or part of the broadcast radio resources as the resources for unconnected transmission, regardless of the information for unconnected transmission.

(A4) all or Part of Radio Resources for Supplementary Uplink (SUL)

Further, all or part of the radio resources for SUL are assumed as the resources for unconnected transmission. The radio resource for SUL is a dedicated frequency band for the uplink newly introduced in NR. In this case, the terminal device 40 may select all or part of the radio resources for SUL as the resources for unconnected transmission, regardless of the information for unconnected transmission.

Note that the above (A1) to (A4) are merely examples, and the resources for unconnected transmission are not limited to the ones described above. For example, the resource for unconnected transmission may be a non-orthogonal resource. Alternatively, the resource for unconnected transmission may be a resource on the non-orthogonal axis of the existing orthogonal resource. By using the resource on the non-orthogonal axis as the resource for unconnected transmission, the terminal device 40 can transmit user data in an unconnected state without affecting the communication using the existing orthogonal resource (the OMA communication). For example, as the terminal device 40 in an unconnected state transmits the user data with a small amount of power on the existing orthogonal resource, the terminal device 40 can transmit the user data in an unconnected state without affecting the communication using the existing orthogonal resource (for example, transmission and reception of data with large power data using a frequency axis and a time axis orthogonal to each other).

5-2. Signaling

Next, the notification of information for unconnected transmission from the base station device 20 to the terminal device 40 will be described.

[Method of Notifying Information for Unconnected Transmission]

The base station device 20 may individually transmit information for unconnected transmission to each of the terminal devices 40, or may perform broadcast transmission. In this case, the base station device 20 may transmit the information for unconnected transmission as part of the system information. The system information includes, for example, MIB or SIB.

[Update of Information for Unconnected Transmission]

The base station device 20 may update the information for unconnected transmission held by the terminal device 40. In this case, the base station device 20 may transmit information for unconnected transmission to be updated to the terminal device 40 using a predetermined control channel or a channel for Downlink Control Information (DCI) transmission.

Note that the predetermined control channel may be a broadcast channel or a channel for RRC messages. That is, the base station device 20 may notify the information for unconnected transmission by broadcast communication or by RRC signaling.

Alternatively, the predetermined control channel may be a paging channel. That is, the base station device 20 may notify the information for unconnected transmission by paging.

Specific Example of Information for Unconnected Transmission

The information for unconnected transmission may include communication parameter information for the terminal device 40 to transmit user data to the base station device 20 in an unconnected state. As the communication parameter information, for example, the following information (B1) to (B10) is assumed.

(B1) Time-frequency resource information
(B2) Frequency hopping information
(B3) Modulation and coding scheme (MCS) information
(B4) Repetition count information
(B5) Redundancy version information
(B6) Hybrid Automatic Repeat reQuest (HARQ) process information
(B7) Transmission power information
(B8) Demodulation Reference Signal (DMRS) information
(B9) Precoding information
(B10) Transmission code information Here, the time-frequency resource information in (B1) is information of radio resources used by the terminal device 40 to transmit user data. For example, the time-frequency resource information is information indicating which resource block is used.

Further, the frequency hopping information in (B2) is information used by the terminal device 40 for frequency hopping.

Furthermore, the MCS information in (B3) is information of combinations of a modulation scheme and a coding rate. For example, the MCS information is information indicating which MCS is used by the terminal device 40 in transmitting user data in an unconnected state.

Further, the repetition count information in (B4) is information related to the number of repetitions. For example, the repetition count information is information indicating how many times the terminal device 40 repeatedly transmits the same data when a repetition is performed to transmit user data in an unconnected state.

Moreover, the redundancy version information in (B5) is information of a redundancy version. For example, the redundancy version information is information indicating which Redundancy Version (RV) is used by the terminal device 40 in transmitting user data in an unconnected state.

Further, the HARQ process information in (B6) is information of a HARQ process. For example, the HARQ process information is information (for example, a HARQ process number) indicating which HARQ process is used by the terminal device 40 in transmitting user data in an unconnected state.

The transmission power information in (B7) is information of the power for data transmission. For example, the transmission power information is information indicating how the terminal device 40 sets transmission power in transmitting user data in an unconnected state.

The DMRS information in (B8) is information of DMRS. For example, the DMRS information is information of an uplink demodulation reference signal transmitted by the terminal device 40.

The precoding information in (B9) is information of precoding. For example, the precoding information is information indicating which Precoding Matrix Indicator (PMI) is used by the terminal device 40 in transmitting user data in an unconnected state.

The transmission code information in (B10) is information of a transmission code. For example, the transmission code information is information indicating an orthogonal code or a non-orthogonal code such as a MA Signature.

Note that the information for unconnected transmission is not limited to the information (B1) to (B10) described above. For example, the information for unconnected transmission may be the following information (C1) to (C2).

(C1) Information related to change of radio connection state
(C2) RACH configuration information Here, the information related to the change of a radio connection state in (C1) is information related to whether or not the terminal device 40 is changed to a connected state after transmitting user data in an unconnected state.

The RACH configuration information in (C2) is the information of a RACH configuration applied when the terminal device 40 is changed from an unconnected state to a connected state.

[Explicit Notification and Implicit Notification]

Note that the terminal device 40 may explicitly or implicitly notify the base station device 20 of the determination result as to whether or not the radio connection state is changed from an unconnected state to a connected state after the user data is transmitted.

Here, the explicit notification of the determination result means that the information indicating whether or not the radio connection state is changed from an unconnected state to a connected state is explicitly (directly) notified to the base station device 20.

In addition, the implicit notification of the determination result means that the determination result is notified by notifying the base station device 20 of the information used for the determination. For example, the terminal device 40 may implicitly notify the determination result by notifying the base station device 20 of Buffer Status Report (BSR). BSR is information for reporting the amount of data generated from a user equipment (UE) to a base station when uplink data is generated in UE. In this case, when the BSR value is equal to or higher than a predetermined threshold value, the base station device 20 may determine such a state as the determination result of changing to a connected state, and when the BSR value is less than the predetermined threshold value, the base station device 20 may determine such a state as the determination result of maintaining an unconnected state.

5-3. Transmission Process (Transmission in Unconnected State)

Next, the transmission process related to the transmission of user data in an unconnected state will be described. First, the transmission process (transmission in an unconnected state) will be described in this section <5-3>. Next, specific sequence examples of the transmission process (the transmission in an unconnected state) will be described in <5-4> to <5-9>.

It is assumed in the following description that the transmission process (the transmission in an unconnected state) is performed between the terminal device 40 (communication device) and the base station device 20 (another communication device). That is, it is assumed that the user data is transmitted from the terminal device 40 to the base station device 20 in an unconnected state. Note that of the execution subject of the transmission process (the transmission in an unconnected state) is not limited to the terminal device 40 and the base station device 20.

For example, the execution subject of the transmission process (the transmission in an unconnected state) may be the terminal device 40 and the relay device 30. In this case, the user data may be transmitted from the terminal device 40 to the relay device 30 in an unconnected state. Alternatively, the execution subject of the transmission process (the transmission in an unconnected state) may be the relay device 30 and the base station device 20. In this case, the user data may be transmitted from the relay device 30 to the base station device 20 in an unconnected state. Alternatively, the execution subject of the transmission process (the transmission in an unconnected state) may be the terminal device 40 and another terminal device 40. In this case, the user data may be transmitted from the terminal device 40 to the other terminal device 40 in an unconnected state.

"Terminal device 40" in the following description can be appropriately replaced with "base station device 20", "relay device 30", or the like. Further, "base station device 20" in the following description can be appropriately replaced with "relay device 30", "terminal device 40", or the like. In addition, "acquisition unit 451", "determination unit 452", "connection unit 453", "reception unit 454", or "transmission unit 455" in the following description can be appropriately replaced with the control units 23 and 34, or the like.

As described above, the terminal device 40 performs a predetermined connection procedure (for example, an initial connection procedure such as a random access procedure), so that the radio connection state with the base station device 20 can change from an unconnected state to a connected state.

[Acquisition of Information for Unconnected Transmission]

The acquisition unit 451 of the terminal device 40 acquires information for unconnected transmission. The information for unconnected transmission is predetermined information for transmitting user data to the base station device 20 in an unconnected state. The acquisition unit 451 may acquire the information for unconnected transmission from the base station device 20. In this case, the acquisition unit 451 may receive the information for unconnected transmission via the relay device 30, or may receive the information for unconnected transmission from another terminal device 40 through sidelink communication. It is needless to mention that the acquisition unit 451 may receive the information for unconnected transmission from the base station device 20 directly. The acquisition unit 451 may store the received information for unconnected transmission in the storage unit 42. Note that if the information for unconnected transmission is already stored in the storage unit 42, the terminal device 40 may acquire the information for unconnected transmission from the storage unit 42.

[Transmission of User Data in Unconnected State]

The transmission unit 455 of the terminal device 40 transmits user data to the base station device 20 on the basis of the information for unconnected transmission in an unconnected state. That is, the terminal device 40 performs a process of transmitting the user data in an unconnected state. For example, the terminal device 40 transmits the user data to the base station device 20 using communication parameters stored in the information for unconnected transmission. If the information for unconnected transmission includes the information of radio resources, the transmission unit 455 transmits the user data using the radio resources.

As a result, the terminal device 40 can transmit data without performing an initial connection process. Consequently, the terminal device 40 can reduce signaling and transmit data with high transmission efficiency.

[Determination of Change of Radio Connection State]

The determination unit 452 of the terminal device 40 determines whether or not the radio connection state is changed from an unconnected state to a connected state after the user data is transmitted.

In this case, if the information for unconnected transmission includes "information related to change of radio connection state" in (C1), the determination unit 452 may determine whether or not the radio connection state is changed to a connected state after the user data is transmitted, on the basis of "information related to change of radio connection state".

In this case, the base station device 20 makes a determination prior to the determination of the terminal device 40. For example, the base station device 20 determines whether or not the radio connection state of the terminal device 40 is changed to a connected state after the user data is transmitted, on the basis of BSR notified from the terminal device 40. For example, when the BSR value notified by the terminal device 40 is equal to or higher than a predetermined threshold value, the base station device 20 determines that the radio connection state is changed to a connected state, and when the BSR value is less than the predetermined threshold value, the base station device 20 determines that the unconnected state is maintained. The base station device 20 then notifies the terminal device 40 of the determination result as "information related to change of radio connection state".

Further, the determination unit 452 may determine whether or not the radio connection state is changed from an unconnected state to a connected state after the user data is transmitted, on the basis of whether or not the base station device 20 requests the retransmission of user data. For example, if the base station device 20 does not request the retransmission of user data after the user data is transmitted (for example, if the retransmission request information is ACK), the determination unit 452 may determine that the radio connection state is maintained in an unconnected state even after the user data is transmitted. Alternatively, if the base station device 20 requests the retransmission of user data after the user data is transmitted (for example, if the retransmission request information is NACK), the determination unit 452 may determine that the radio connection state is changed from an unconnected state to a connected state after the user data is transmitted. As a result, if no retransmission request is made, communication can be performed with low delay without performing an initial connection procedure (a predetermined connection procedure), and on the other hand, if a retransmission request is made, the base station device 20 can reliably transmit the user data in a state where the uplink is established.

Here, the retransmission request information is the information of a retransmission request, and includes, for example, HARQ feedback. The retransmission request information includes not only NACK (a negative-acknowledgement) that is transmitted when a reception (an error correction) fails and a retransmission is requested, but also ACK (an acknowledgement) that is transmitted when a reception is successful.

Note that the determination unit 452 may determine that the radio connection state is changed to a connected state after the user data is transmitted, regardless of whether the retransmission request information (for example, the HARQ feedback) is ACK or NACK.

It is needless to mention that the determination unit 452 may determine that the radio connection state is maintained in an unconnected state even after the user data is transmitted, regardless of whether the retransmission request information (for example, the HARQ feedback) is ACK or NACK.

Note that the determination unit 452 may determine whether or not the radio connection state is changed to a connected state after the user data is transmitted by using a method other than the methods described above.

For example, the determination unit 452 may determine that the radio connection state with the base station device 20 is changed to a connected state when the amount of data to be transmitted to the base station device 20 is larger than a predetermined amount. Further, the determination unit 452 may determine that the unconnected state is maintained when the amount of data to be transmitted to the base station device 20 is less than the predetermined amount. For example, when the BSR value is equal to or higher than a predetermined threshold value, the determination unit 452 determines that the radio connection state is changed to a connected state, and when the BSR value is less than the predetermined threshold value, the determination unit 452 determines that the unconnected state is maintained. When the amount of data to be transmitted is large, it is likely that radio resources are difficult to be obtained in the transmission in an unconnected state, and thus data needs to be transmitted many times over time, which is not necessarily efficient. Consequently, efficient transmission is achieved by properly performing transmission in a connected state and transmission in an unconnected state depending on the amount of user data to be transmitted.

Note that the transmission unit 455 of the terminal device 40 may notify the base station device 20 of the determination result. In this case, the transmission unit 455 may explicitly or implicitly notify the determination result as described in <5-2. Signaling>. If the transmission unit 455 implicitly notifies the determination result, the terminal device 40 and the base station device 20 may share in advance information indicating which information is used for determination. For example, if the change of the radio connection state is determined on the basis of the BSR value, the information that the information used for determination is BSR and the threshold value used for determination are shared by the terminal device 40 and the base station device 20. In this case, when the BSR value notified by the terminal device 40 is equal to or higher than a predetermined threshold value, the base station device 20 may determine such a state as the determination result of changing to a connected state, and when the BSR value is less than the predetermined threshold value, the base station device 20 may determine such a state as the determination result of maintaining an unconnected state.

Note that the determination unit 452 may determine whether or not the radio connection state is changed to a connected state after the user data is transmitted, after the user data is transmitted, or before the user data is transmitted.

[Case of Changing to Connected State]

When the determination unit 452 determines that the terminal device 40 is changed to a connected state, the connection unit 453 of the terminal device 40 performs an initial connection procedure (a predetermined connection procedure) to change the radio connection state with the base station device 20 to a connected state. The initial connection procedure is, for example, the random access procedure described in <4-1. Initial Connection Process>. As the radio connection state is changed to a connected state after the user data is transmitted in an unconnected state, the time before the subsequent transmission of the user data starts can be reduced.

Note that when the terminal device 40 is changed to a connected state, the base station device 20 may operate as if the base station device 20 has received the message 1 (Msg1: Random Access Preamble) of the initial connection process. For example, the base station device 20 may perform the initial connection process from the transmission of the message 2 (Msg2: Random Access Response). In this case, the base station device 20 may apply the configuration of a normal initial connection process as the configuration of the initial connection process. Alternatively, the base station device 20 may apply Configuration information dedicatedly applied to the terminal device 40 that is changed to a connected state after the user data is transmitted in an unconnected state.

The base station device 20 may add information related to the initial connection procedure to the retransmission request information (for example, HARQ feedback). That is, the retransmission request information transmitted from the base station device 20 may include information related to the initial connection procedure (for example, a random access procedure). In this case, the retransmission request information may be ACK (acknowledgement) or NACK (negative-acknowledgement). The information related to the initial connection procedure may be, for example, the information of the message 2 of the initial connection procedure.

The connection unit 453 of the terminal device 40 then performs the initial connection procedure from the middle of the procedure by using the information included in the retransmission request information after the user data is transmitted in an unconnected state. For example, when the information of the message 2 is added to the retransmission request information, the connection unit 453 may perform the initial connection procedure from the transmission of the message 3 (Msg3: Scheduled Transmission). In this case, the connection unit 453 may or may not transmit a contention resolution message (Msg4). This reduces the number of steps in the initial connection procedure and thus reduces signaling. As a result, high transmission efficiency is achieved. Moreover, even after the first user data is transmitted in an unconnected state, the user data can be continuously transmitted in a state where the uplink is established without much delay.

[Case of not Changing to Connected State]

On the other hand, when the determination unit 452 determines that the radio connection state of the terminal device 40 is not changed to a connected state, the terminal device 40 maintains the radio connection state in an unconnected state. Since the unconnected state is maintained, the terminal device 40 can immediately shift to a standby state. As a result, power consumption is suppressed.

Further, when the base station device 20 receives the user data from the terminal device 40, the base station device 20 may transmit the retransmission request information such as HARQ feedback to the terminal device 40. Note that when the retransmission request information is ACK (acknowledgement), the base station device 20 may add terminal identification information (for example, C-RNTI or the like) to the retransmission request information. Further, when the retransmission request information is NACK (negative-acknowledgement), the base station device 20 may add the information of the message 2 (Msg2: Random Access Response) of the initial connection procedure to the retransmission request information. When the radio connection state needs to be changed to a connected state, the initial connection procedure can be completed in a short time.

Note that when the transmission unit 455 of the terminal device 40 receives the ACK as the retransmission request information, it is not necessary to retransmit the user data, and thus the radio connection state with the base station device 20 is maintained in an unconnected state without performing a process such as retransmission. Further, when the transmission unit 455 receives the NACK as the retransmission request information, the transmission unit 455 may retransmit the user data while maintaining the radio connection state with the base station device 20 in an unconnected state. In this case, the transmission unit 455 may retransmit the user data until the ACK is received or the maximum number of retransmissions is reached.

Note that even if the transmission unit 455 receives the NACK as the retransmission request information, the transmission unit 455 does not necessarily have to perform the retransmission. It is needless to mention that when the transmission unit 455 receives the NACK as the retransmission request information, the transmission unit 455 may perform the retransmission. Note that in a case where the terminal device 40 cannot receive the ACK even if the user data is retransmitted a preset number of times, the terminal device 40 may change the radio connection state with the base station device 20 to a connected state.

While the transmission process (the transmission in an unconnected state) has been described above, specific sequence examples of the transmission process (the transmission in an unconnected state) will be described below. Six sequence examples (1) to (6) are described in the present embodiment.

5-4. Sequence Example (1)

Figure 22:
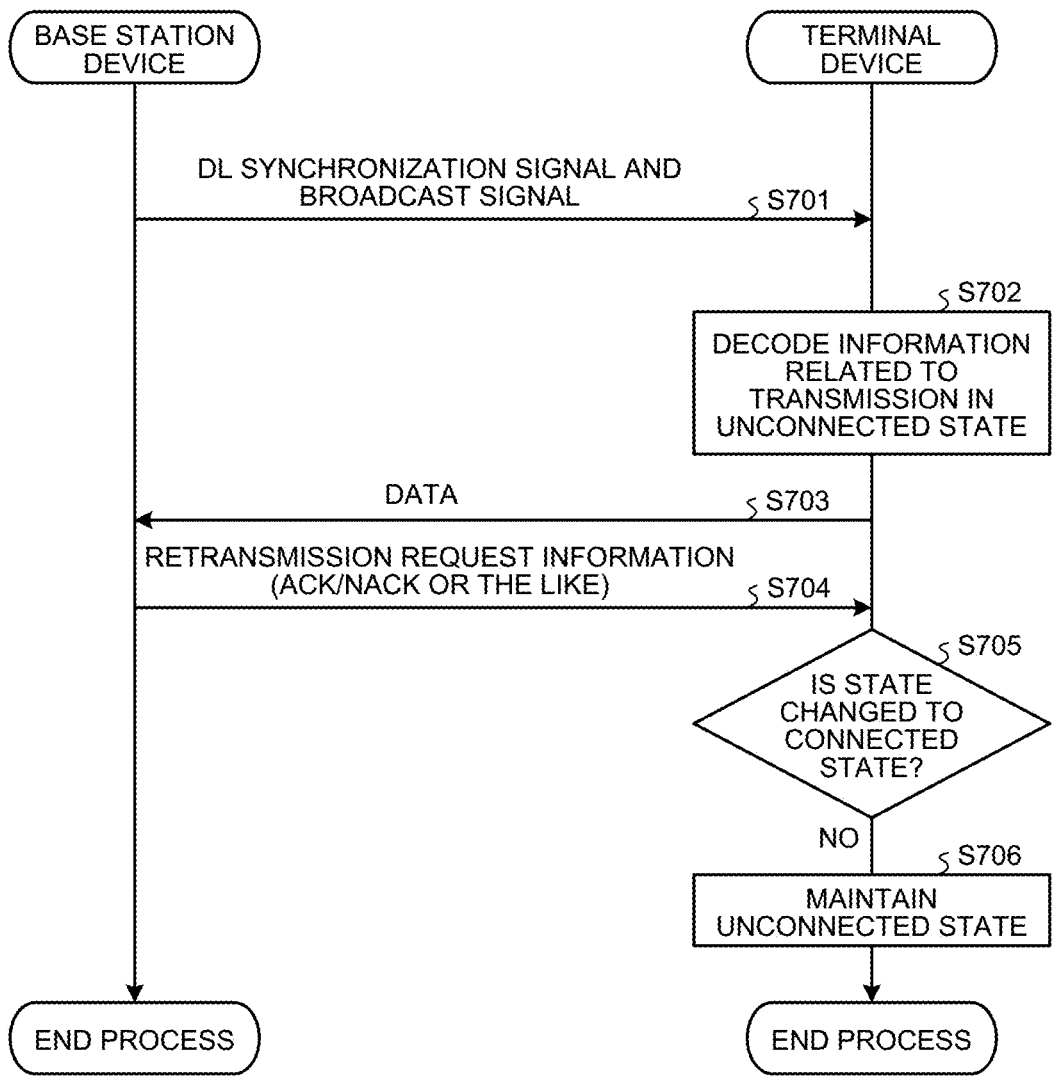
FIG. 22 is a diagram illustrating specific sequence example (1) of a transmission process (transmission in an unconnected state).

FIG. 22 is a diagram illustrating specific sequence example (1) of the transmission process (the transmission in an unconnected state). FIG. 22 illustrates an example in which the terminal device 40 maintains an unconnected state after transmitting user data to the base station device 20 in an unconnected state. The process to be described below is performed in a state where the terminal device 40 is not connected to the base station device 20.

The base station device 20 transmits a downlink synchronization signal and a broadcast signal (MIB, SIB, or the like) to the subordinate terminal device 40 in an unconnected state (step S701). When receiving these signals, the acquisition unit 451 of the terminal device 40 decodes the received signals and extracts information for unconnected transmission (step S702). The information for unconnected transmission is information related to transmission in an unconnected state. The transmission unit 455 then transmits user data to the base station device 20 on the basis of the information for unconnected transmission (step S703).

The base station device 20 transmits retransmission request information (ACK/NACK or the like) to the terminal device 40 (step S704). Note that as described above, the base station device 20 does not necessarily have to transmit the retransmission request information to the terminal device 40.

In the terminal device 40, the determination unit 452 determines whether or not the state is changed to a connected state on the basis of the information for unconnected transmission or the retransmission request information received (step S705). Note that FIG. 22 illustrates a case where the determination unit 452 determines that the state is not changed to a connected state. Consequently, the terminal device 40 maintains an unconnected state (step S706), and a series of processes ends.

5-5. Sequence Example (2)

Figure 23:
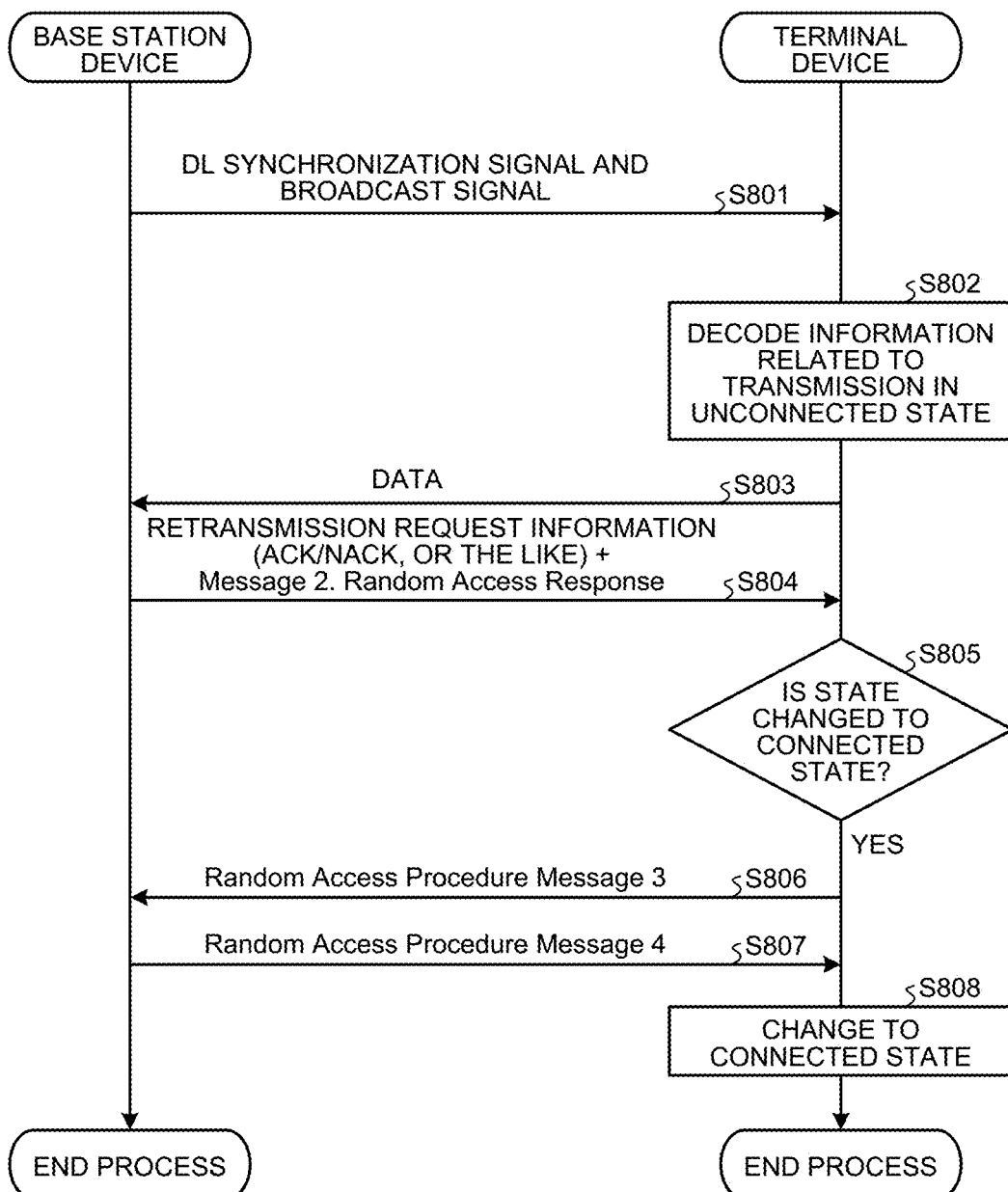
FIG. 23 is a diagram illustrating specific sequence example (2) of the transmission process (the transmission in an unconnected state).

FIG. 23 is a diagram illustrating specific sequence example (2) of the transmission process (the transmission in an unconnected state). FIG. 23 illustrates an example in which the terminal device 40 is changed to a connected state after transmitting user data to the base station device 20 in an unconnected state. The process to be described below is performed in a state where the terminal device 40 is not connected to the base station device 20.

The base station device 20 transmits a downlink synchronization signal and a broadcast signal (MIB, SIB, or the like) to the subordinate terminal device 40 in an unconnected state (step S801). When receiving these signals, the acquisition unit 451 of the terminal device 40 decodes the received signals and extracts information for unconnected transmission (step S802). The information for unconnected transmission is information related to transmission in an unconnected state. The transmission unit 455 then transmits user data to the base station device 20 on the basis of the information for unconnected transmission (step S803).

The base station device 20 transmits the random access response of the initial connection process and the retransmission request information such as an acknowledgement or a negative-acknowledgement to the terminal device 40 (step S704). Note that as described above, the base station device 20 does not necessarily have to transmit the retransmission request information to the terminal device 40.

In the terminal device 40, the determination unit 452 determines whether or not the state is changed to a connected state on the basis of the information for unconnected transmission, the information of the random access response, or the retransmission request information received (step S805). Note that FIG. 23 illustrates a case where the determination unit 452 determines that the state is changed to a connected state. In this case, the terminal device 40 transmits the message 3 of the initial connection process to the base station device 20 (step S806). The base station device 20 then transmits the contention resolution (the message 4) of the initial connection process to the terminal device 40 (step S807). After that, the terminal device 40 is changed to a connected state (step S808), and a series of processes ends.

5-6. Sequence Example (3)

Figure 24:
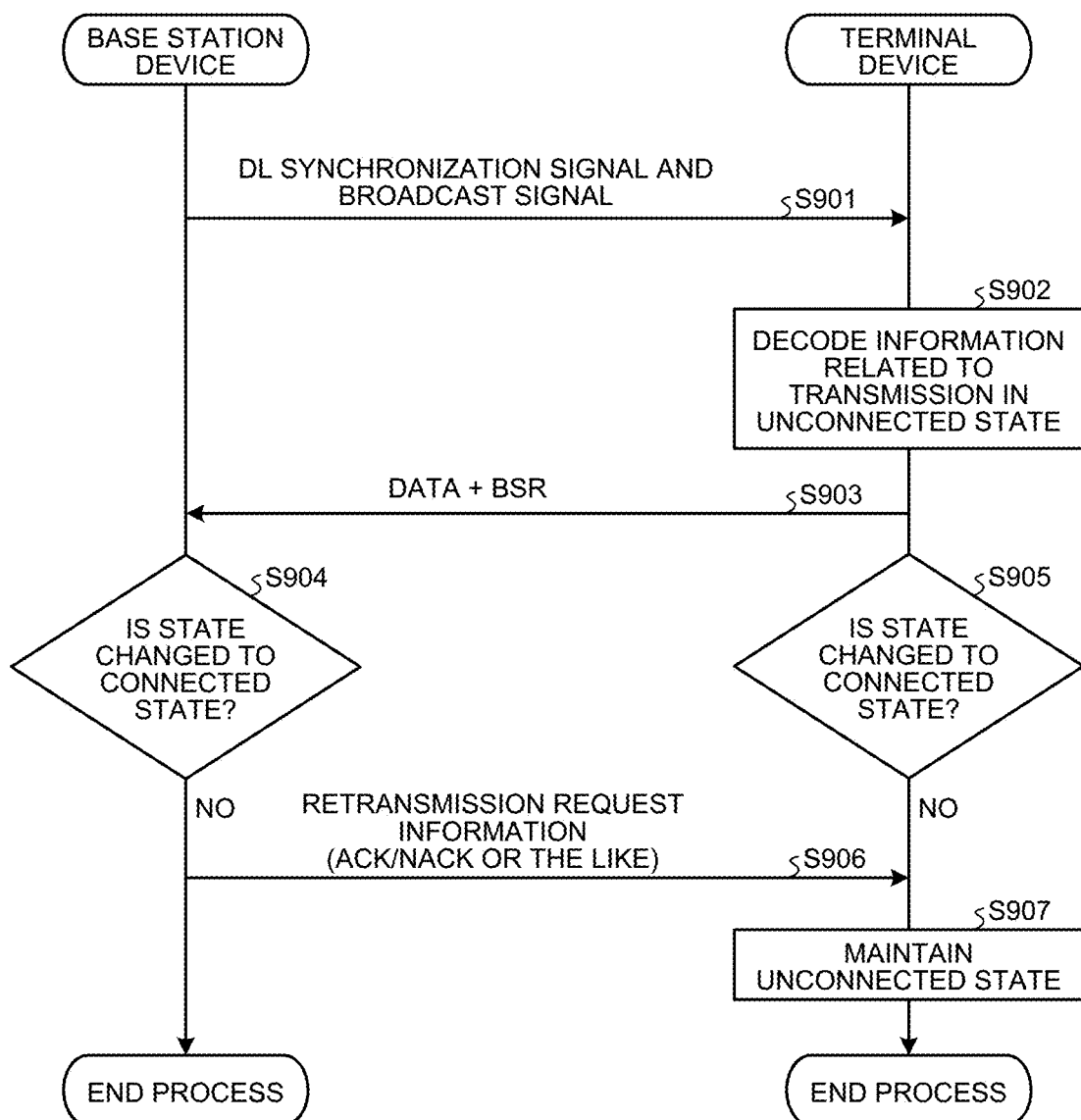
FIG. 24 is a diagram illustrating specific sequence example (3) of the transmission process (the transmission in an unconnected state).

FIG. 24 is a diagram illustrating specific sequence example (3) of the transmission process (the transmission in an unconnected state). FIG. 24 illustrates an example in which the terminal device 40 maintains an unconnected state by implicit notification using BSR after transmitting user data to the base station device 20 in an unconnected state. The process to be described below is performed in a state where the terminal device 40 is not connected to the base station device 20.

The base station device 20 transmits a downlink synchronization signal and a broadcast signal (MIB, SIB, or the like) to the subordinate terminal device 40 in an unconnected state (step S901). When receiving these signals, the acquisition unit 451 of the terminal device 40 decodes the received signals and extracts information for unconnected transmission (step S902). The information for unconnected transmission is information related to transmission in an unconnected state. The transmission unit 455 transmits user data and BSR to the base station device 20 on the basis of the information for unconnected transmission (step S903).

The base station device 20 and the terminal device 40 determine whether or not the terminal device 40 is changed to a connected state on the basis of a BSR value (steps S904 and S905). Further, the base station device 20 transmits retransmission request information such as an acknowledgement or a negative-acknowledgement to the terminal device 40 (step S906). Note that the base station device 20 does not necessarily have to transmit the retransmission request information to the terminal device 40, as described above.

Note that FIG. 24 illustrates a case where the base station device 20 and the terminal device 40 determine that the state is not changed to a connected state. Consequently, the terminal device 40 maintains an unconnected state (step S907), and a series of processes ends.

5-7. Sequence Example (4)

Figure 25:
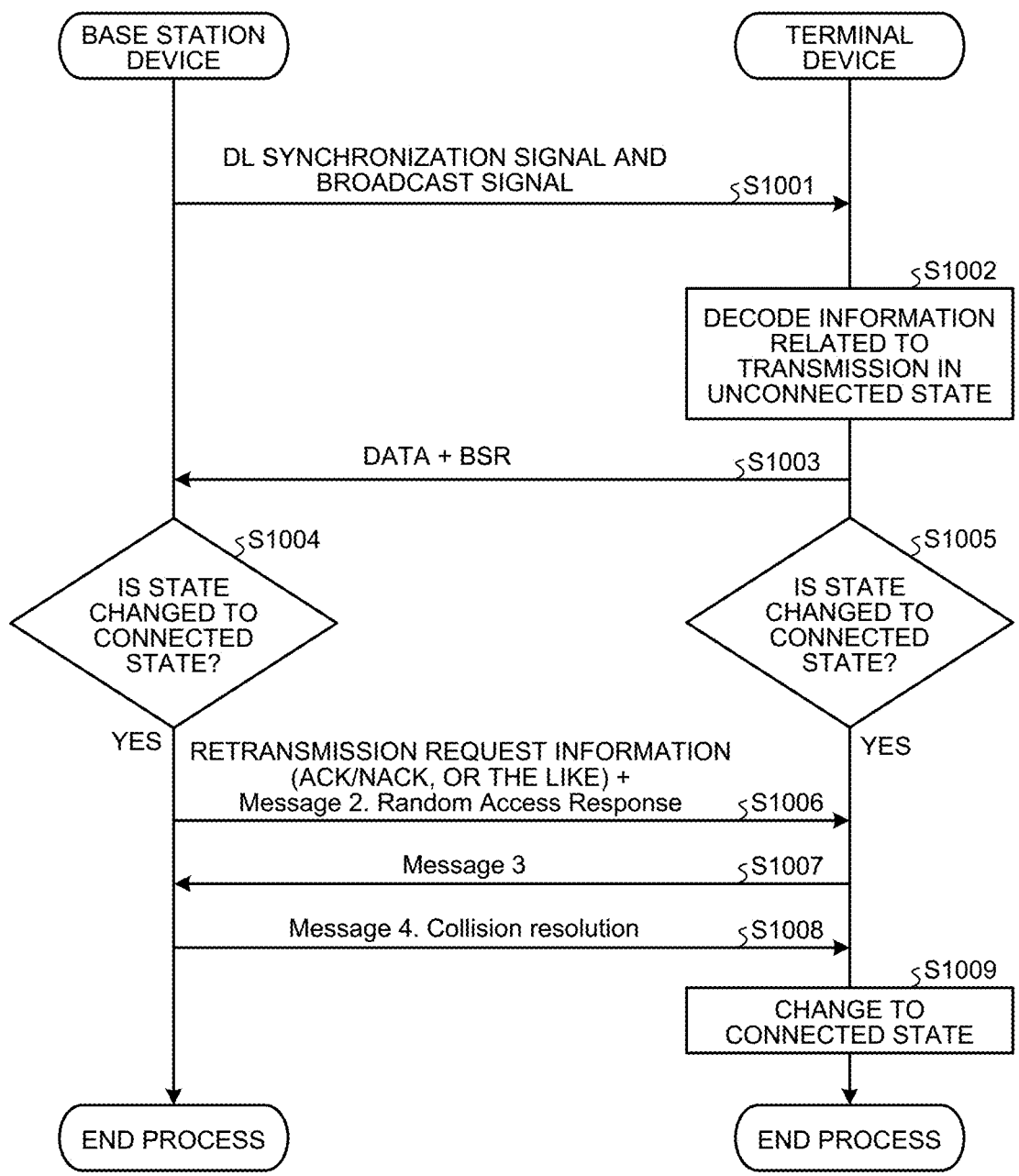
FIG. 25 is a diagram illustrating specific sequence example (4) of the transmission process (the transmission in an unconnected state).

FIG. 25 is a diagram illustrating specific sequence example (4) of the transmission process (the transmission in an unconnected state). FIG. 25 illustrates an example in which the terminal device 40 is changed to a connected state by implicit notification using BSR after transmitting user data to the base station device 20 in an unconnected state. The process to be described below is performed in a state where the terminal device 40 is not connected to the base station device 20.

The base station device 20 transmits a downlink synchronization signal and a broadcast signal (MIB, SIB, or the like) to the subordinate terminal device 40 in an unconnected state (step S1001). When receiving these signals, the acquisition unit 451 of the terminal device 40 decodes the received signals and extracts information for unconnected transmission (step S1002). The information for unconnected transmission is information related to transmission in an unconnected state. The transmission unit 455 transmits user data and BSR to the base station device 20 on the basis of the information for unconnected transmission (step S1003).

The base station device 20 and the terminal device 40 determine whether or not the terminal device 40 is changed to a connected state on the basis of a BSR value (steps S1004 and S1005). Further, the base station device 20 transmits retransmission request information (ACK/NACK or the like) and the message 2 of the initial connection process to the terminal device 40 (step S1006). Note that the base station device 20 does not necessarily have to transmit the retransmission request information to the terminal device 40, as described above.

Note that FIG. 25 illustrates a case where the base station device 20 and the terminal device 40 determine that the state is changed to a connected state. In this case, the terminal device 40 transmits the message 3 of the initial connection process to the base station device 20 (step S1007). The base station device 20 then transmits the contention resolution (the message 4) of the initial connection process to the terminal device 40 (step S1008). After that, the terminal device 40 is changed to a connected state (step S1009), and a series of processes ends.

5-8. Sequence Example (5)

Figure 26:
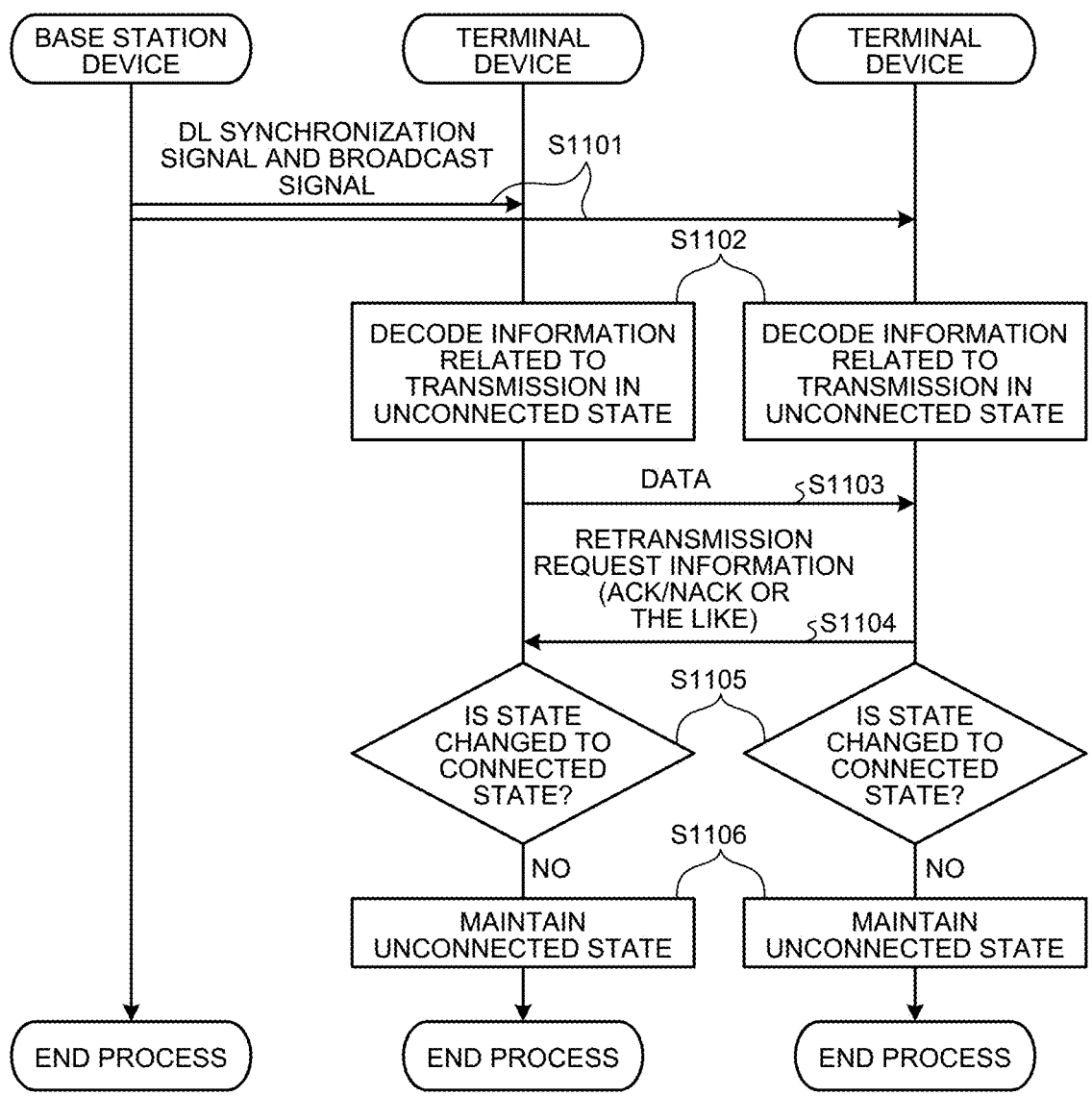
FIG. 26 is a diagram illustrating specific sequence example (5) of the transmission process (the transmission in an unconnected state).

FIG. 26 is a diagram illustrating specific sequence example (5) of the transmission process (the transmission in an unconnected state). FIG. 26 illustrates an example of communication (sidelink) between the terminal devices 40 that are subordinate to the base station device 20 (within a coverage). The process to be described below is performed in a state where the terminal devices 40 are not connected to the base station device 20.

The base station device 20 transmits a downlink synchronization signal and a broadcast signal (MIB, SIB, or the like) to each of the subordinate terminal devices 40 in an unconnected state (step S1101). When receiving these signals, the acquisition unit 451 of each of the terminal devices 40 decodes the received signals and extracts information for unconnected transmission (step S1102). The information for unconnected transmission is information related to transmission in an unconnected state. The transmission unit 455 then transmits user data to another terminal device 40 on the basis of the information for unconnected transmission (step S1103).

When receiving the user data, the other terminal device 40 transmits retransmission request information (ACK/NACK, or the like) to the terminal device 40 (step S1104). Note that as with the base station device 20 described above, the terminal device 40 having received the user data does not necessarily have to transmit the retransmission request information to the terminal device 40 as a data transmission source.

In each terminal device 40, the determination unit 452 determines whether or not the state is changed to a connected state on the basis of the information for unconnected transmission or the retransmission request information received (step S1105). Note that FIG. 26 illustrates a case where the determination unit 452 determines that the state is not changed to a connected state. Consequently, each terminal device 40 maintains an unconnected state (step S1106), and a series of processes ends.

5-9. Sequence Example (6)

FIG. 27 is a diagram illustrating specific sequence example (6) of the transmission process (the transmission in an unconnected state). FIG. 27 illustrates an example of communication (sidelink) between the terminal devices 40 with a parent-child relationship outside the range of the base station device 20 (outside a coverage). In the example of FIG. 27, the terminal device 40 (a child) is "communication device" that transmits user data, and the terminal device 40 (a parent) is "another communication device" that receives user data. The process to be described below is performed in a state where the terminal device 40 (a child) is not connected to the terminal device 40 (a parent).

The terminal device 40 (a parent) transmits a downlink synchronization signal and a broadcast signal (MIB, SIB, or the like) to the terminal device 40 (a child) in an unconnected state (step S1201). When receiving these signals, the acquisition unit 451 of the terminal device 40 (a child) decodes the received signals and extracts information for unconnected transmission (step S1202). The information for unconnected transmission is information related to transmission in an unconnected state. The transmission unit 455 of the terminal device 40 (a child) transmits data to the terminal device 40 (a parent) on the basis of the information for unconnected transmission (step S1203).

The terminal device 40 (a parent) determines whether or not the state is changed to a connected state on the basis of the information for unconnected transmission or the status of the data received (step S1204). Further, the terminal device 40 (a parent) transmits retransmission request information (ACK/NACK or the like) and the message 2 of the initial connection process to the terminal device 40 (step S1205). Note that as with the base station device 20 described above, the terminal device 40 (a parent) does not necessarily have to transmit the retransmission request information to the terminal device 40 (a child).

Note that FIG. 27 illustrates a case where the terminal device 40 (a parent) determines that the terminal device 40 (a child) is changed to a connected state. In this case, the terminal device 40 (a child) transmits the message 3 of the initial connection process to the terminal device 40 (a parent) (step S1206). The terminal device 40 (a parent) then transmits the contention resolution (the message 4) of the initial connection process to the terminal device 40 (a child) (step S1207). After that, the terminal device 40 (a child) is changed to a connected state (step S1208), and a series of processes ends.

5-10. Repetition

In transmitting user data in an unconnected state, dedicated radio resources are sometimes assigned as described in (A1) of <5-1. Resource Assignment>. However, in many cases, in transmitting user data in an unconnected state, it is assumed that radio resources shared with other radio devices are assigned as described in (A2) to (A4). In this case, there is a possibility of collisions with the communication of other radio devices.

Consequently, when the transmission unit 455 of the terminal device 40 transmits the user data in an unconnected state, the transmission unit 455 may perform a repetition of the user data. Here, the repetition is a transmission in which the communication device on a data transmission side voluntarily repeats the transmission of data without a retransmission request from a communication device on a data reception side. The repetition improves the reliability of data transmission.

Here, the transmission unit 455 may perform the repetition of user data using the same beam. Further, the transmission unit 455 may switch transmission parameters depending on the number of times of repetitions. For example, the transmission unit 455 may increase the transmission power more than the conventional transmission power on the basis of the information related to the current number of times of repetitions. Alternatively, the transmission unit 455 may switch Redundancy Version (RV) to another RV on the basis of the information related to the current number of time of repetitions. It is thus possible to reduce the possibility that the user data does not reach the base station device 20 due to a collision with the communication of other radio devices.

Further, the transmission unit 455 may perform the repetition of user data using different beams. For example, the transmission unit 455 may switch a beam direction to transmit the user data in all directions. Even when the terminal device 40 is moving, the user data can easily reach the base station device 20.

5-11. Process Related to Retransmission Request

When the base station device 20 fails to receive user data in an unconnected state, the base station device 20 may or may not transmit retransmission request information to the terminal device 40. As described above, the retransmission request information is the information of a retransmission request, and includes, for example, HARQ feedback.

[Case of not Transmitting Retransmission Request Information]

When the data transmission of the terminal device 40 is the transmission of user data in an unconnected state, the base station device 20 does not have to transmit the retransmission request information (for example, ACK/NACK) to the terminal device 40. In this case, the base station device 20 may notify the terminal device 40 in advance that the retransmission request information is not transmitted (the retransmission request information is disabled). The base station device 20 may notify the disablement of the retransmission request information by RRC signaling or by broadcast communication (MIB, SIB, or the like).

[Case of Transmitting Retransmission Request Information]

When the data transmission of the terminal device 40 is the transmission of user data in an unconnected state, the base station device 20 may explicitly or implicitly notify the terminal device 40 of the retransmission request information (for example, ACK/NACK).

When a notification is explicitly made, the base station device 20 may make a notification by DCI or paging. In this case, the base station device 20 may add information that designates radio resources for retransmission to the retransmission request information.

In a case where a notification is implicitly made, when the terminal device 40 receives DCI that designates retransmission resources, the terminal device 40 may be regarded as having received the NACK from the base station device 20. Alternatively, the terminal device 40 may be regarded as having received the ACK or NACK from the base station device 20 when a predetermined timer expires after the transmission of the user data.

[Determination of Success/Failure of Transmission]

The transmission unit 455 of the terminal device 40 determines whether or not the transmission of user data in an unconnected state fails on the basis of the operation of the base station device 20 after the user data is transmitted to the base station device 20 in an unconnected state.

For example, when the retransmission request information is explicitly notified, the transmission unit 455 determines whether or not the transmission of user data in an unconnected state fails on the basis of the retransmission request information.

When the retransmission request information is implicitly notified, the transmission unit 455 determines whether or not the transmission of user data in an unconnected state fails on the basis of the implicit notification. For example, the transmission unit 455 determines that the transmission of user data fails when the radio resources for retransmission are notified by DCI or the like. Further, the transmission unit 455 determines that the transmission of user data fails or succeeds when the set time elapses from the transmission of user data (for example, when a predetermined timer expires).

When the transmission unit 455 determines that the transmission of user data fails, the transmission unit 455 retransmits the user data.

5-12. Power Ramping

When the transmission unit 455 determines that the transmission of user data in an unconnected state fails, the transmission power may be increased to retransmit the user data. By repeatedly transmitting the same data while increasing the power, it is possible to absorb the influence of fluctuations in propagation loss due to the movement of the terminal device 40 or the like.

5-13. Uplink Synchronization Compensation

Note that when the user data is transmitted in an unconnected state, the uplink is not established and the timing of a transmission signal is not advanced. For this reason, the base station device 20 may fail to receive the user data.

Consequently, when transmitting the user data in an unconnected state, the transmission unit 455 may transmit data using a cyclic prefix length longer than the cyclic prefix length in the case of transmitting the user data in a connected state. The base station device 20 can easily receive the user data successfully.

Note that the transmission unit 455 may provide a buffer behind a frame so that the uplink transmission does not exceed a frame length and transmit data to the base station device 20.

6. Modification

The embodiment described above shows an example, and various modifications and applications are possible.

6-1. Modification Related to Transmission and Reception Process and Transmission Process The above embodiment mainly describes an example in the case of data transmission in an uplink (including data transmission in an uplink direction in a state where the uplink is not established), but the embodiment described above is not limited to only the uplink. The embodiment described above is also applicable to downlink or sidelink (for example, Device to Device (D2D)) communication. Further, the embodiment described above can also be applied to communication between a base station and a relay terminal, and communication between a relay terminal and a user terminal.

For example, the transmission and reception process (Grant Based, Configured Grant, downlink) and the transmission process (the transmission in an unconnected state) described in the above embodiment are processes mainly in the communication between the base station device 20 and the terminal device 40. However, the transmission and reception process and the transmission process described above can also be applied to the communication between the relay device 30 and the terminal device 40. In this case, the base station device 20 in the transmission and reception process and the transmission process described above is appropriately replaced with the relay device 30.

Further, the transmission and reception process (Grant Based, Configured Grant, downlink) and the transmission process (the transmission in an unconnected state) described above are also applicable to the communication between the base station device 20 and the relay device 30. In this case, the terminal device 40 in the transmission and reception process and the transmission process described above is appropriately replaced with the relay device 30.

Further, the transmission and reception process (Grant Based, Configured Grant, downlink) and the transmission process (the transmission in an unconnected state) described above are also applicable to the communication (sidelink) between the terminal device 40 and the terminal device 40. In this case, the base station device 20 in the transmission and reception process and the transmission process described above is appropriately replaced with the terminal device 40. The terminal device 40 may separately acquire MA resource assignment and division pattern information (division pattern candidate information, and division pattern designation information) from the base station device 20.

Further, the transmission and reception process (Grant Based, Configured Grant, downlink) and the transmission process (the transmission in an unconnected state) described above are also applicable to the communication between the base station device 20 and the base station device 20 and the communication between the relay device 30 and the base station device 20. In this case, the base station device 20 and the terminal device 40 in the transmission and reception process and transmission process described above are appropriately replaced with the base station device 20 or the relay device 30.

Furthermore, the information for unconnected transmission (predetermined information) is information in which the communication device (for example, the terminal device 40) transmits user data to another communication device (for example, the base station device 20) in an unconnected state in the above embodiment, but the information for unconnected transmission may be information for transmitting data other than user data to another communication device (for example, a base station device) in an unconnected state. In this case, the communication device (for example, the terminal device 40) may transmit the data to another communication device (for example, the base station device 20) in an unconnected state on the bases of the information for unconnected transmission (predetermined information).

6-2. Other Modifications

The control device for controlling the management device 10, the base station device 20, the relay device 30, or the terminal device 40 of the present embodiment may be implemented by a dedicated computer system or a general-purpose computer system.

For example, the communication program for executing the operations described above (for example, the transmission and reception process and the transmission process) may be stored and in a computer-readable recording medium such as an optical disk, a semiconductor memory, a magnetic tape, or a flexible disk, and may be distributed. Further, the control device is configured by, for example, installing the program on a computer and performing the processes described above. In this case, the control device may be a device outside the base station device 20, the relay device 30, or the terminal device 40 (for example, a personal computer). Alternatively, the control device may be a device inside the base station device 20, the relay device 30, or the terminal device 40 (for example, the control unit 23, the control unit 34, or the control unit 45).

Furthermore, the communication program may be stored in a disk device included in a server device on a network such as the Internet so that the communication program can be downloaded to a computer or the like. Alternatively, the functions described above may be achieved by the cooperation of an operating system (OS) and application software. In this case, the parts other than the OS may be stored in a medium and distributed, or the parts other than the OS may be stored in the server device so as to be downloaded to a computer or the like.

Moreover, among the processes described in the above embodiment, all or part of the processes described as being automatically performed can be manually performed, or all or part of the processes described as being manually performed can be automatically performed by a known method. In addition, information including a processing procedure, a specific name, and various data and parameters in the above document and drawings can be arbitrarily changed unless otherwise specified. For example, the various information illustrated in each figure is not limited to the illustrated information.

Further, each component of each of the illustrated devices is a functional concept, and does not necessarily have to be physically configured as illustrated in the figure. That is, the specific form of distribution and integration of the respective devices is not limited to the one illustrated in the figure, and all or part thereof may be functionally or physically distributed or integrated in arbitrary units according to various loads and usage conditions.

Moreover, the embodiments described above can be appropriately combined within the range in which the processing contents do not contradict each other. Further, the order of the respective steps illustrated in the sequence diagrams of the embodiment described above can be changed as appropriate.

7. Conclusion

As described above, according to an embodiment of the present disclosure, the terminal device 40 is a communication device in which the radio connection state with the base station device 20 changes from an unconnected state to a connected state by performing a predetermined connection procedure (for example, an initial connection procedure such as a random access procedure). The terminal device 40 includes the acquisition unit 451 that acquires predetermined information (information for unconnected transmission) for transmitting user data to the base station device 20 in an unconnected state, and the transmission unit 455 that transmits the user data to the base station device 20 in an unconnected state on the basis of the predetermined information. As a result, the terminal device 40 can transmit data with reduced signaling. As a result, the communication system 1 can achieve high transmission efficiency.

Each embodiment of the present disclosure has been described above, but the technical scope of the present disclosure is not limited to each of the embodiments described above, and various changes can be made without departing from the gist of the present disclosure. In addition, components of different embodiments and modifications may be combined as appropriate.

Moreover, the effects described in the present specification are merely examples and are not limited, and other effects may be obtained.

Note that the present technique may also be configured as follows.

(1)

A communication device in which a radio connection state with another communication device changes from an unconnected state to a predetermined connected state by performing a predetermined connection procedure, the communication device comprising:
   an acquisition unit that acquires predetermined information for transmitting data to the another communication device in the unconnected state; and
   a transmission unit that transmits the data to the another communication device in the unconnected state based on the predetermined information.

(2)

The communication device according to (1), further comprising
   a determination unit that makes a determination as to change of the radio connection state, wherein
   the transmission unit transmits user data to the another communication device in the unconnected state based on the predetermined information, and
   the determination unit determines whether or not the radio connection state is changed from the unconnected state to the predetermined connected state after the user data is transmitted.

(3)

The communication device according to (2), wherein
   the acquisition unit acquires information related to the change of the radio connection state after the user data is transmitted from the another communication device, and
   the determination unit determines whether or not the radio connection state is changed to the predetermined connected state after the user data is transmitted, based on the information related to the change of the radio connection state.

(4)

The communication device according to (2), wherein
   the determination unit determines whether or not the radio connection state is changed from the unconnected state to the predetermined connected state after the user data is transmitted, based on whether or not the another communication device requests a retransmission of the user data.

(5)

The communication device according to (4), wherein
   the determination unit determines that the radio connection state is maintained in the unconnected state after the user data is transmitted, when the another communication device does not request the retransmission of the user data.

(6)

The communication device according to (4), wherein
   the determination unit determines that the radio connection state is changed from the unconnected state to the connected state after the user data is transmitted, when the another communication device requests the retransmission of the user data.

(7)

The communication device according to (6), further comprising
   a connection unit that performs the predetermined connection procedure, wherein
   information related to the predetermined connection procedure is added to information related to a retransmission request transmitted from the another communication device, and
   after the user data is transmitted in the unconnected state, the connection unit performs the predetermined connection procedure from a middle of the procedure by using the information related to the predetermined connection procedure.

(8)

The communication device according to any one of (1) to (7), wherein
the acquisition unit acquires, as the predetermined information, radio resource information for transmitting user data to the another communication device in the unconnected state, and
the transmission unit transmits the user data to the another communication device in the unconnected state based on the radio resource information.

(9)

The communication device according to (8), wherein
a radio resource specified by the radio resource information includes a radio resource for random access, a broadcast radio resource, or a radio resource for Supplementary Uplink (SUL), and
the transmission unit transmits the user data to the another communication device in the unconnected state by using the radio resource for random access, the broadcast radio resource, or the radio resource for SUL.

(10)

The communication device according to any one of (1) to (9), wherein
the acquisition unit acquires, as the predetermined information, a communication parameter for transmitting user data to the another communication device in the unconnected state, and
the transmission unit transmits the user data to the another communication device in the unconnected state based on the communication parameter.

(11)

The communication device according to (10), wherein
the communication parameter includes at least one of time-frequency resource information, frequency hopping information, Modulation and coding scheme (MCS) information, repetition count information, redundancy version information, Hybrid Automatic Repeat reQuest (HARQ) process information, transmission power information, Demodulation Reference Signal (DMRS) information, and precoding information.

(12)

The communication device according to any one of (1) to (11), wherein
the acquisition unit acquires, as the predetermined information, information transmitted from the another communication device using a predetermined control channel or a channel for Downlink Control Information (DCI) transmission.

(13)

The communication device according to (12), wherein
the predetermined control channel includes at least one channel of a broadcast channel, a paging channel, and a channel for RRC messages, and
the acquisition unit acquires, as the predetermined information, information transmitted from the another communication device using the predetermined control channel.

(14)

The communication device according to any one of (1) to (13), wherein
when the transmission unit transmits user data to the another communication device in the unconnected state, the transmission unit repeatedly transmits the user data.

(15)

The communication device according to (14), wherein
when the transmission unit transmits user data to the another communication device in the unconnected state, the transmission unit repeatedly transmits the user data using a different beam.

(16)

The communication device according to any one of (1) to (15), wherein
the transmission unit determines whether or not transmission of the user data in the unconnected state fails based on an operation of the another communication device after the user data is transmitted to the another communication device in the unconnected state, and
when it is determined that the transmission of the user data fails, the transmission unit retransmits the user data.

(17)

The communication device according to (16), wherein
when it is determined that the transmission of the user data in the unconnected state fails, the transmission unit increases transmission power and retransmits the user data.

(18)

The communication device according to any one of (1) to (17), wherein
when the transmission unit transmits user data to the another communication device in the unconnected state, the transmission unit transmits data using a cyclic prefix length longer than a cyclic prefix length in a case of transmitting user data in the predetermined connected state.

(19)

The communication device according to any one of (1) to (18), wherein
predetermined information is information for transmitting user data to the another communication device in the unconnected state, and
the transmission unit transmits the user data to the another communication device in the unconnected state based on the predetermined information.

(20)

A communication method performed by a communication device in which a radio connection state with another communication device changes from an unconnected state to a predetermined connected state by performing a predetermined connection procedure, the communication method comprising:
acquiring predetermined information for transmitting data to the another communication device in the unconnected state; and
transmitting the data to the another communication device in the unconnected state based on the predetermined information.

(21)

A communication method performed by a communication device in which a radio connection state with another communication device changes from an unconnected state to a predetermined connected state by performing a predetermined connection procedure, the communication method including:
acquiring predetermined information for transmitting user data to the another communication device in the unconnected state; and
transmitting the user data to the another communication device in the unconnected state based on the predetermined information.

(22)
A communication program that causes a computer that controls a communication device in which a radio connection state with another communication device changes from an unconnected state to a predetermined connected state by performing a predetermined connection procedure to function as:
   an acquisition unit that acquires predetermined information for transmitting data to the another communication device in the unconnected state; and
   a transmission unit that transmits the data to the another communication device in the unconnected state based on the predetermined information.

(23)
A communication program that causes a computer that controls a communication device in which a radio connection state with another communication device changes from an unconnected state to a predetermined connected state by performing a predetermined connection procedure to function as:
   an acquisition unit that acquires predetermined information for transmitting user data to the another communication device in the unconnected state; and
   a transmission unit that transmits the user data to the another communication device in the unconnected state based on the predetermined information.

REFERENCE SIGNS LIST

1 COMMUNICATION SYSTEM
10 MANAGEMENT DEVICE
20 BASE STATION DEVICE
30 RELAY DEVICE
40 TERMINAL DEVICE
12, 22, 32, 42 STORAGE UNIT
13, 23, 34, 45 CONTROL UNIT
211, 311, 411 RECEPTION PROCESSING UNIT
211a, 411a RADIO RECEPTION UNIT
211b, 411b DEMULTIPLEXING UNIT
211c, 411c DEMODULATION UNIT
211d, 411d DECODING UNIT
212, 312, 412 TRANSMISSION PROCESSING UNIT
212a, 412a CODING UNIT
212b, 412b MODULATION UNIT
212c, 412c MULTIPLEXING UNIT
212d, 412d RADIO TRANSMISSION UNIT
213, 313, 413 ANTENNA
231, 451 ACQUISITION UNIT
232 PROCESSING UNIT
452 DETERMINATION UNIT
453 CONNECTION UNIT
233, 454 RECEPTION UNIT
234, 456 SEPARATION UNIT
235, 455 TRANSMISSION UNIT

The invention claimed is:

1. A communication device in which a radio connection state with another communication device changes from an unconnected state to a predetermined connected state by performing a predetermined connection procedure, the communication device comprising:
   control circuitry configured to acquire predetermined information for transmitting data to the another communication device in the unconnected state; and
   a transceiver configured to transmit the data to the another communication device in the unconnected state based on the predetermined information,
   wherein the control circuitry is further configured to:
      make a determination regarding a change of the radio connection state, and
      determine whether or not the radio connection state is changed from the unconnected state to the predetermined connected state after the user data is transmitted based on the acquired information related to the change of the radio connection state,
   wherein the information related to the change of the radio connection state indicates a retransmission condition of the user data.

2. The communication device according to claim 1, wherein
   the control circuitry is further configured to determine that the radio connection state is maintained in the unconnected state after the user data is transmitted, when the another communication device does not request the retransmission of the user data.

3. The communication device according to claim 1, wherein
   the control circuitry is further configured to determine that the radio connection state is changed from the unconnected state to the connected state after the user data is transmitted, when the another communication device requests the retransmission of the user data.

4. The communication device according to claim 3, wherein
   the control circuitry is further configured to perform the predetermined connection procedure,
   information related to the predetermined connection procedure is added to information related to a retransmission request transmitted from the another communication device, and
   after the user data is transmitted in the unconnected state, the control circuitry is further configured to perform the predetermined connection procedure from a middle of the procedure by using the information related to the predetermined connection procedure.

5. The communication device according to claim 1, wherein
   the control circuitry is further configured to acquire, as the predetermined information, radio resource information for transmitting user data to the another communication device in the unconnected state, and
   the transceiver transmits the user data to the another communication device in the unconnected state based on the radio resource information.

6. The communication device according to claim 5, wherein
   a radio resource specified by the radio resource information includes a radio resource for random access, a broadcast radio resource, or a radio resource for Supplementary Uplink (SUL), and
   the transceiver transmits the user data to the another communication device in the unconnected state by using the radio resource for random access, the broadcast radio resource, or the radio resource for SUL.

7. The communication device according to claim 1, wherein
   the control circuitry is further configured to acquire, as the predetermined information, a communication parameter for transmitting user data to the another communication device in the unconnected state, and
   the transceiver transmits the user data to the another communication device in the unconnected state based on the communication parameter.

8. The communication device according to claim 7, wherein the communication parameter includes at least one of time-frequency resource information, frequency hopping information, Modulation and coding scheme (MCS) information, repetition count information, redundancy version information, Hybrid Automatic Repeat reQuest (HARQ) process information, transmission power information, Demodulation Reference Signal (DMRS) information, or precoding information.

9. The communication device according to claim 1, wherein
the control circuitry is further configured to acquire, as the predetermined information, information transmitted from the another communication device using a predetermined control channel or a channel for Downlink Control Information (DCI) transmission.

10. The communication device according to claim 9, wherein
the predetermined control channel includes at least one channel of a broadcast channel, a paging channel, and a channel for RRC messages, and
the control circuitry is further configured to acquire, as the predetermined information, information transmitted from the another communication device using the predetermined control channel.

11. The communication device according to claim 1, wherein
when the transceiver transmits user data to the another communication device in the unconnected state, the transceiver repeatedly transmits the user data.

12. The communication device according to claim 11, wherein
when the transceiver transmits user data to the another communication device in the unconnected state, the transceiver repeatedly transmits the user data using a different beam.

13. The communication device according to claim 1, wherein
the control circuitry is further configured to determine whether or not transmission of the user data in the unconnected state fails based on an operation of the another communication device after the user data is transmitted to the another communication device in the unconnected state, and
when it is determined that the transmission of the user data fails, the transceiver retransmits the user data.

14. The communication device according to claim 13, wherein
when it is determined that the transmission of the user data in the unconnected state fails, the transceiver increases transmission power and retransmits the user data.

15. The communication device according to claim 1, wherein
when the transceiver transmits user data to the another communication device in the unconnected state, the transceiver transmits data using a cyclic prefix length longer than a cyclic prefix length in a case of transmitting user data in the predetermined connected state.

16. A communication method performed by a communication device in which a radio connection state with another communication device changes from an unconnected state to a predetermined connected state by performing a predetermined connection procedure, the communication method comprising:
acquiring predetermined information for transmitting data to the another communication device in the unconnected state;
transmitting the data to the another communication device in the unconnected state based on the predetermined information;
making a determination regarding a change of the radio connection state, and
determining whether or not the radio connection state is changed from the unconnected state to the predetermined connected state after the user data is transmitted based on the acquired information related to the change of the radio connection state,
wherein the information related to the change of the radio connection state indicates a retransmission condition of the user data.

17. A non-transitory computer product containing a program that causes a computer that controls a communication device in which a radio connection state with another communication device changes from an unconnected state to a predetermined connected state by performing a predetermined connection procedure, the predetermined connection procedure comprising:
acquiring predetermined information for transmitting data to the another communication device in the unconnected state;
transmitting the data to the another communication device in the unconnected state based on the predetermined information;
making a determination regarding a change of the radio connection state, and
determining whether or not the radio connection state is changed from the unconnected state to the predetermined connected state after the user data is transmitted based on the acquired information related to the change of the radio connection state,
wherein the information related to the change of the radio connection state indicates a retransmission condition of the user data.

* * * * *